United States Patent [19]
Taguchi et al.

[11] Patent Number: 5,850,377
[45] Date of Patent: Dec. 15, 1998

[54] DATA READOUT SYSTEM FOR OPTICAL DISK HAVING MAXIMUM LIKEHOOD DATA DETECTING CIRCUIT

[75] Inventors: Masakazu Taguchi; Haruhiko Izumi, both of Kawasaki, Japan

[73] Assignee: Fujitsu Limited, Kawasaki, Japan

[21] Appl. No.: 838,832

[22] Filed: Apr. 11, 1997

Related U.S. Application Data

[62] Division of Ser. No. 310,815, Sep. 22, 1994, Pat. No. 5,680,380.

[30] Foreign Application Priority Data

| Nov. 9, 1993 | [JP] | Japan | 5-279943 |
| Dec. 27, 1993 | [JP] | Japan | 5-333355 |
| Mar. 17, 1994 | [JP] | Japan | 6-047543 |
| Jul. 19, 1994 | [JP] | Japan | 6-167206 |
| Sep. 20, 1994 | [JP] | Japan | 6-225433 |

[51] Int. Cl.$^6$ .................................................. G11B 7/00
[52] U.S. Cl. .............................................. 369/48; 369/59
[58] Field of Search .................................. 369/47–48, 54, 369/58, 59, 111, 124

[56] References Cited

U.S. PATENT DOCUMENTS

| 4,575,193 | 3/1986 | Greivenkamp, Jr. . | |
| 5,233,589 | 8/1993 | Saito et al. | 369/48 |
| 5,233,590 | 8/1993 | Ogawa | 369/48 |
| 5,260,917 | 11/1993 | Mashimo | 369/59 |
| 5,363,352 | 11/1994 | Tobita et al. | 369/47 X |
| 5,392,270 | 2/1995 | Okada et al. | 369/59 |
| 5,420,893 | 5/1995 | Ward | 369/13 |
| 5,440,424 | 8/1995 | Wu et al. . | |
| 5,450,389 | 9/1995 | Hayashi | 369/59 |
| 5,469,415 | 11/1995 | Fujita et al. | 369/48 |

FOREIGN PATENT DOCUMENTS

| 0430811A2 | 6/1991 | European Pat. Off. . |
| 2-210667 | 8/1990 | Japan . |
| 4-69864 | 3/1992 | Japan . |
| 4-121822 | 4/1992 | Japan . |
| 5-89476 | 4/1993 | Japan . |
| 5-342584 | 12/1993 | Japan . |

OTHER PUBLICATIONS

"Optimal Reception for Binary Partial Response Channels", by M. J. Ferguson, The Bell System Technical Journal, vol. 51, No. 2, Feb. 1972, pp. 493–505.

"Modulation and Coding for Information Storage" by Paul H. Siegel and Jack K. Wolf, 2460 IEEE Communications Magazine 29 (1991) Dec., No. 12, New York, US, pp. 68–86.

M. Tobita, T. Yamagami and T. Watanabe: "Viterbe Detection of Partial Response on a Magneto–Optical Recording Channel", 166/SPIE–The International Society For Optical Engineering; Proceedings Series, vol. 1663, No.1, 9–14, Feb. (1992), pp. 166–173.

"Channels and Codes for Magnetooptical Recording", by Robert T. Lynch, Jr. 8272 IEEE Journal on Selected Areas in Communications 10(1992) Jan., No. 1, New York, US, pp. 57–71.

(List continued on next page.)

Primary Examiner—W. R. Young
Attorney, Agent, or Firm—Greer, Burns & Crain, Ltd.

[57] ABSTRACT

A system reproduces data from an optical disk in which a signal obtained by encoding recording data in accordance with a recording rule including a rule corresponding to a partial response class I characteristic has been recorded. The system includes an optical head for reproducing a signal from the optical disk, an analog-to-digital converter for sampling the signal reproduced by the optical head at predetermined timing and for outputting sampling data, a determination unit for determining, based on the sampling data from the analog-to-digital converter, a transition state of data to be reproduced in accordance with a transmission line characteristic of the reproduction system for the optical disk, and a data decision unit for deciding maximum likelihood reproduction data at present timing based on the determination result obtained by the determination unit.

2 Claims, 62 Drawing Sheets

OTHER PUBLICATIONS

"A PRML System for Digital Magnetic Recording", 8272 IEEE Journal on Selected Areas in Communications, 10(1992) Jan., No. 1, New York, US, pp. 38–56.

"Sequence (Viterbi–Equivalent)Decoding" by Richard C. Schneider, IEEE Transactions on Magnetics, vol. 24, No. 6, Nov. 1988, pp. 2539–2541.

"High–Density Recording Using Mark Length Recording Method for Magnetooptical Disk" by Toshiaki Iwanaga and Hiroshi Inada, 362 Japanese Journal of Applied Physics Part 1, 31 (1192) Feb., No. 2b, Tokyo, Japan, pp. 580–583.

"Optical Recording", a Technical Overview; Chapter 9, 1990 Addison–Wesley Publishing Co, pp. 229–255.

M.J. Ferguson "Optimal Reception for Binary Partial Response Channels", The Bell System Technical Journal, pp. 493–505, Feb. 1972.

Minoru Tobita, Tamotsu Yamagami and Tetsu Watanabe "Viterbi Detection of Partial Response on a Magneto–Optical Recording Channel", pp. 82–85, Feb. 11, 1985.

FIG. 8

| MODULATOR VARIATION | Y1 Y2<br>PREVIOUS DATA WORD | | X1 X2<br>PRESENT DATA WORD | | Z1 Z2 Z3<br>CURRENT CHANNEL SYMBOL OF PREVIOUS DATA WORD | | |
|---|---|---|---|---|---|---|---|
| MEAN: LAST BIT Z3 OF PREVIOUS CHANNEL WORD IS EQUAL TO ZERO (Z3=0) | 1 | 0 | 0 | x | 1 | 0 | 1 |
| | 1 | 0 | 1 | x | 0 | 0 | 0 |
| | 1 | 1 | 0 | 0 | 0 | 1 | 0 |
| | 1 | 1 | $\overline{0}$ | $\overline{0}$ | 1 | 1 | 0 |
| | 0 | 0 | 0 | x | 0 | 0 | 1 |
| | 0 | 0 | 1 | x | 0 | 0 | 0 |
| | 0 | 1 | 0 | x | 0 | 0 | 1 |
| | 0 | 1 | 1 | x | 0 | 0 | 0 |
| Z3 = 1 | 0 | 0 | 0 | x | 0 | 0 | 1 |
| | 0 | 0 | 1 | x | 0 | 1 | 0 |
| | 0 | 0 | 0 | 0 | 0 | 1 | 0 |
| | 0 | 0 | $\overline{0}$ | $\overline{0}$ | 0 | 0 | 0 |

$\overline{0\ 0}$ REPRESENTS "NOT 0 0"

x REPRESENTS "DON'T CARE"

F I G. 10
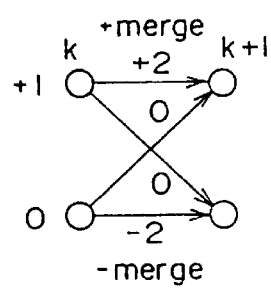
F I G. 11
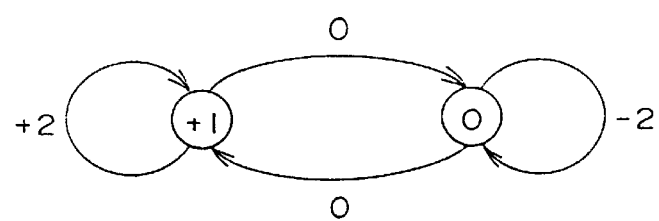

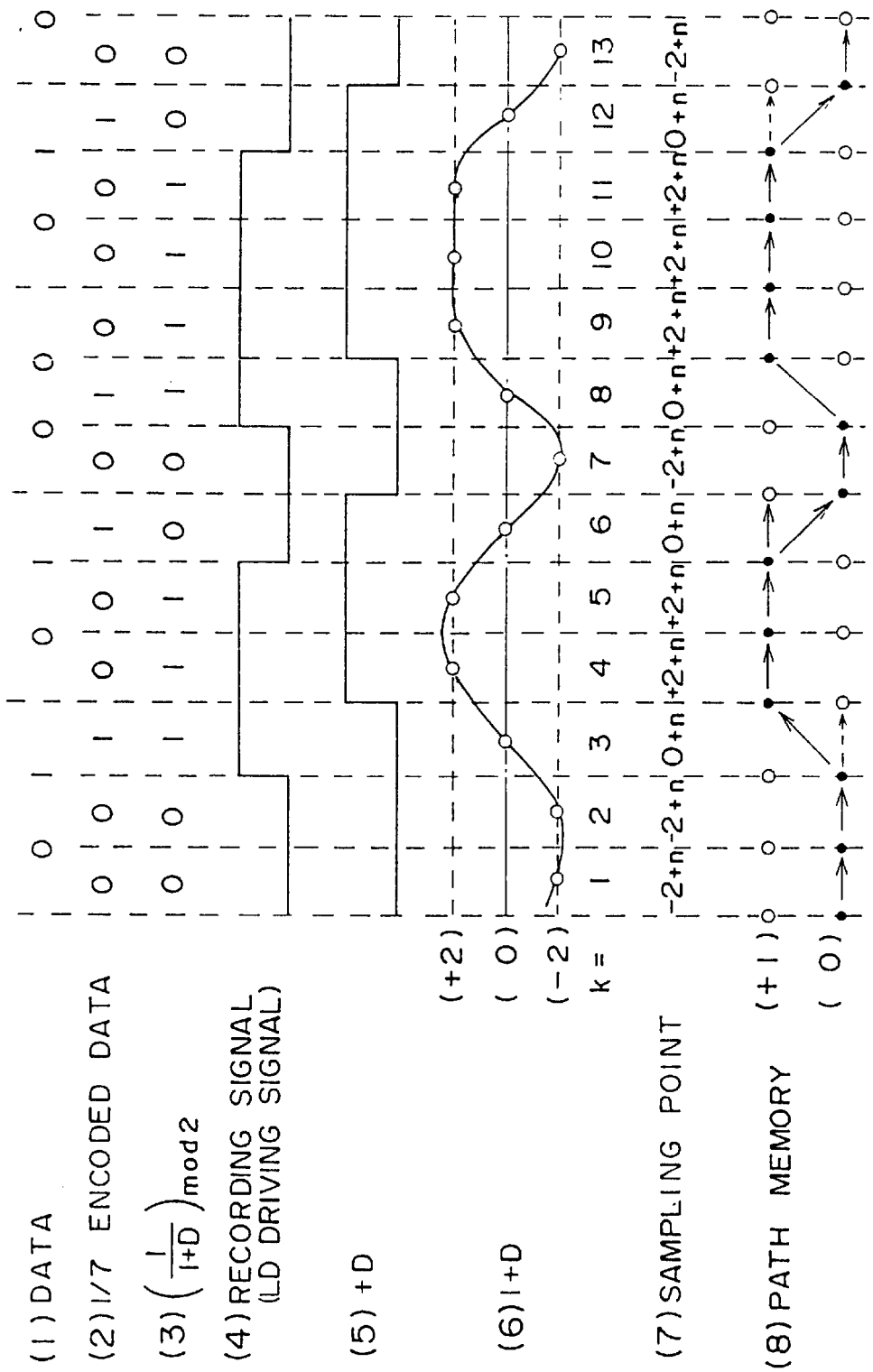

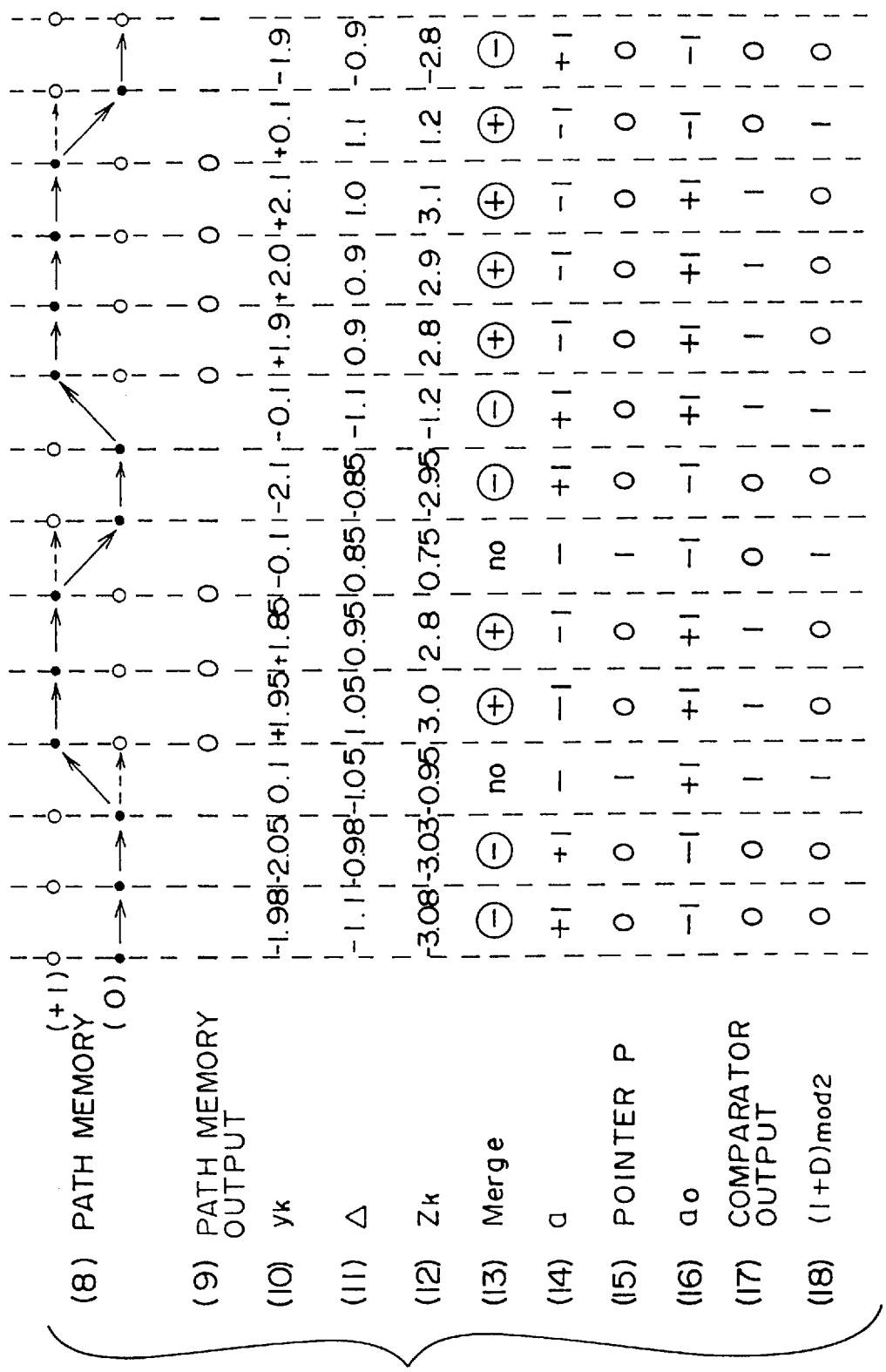

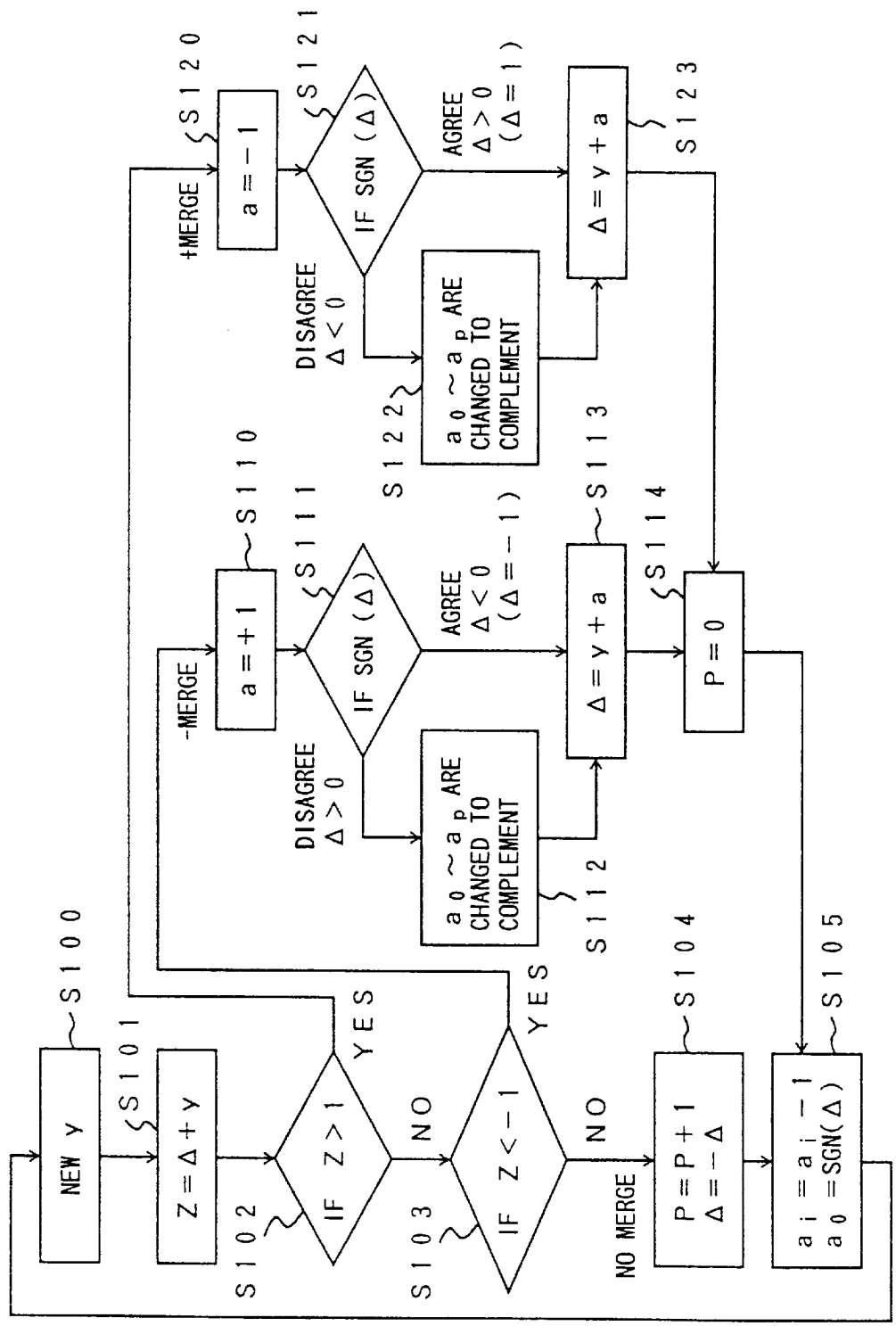
F I G. 14

F I G. 2 8
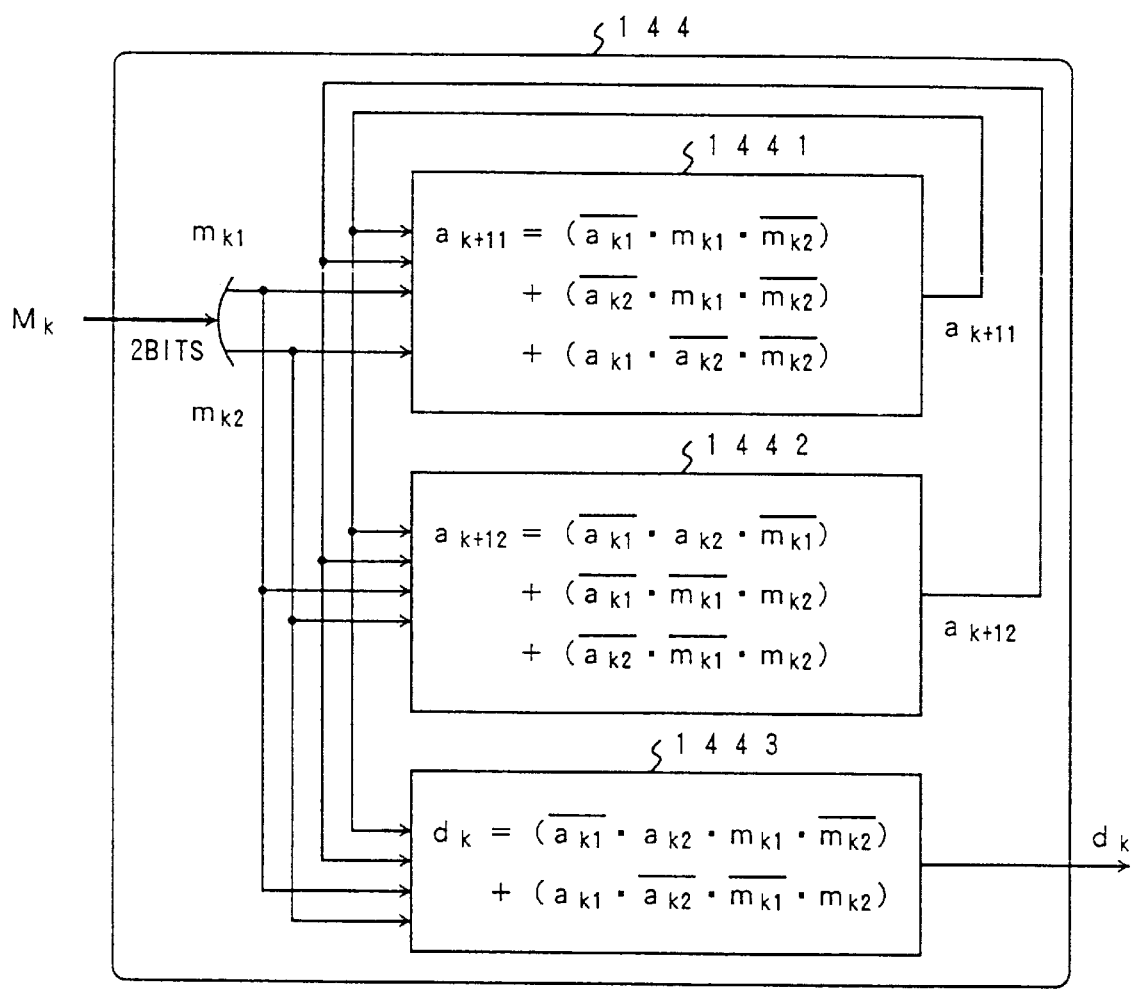

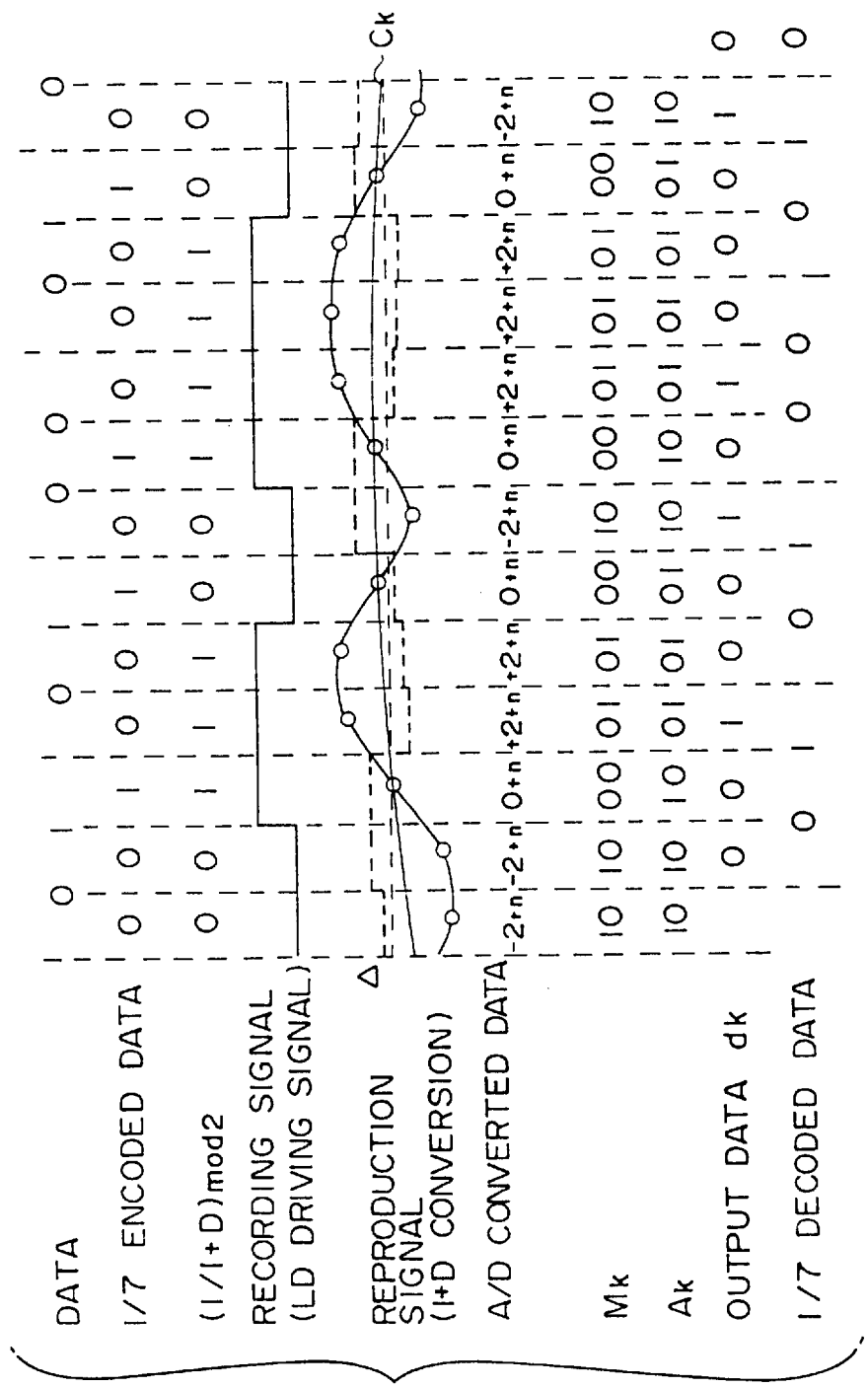

$$def_k = a_{k1} \cdot \overline{a_{k2}} \cdot \overline{m_{k1}} \cdot m_{k2}$$

$$der_k = \overline{a_{k1}} \cdot a_{k2} \cdot m_{k1} \cdot \overline{m_{k2}}$$

F I G. 50
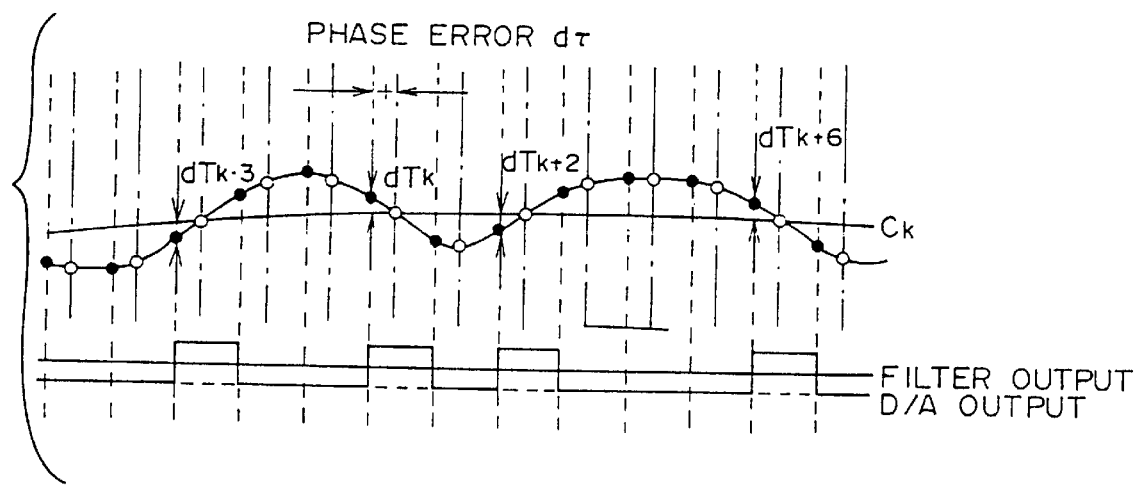
F I G. 51
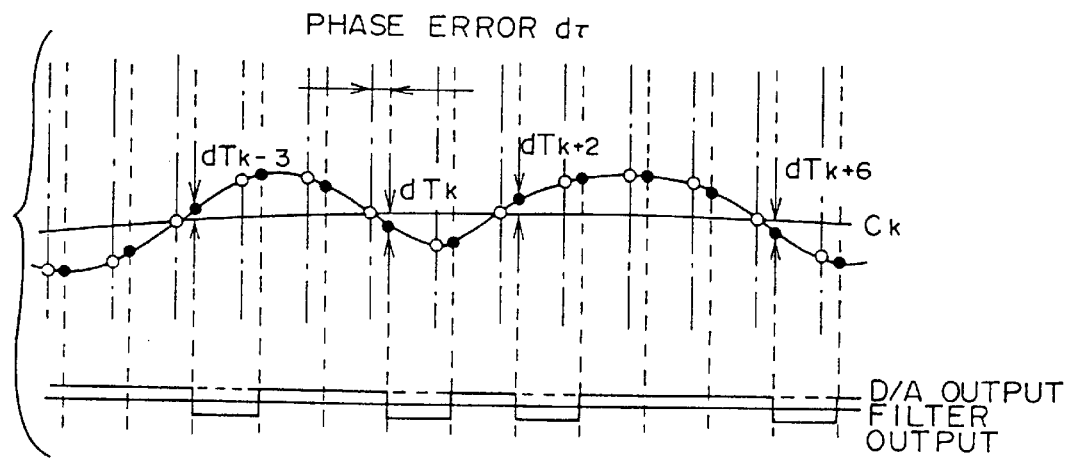

DATA READOUT SYSTEM FOR OPTICAL DISK HAVING MAXIMUM LIKEHOOD DATA DETECTING CIRCUIT

This is a divisional of copending application Ser. No. 08/310,815 filed on Sep. 22, 1994, now U.S. Pat. No. 5,680,380.

BACKGROUND OF THE INVENTION (1) Field of the Invention

The present invention generally relates to a data readout system applied to optical disk units, such as magneto-optical disk units, and more particularly to a data readout system for reproducing, in accordance with a maximum likelihood data detection method, data from an optical disk in which data has been recorded based on a partial response characteristic.

(2) Description of Related Art

Due to large capacity, changeability, high reliability and the like, popularization of magneto-optic disk units is accelerated so that units capable of recording and reproducing image data and units capable of recording codes for computers have been proposed.

A recording system of a conventional optical disk unit is essentially formed as shown in FIG. 1. Referring to FIG. 1, there are provided an optical disk 1, an optical head 2, a data output unit 3, a modulator 4 and a laser driving unit 5. Data from the data output unit 3 is modulated by the modulator 4, and the modulated signal is supplied to the laser driving unit 5. The laser driving unit 5 then drives a laser diode (LD) in the optical head 2 based on the modulated signal, so that data is recorded in the optical disk 1.

In a recording process, data, a laser driving signal and pits formed on the optical disk are shown, for example, in FIG. 2. That is, pits are formed at positions at which the laser diode is turned on in accordance with the recording data. In addition, in a case where a magneto-optical disk is used, magnetic domains are formed as pits on the magneto-optical disk.

A reproduction system is essentially formed as shown in FIG. 3. Referring to FIG. 3, there are provided the optical disk 1, the optical head 2, an amplifier 6, a filter/equalizer 7, a peak detector 8, a phase locked loop (PLL) circuit 9 and a demodulator 10. The laser diode in the optical head 2 is turned on with a power Pr so that a laser beam is irradiated on the optical disk 1. Based on a reflected beam obtained from the optical disk 1, a reproduction signal as shown in FIG. 4 is obtained. The reproduction signal passes through the amplifier 6, and waveform shaping of the reproduction signal is carried out by an automatic gain controller (AGC), a low-pass filter (LPF) and an equalizer (Eq). After this, the reproduction signal is supplied to the peak detector 8. The peak detector 8 differentiates the reproduction signal, detects zero-cross points of the differential signal so as to detect peak points of the reproduction signal. The peak detector 8 then outputs a pulse signal referred to as row data. The row data is supplied to the PLL circuit 9 and separated data synchronized with a clock is output from the PLL circuit 9. The separated data is demodulated to the original recording data by the demodulator 10.

In a case where data has been recorded in a low recording density, the reproduction signal as shown in FIG. 5A is obtained. In a case where data has been recorded in a high recording density, the reproduction signal as shown in FIG. 5B is obtained. Noises caused by the laser diode (LD) and the optical disk 4 and noises generated in circuits are superposed on the waveform of the reproduction signal. The higher the data recording density on the optical disk 1, the smaller the amplitude of the reproduction signal due to the heat interference in a recording process and the waveform interference in a reproduction process. As a result, in the conventional detecting system, a detecting margin is lowered, so that errors occur easily.

SUMMARY OF THE INVENTION

Accordingly, a general object of the present invention is to provide a novel and useful data reproduction system in which the disadvantages of the aforementioned prior art are eliminated.

A specific object of the present invention is to provide a data reproduction system in which a large data detecting margin is ensured so that correct data can be detected from the optical disk.

The above objects of the present invention are achieved by a data reproduction system for reproducing data from an optical disk in which a signal obtained by modulating recording data in accordance with a recording rule including a rule corresponding to a partial response class I characteristic has been recorded, the system comprising: signal reproduction means for reproducing a signal from the optical disk; sampling means for sampling the signal reproduced by the signal reproduction means at predetermined timing and for outputting sampling data; determination means for determining, based on the sampling data from the sampling means, a transition state of data to be reproduced in accordance with a transmission line characteristic of the reproduction system for the optical disk; and data decision means for deciding maximum likelihood reproduction data at present timing based on the determination result obtained by the determination means.

According to the present invention, since data is reproduced from the optical disk in accordance with the maximum likelihood data detecting method, accurate data can be reproduced from the optical disk in which data has been recorded in a high density.

Another object of the present invention is to provide a data reproduction system in which even if the reproduction signal is slowly varied like an envelope variation, correct data can be generated based on the reproduction signal.

The above objects of the present invention are achieved by a data reproduction system for reproducing data from an optical disk in which a signal obtained by modulating recording data in accordance with a recording rule of a partial response characteristic has been recorded, the system comprising: signal reproduction means for reproducing a signal from the optical disk; sampling means for sampling the signal reproduced by the signal reproduction means at predetermined timing and for outputting a.sampling data; center value calculation means for calculating a center value of the reproduction signal based on the sampling data; reference value calculating means for calculating a reference value used to determine a state of a level of the reproduced signal based on the center value calculated by the center value calculation means; determination means for determining, based on a relative level relationship between the sampling data and reference value, what a transition state of data to be reproduced in accordance with a transmission line characteristic of the reproduction system for the optical disk is; and data calculation means for calculating maximum likelihood reproduction data at present timing based on the determination result obtained by the determination means.

According to the present invention, since the transition state of data to be reproduced is decided based on a relative level relationship between the sampling data and the reference value calculated by using the center value of the reproduction signal influenced by the variation of the reproduction signal, even if the reproduction signal is slowly varied like an envelope variation, correct data can be generated based on the reproduction signal.

Another object of the present invention is to provide a data reproduction system in which a phase error between a synchronizing signal used to sample the reproduction signal and points at which the reproduction signal is to be actually sampled does not occur.

The above objects of the present invention are achieved by a data reproduction system for reproducing data from an optical disk in which a signal obtained by modulating recording data in accordance with a recording rule of a partial response characteristic has been recorded, the system comprising: signal reproduction means for reproducing a signal from the optical disk; clock signal generating means for generating a clock signal; sampling means for sampling the reproduction signal from the signal reproduction means in synchronism with the clock signal from the clock signal generating means and for outputting sampling data; maximum likelihood data detecting means for deciding, based on the sampling data from the sampling means, maximum likelihood reproduction data to be reproduced; phase error detecting means for detecting a phase error between phase of the clock signal and each point to be sampled in the reproduction signal; phase control means for performing a control operation for controlling the clock signal supplied from the clock generating means to the sampling means and maximum likelihood data detecting means based on the phase error detected by the phase error detecting means so that the phase error is canceled.

According to the present invention, since the phase of the synchronizing clock signal is controlled so that the phase error between the phase of the synchronizing clock signal and points at which the reproduction signal should be sampled is canceled, the phase of the synchronizing clock signal always corresponds to the points at which the reproduction signal is to be sampled. Thus, corrected and correct data can be reproduced.

Still another object of the present invention is to provide a data reproduction system in which correct data can be obtained in an early stage in each unit region on the optical disk in which data has been recorded.

The above objects of the present invention are achieved by a data reproduction system for reproducing data from an optical disk in which information has been recorded in every unit region, the unit region having a first region for recording a regular pattern signal encoded in accordance with a recording rule of a predetermined partial response characteristic and a second region for recording a random data signal, the system comprising: signal reproduction means for reproducing a signal from the optical disk; sampling means for sampling the reproduction signal from the signal reproduction means at predetermined timing and outputting sampling data; maximum likelihood data detecting means for deciding maximum likelihood data to be reproduced based on the sampling data by using calculation data obtained based on the sampling data from the sampling means and constant data; data generating means for generating the recording data from the data decided by the maximum likelihood data detecting means based on the sampling data obtained by the sampling means in the second region of each unit region; and initial value calculation means for calculating, based on sampling data obtained by the sampling means in the first region of each unit region, an initial value of the calculation data used by the maximum likelihood data detecting means.

According to the present invention, an initial value of the calculation data (e.g. the center value) used by the maximum likelihood data detecting means is calculated based on the sampling data obtained in the first region (the VFO region) of each unit region (each sector), and the maximum likelihood data detecting means starts a process using the initial value of the calculation data. Thus, correct data can be obtained in an early stage in each unit region on the optical disk in which data has been recorded.

Another object of the present invention is to provide a data reproduction system in which data can be stably reproduced from each unit region on the optical disk in which data has been recorded.

The above objects of the present invention are achieved by the data reproduction system further comprising: constant data calculation means for calculating, based on the sampling data in the first region of each unit region by the sampling means, the constant data used by the maximum likelihood data detecting means in the second region of each unit region.

The above objects of the present invention are also achieved by a data reproduction system for reproducing data from an optical disk in which information has been recorded in every unit region, the unit region having a first region for recording a regular pattern signal encoded in accordance with a recording rule of a predetermined partial response characteristic and a second region for recording a random data signal, the system comprising: signal reproduction means for reproducing a signal from the optical disk; sampling means for sampling the reproduction means from the signal reproduction means at predetermined timing and for outputting sampling data; equalizing means for executing an equalizing process for the sampling data from the sampling means; maximum likelihood data detecting means for deciding, based on the sampling data processed by the equalizing means, maximum likelihood data to be reproduced; data generating means for generating the recording data from the data decided by the maximum likelihood data detecting means based on the sampling data processed by the equalizing means in the second region of each unit region; and equalizing target calculating means for calculating, based on the sampling data obtained in the first region of each unit region, the equalizing target used by the equalizing means.

According to the present invention, constant data (e.g. the determination reference values and the equalizing target) used by the maximum likelihood data detecting means is calculated based on the sampling data obtained in the first region (the VFO region) of each unit region (each sector). The maximum likelihood data detecting means starts a process using the constant data in the second region (the data region) of each unit region (each sector). Thus, data can be stably reproduced from the second region of each unit region on the optical disk in which data has been recorded.

BRIEF DESCRIPTION OF THE DRAWINGS

Other objects, features and advantages of the present invention will become apparent from the following detailed description when read in conjunction with the accompanying drawings, in which:

FIG. 8 is a table illustrating a rule of a 1/7 modulation;

FIG. 10 is a diagram illustrating state transition in a partial response class I characteristic;

FIG. 11 is a Trellis diagram in a partial response class I characteristic;

FIGS. 12A and 12B are timing charts illustrating signals in the recording system and reproduction system;

FIG. 14 is a flow chart illustrating a process executed in the maximum likelihood data detecting circuit;

FIG. 28 is a block diagram illustrating the merge detecting unit;

FIG. 29 is a timing chart illustrating signals in the recording system and the reproduction system;

FIG. 50 is a diagram illustrating a positive phase error;

FIG. 51 is a diagram illustrating a negative phase error;

DESCRIPTION OF THE PREFERRED EMBODIMENTS

A description will be given of an embodiment of the present invention.

Figure 1:
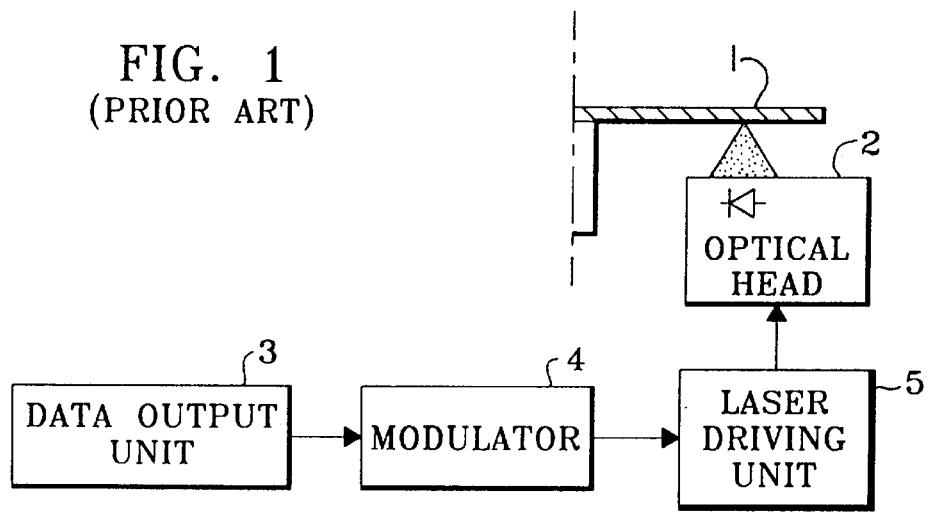
FIG. 1 is a block diagram illustrating a recording system of a conventional optical disk unit.
Figure 2:
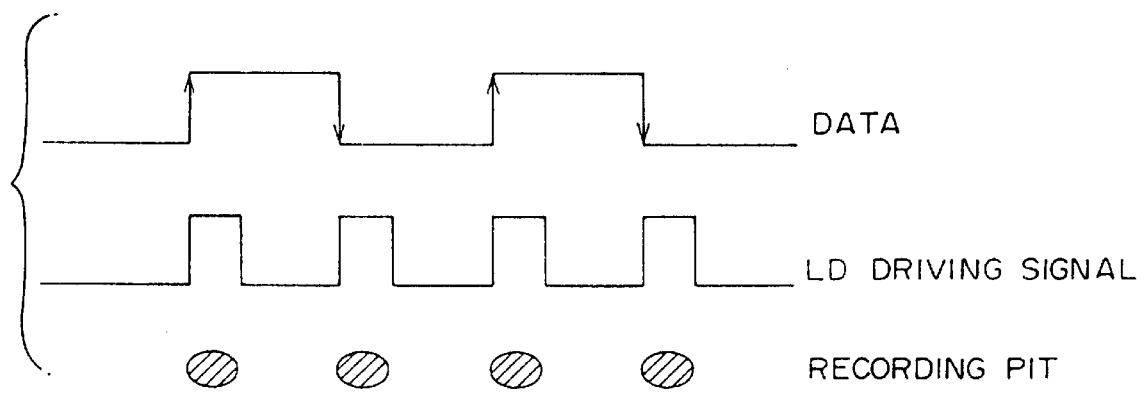
FIG. 2 is a diagram illustrating a relationship between recording data and pits formed on an optical disk.
Figure 3:
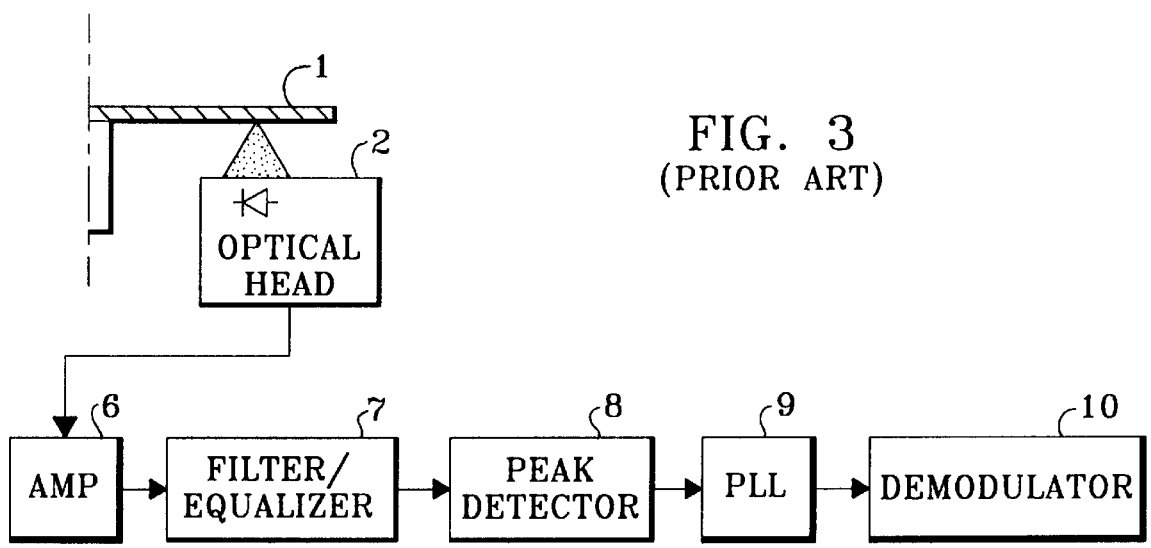
FIG. 3 is a block diagram illustrating a reproduction system of a conventional optical disk unit.
Figure 4:
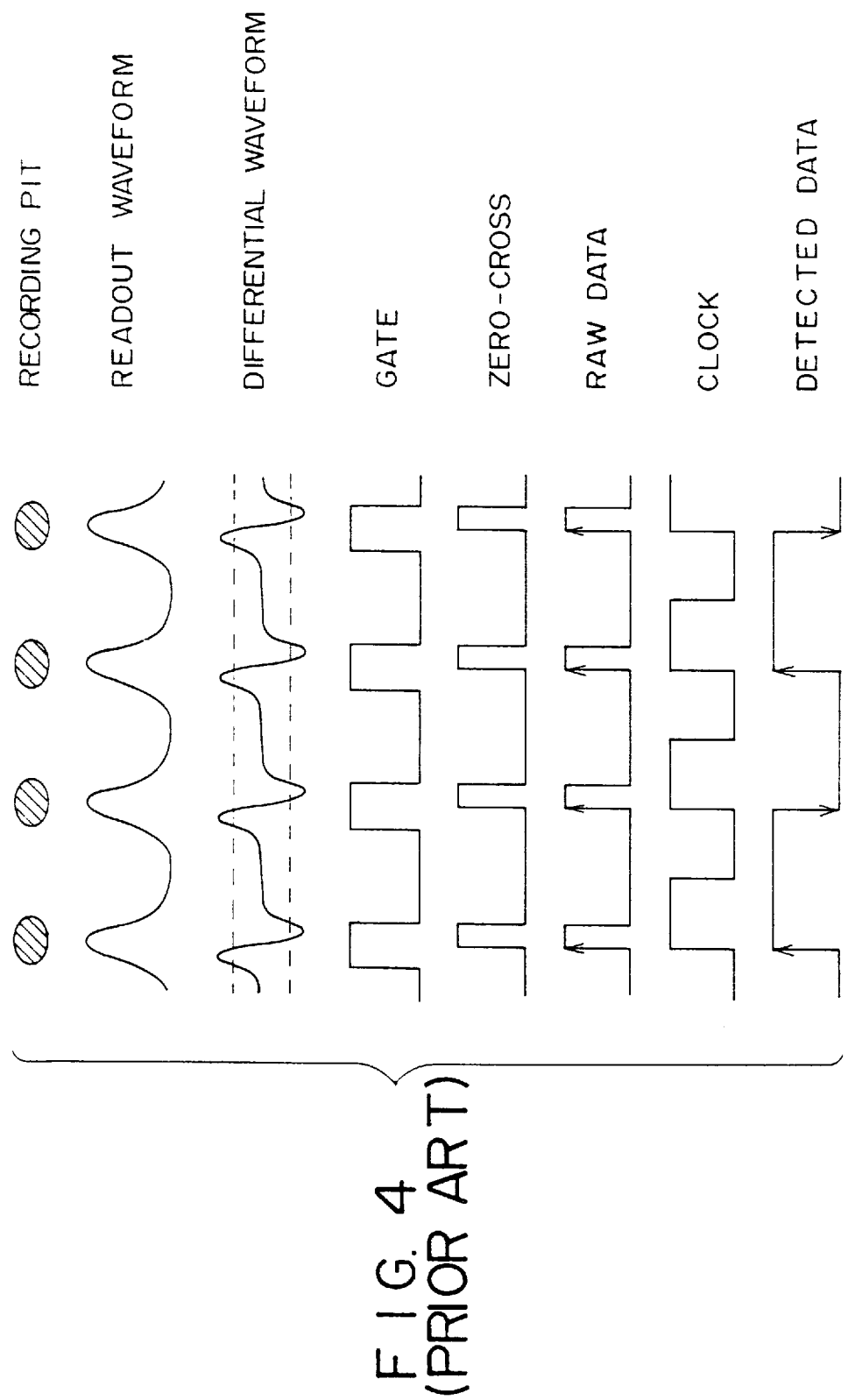
FIG. 4 is a diagram illustrating a relationship between a waveform of a reproduction signal and a demodulated data.
Figure 5A:
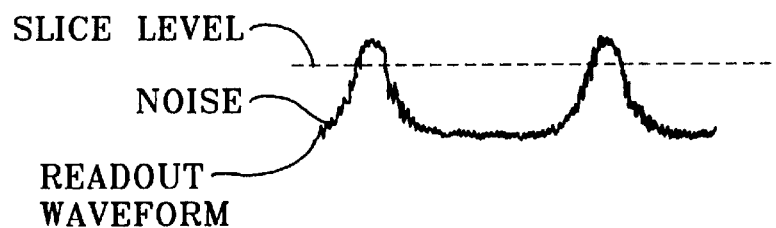
FIG. 5A is a waveform chart illustrating a reproduction signal in a case of a low recording density.
Figure 5B:
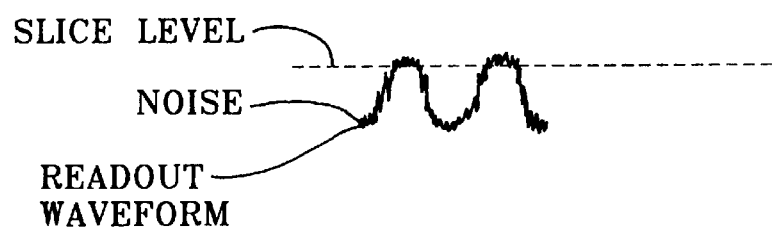
FIG. 5B is a waveform chart illustrating a reproduction signal in a case of a high recording density.
Figure 6:
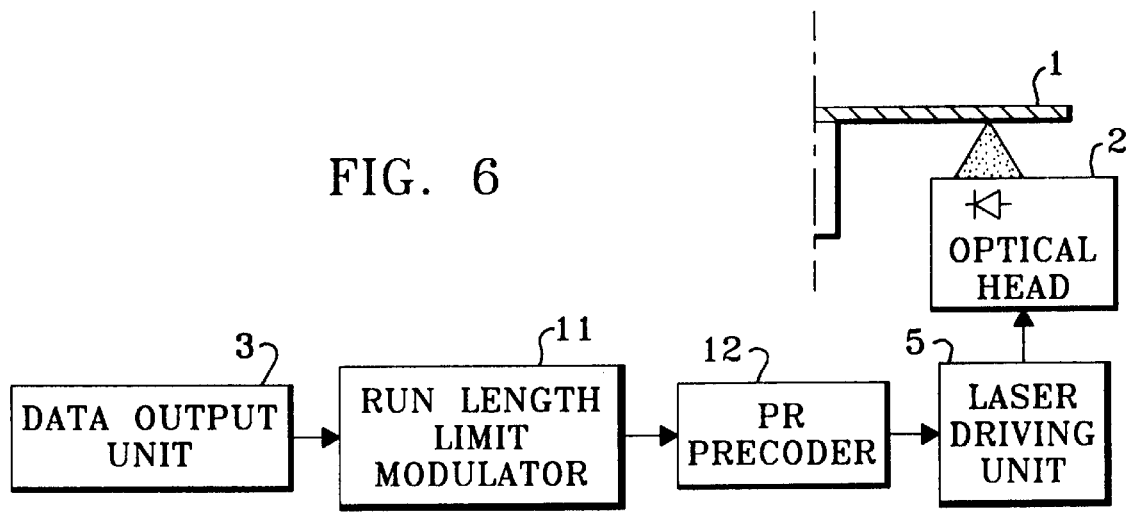
FIG. 6 is a block diagram illustrating a recording system of an optical disk according to an embodiment of the present invention.
Figure 7:
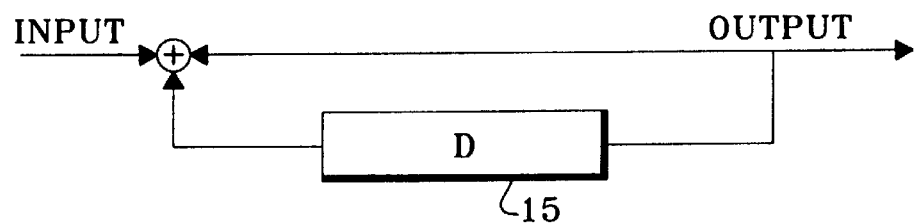
FIG. 7 is a block diagram illustrating a structure of a precoder.

A recording system of an optical disk unit (including a magneto-optic disk unit) according to an embodiment of the present invention is formed as shown, for example, in FIG. 6. Referring to FIG. 6, there are provided the optical disk 1, the optical head 2, the data output unit 3, the laser driving unit 5, a run length limit modulator 11 and a partial response modulation precoder (a PR precoder) 12. The run length limit modulator 11 converts two-bit data into three-bit data in accordance with a rule as shown in FIG. 8 so that the 1/7 modulation of data (a bit sequence) from the data output unit 3 is carried out. The data modulated by the run length limit modulator 11 in accordance with the 1/7 modulation rule is further modulated by the PR precoder 12 in accordance with the partial response class I characteristic. The PR precoder 12 has a delay element (D) 15 in which a delay time for one data item is set, as shown in FIG. 7, and output data from the delay element (D) 15 is fed back to input data. In this case, the PR precoder 12 carries out the $[1/(1+D)]_{mod2}$ modulation. The data obtained by the $[1/(1+D)]_{mod2}$ modulation is supplied to the laser driving unit 5, so that the laser driving unit 5 outputs a laser driving signal corresponding to the input data. The laser driving signal from the laser driving unit 5 is supplied to a laser diode (LD) of the optical head 2. The laser diode (LD) is driven by the laser driving signal so that data is recorded on the optical disk 1. The above process for converting the data from the data output unit 3 into the laser driving signal (a recording signal) is shown, for example, in FIG. 12A (1), (2), (3) and (4).

Figure 9:
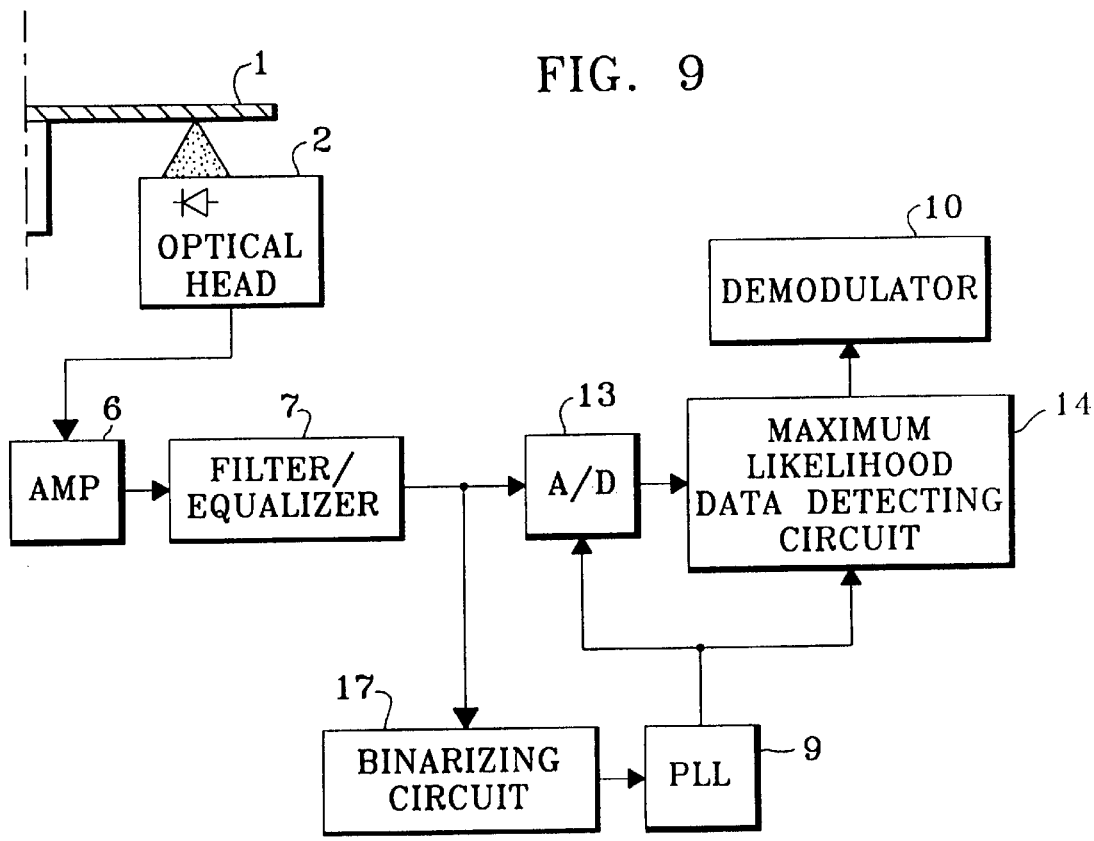
FIG. 9 is a block diagram illustrating a reproduction system of an optical disk unit according to the embodiment of the present invention.

A reproduction system for reproducing data from the optical disk 1 in which the data is recorded by the above recording system is formed, for example, as shown in FIG. 9. Referring to FIG. 9, there are provided the optical disk 1, the optical head 2, the amplifier 6, the filter/equalizer 7, the PLL circuit 9, the demodulator 10, an analog-to-digital converter (an A/D converter) 13, a maximum likelihood data detecting circuit 14 and a binarizing circuit 17. A reproduction signal corresponding to the recording data is obtained from the optical disk 1 via the optical head 2, and after the reproduction signal is amplified by the amplifier 6, the waveform shaping of the amplified reproduction signal is carried out by the filter/equalizer 7. The wave form shaped signal is converted into a digital signal by the A/D converter 13, and the digital signal is demodulated by the maximum likelihood data detecting circuit 14. The binarizing circuit 17 converts the wave shaped signal from the filter/equalizer 7 into a binary signal using a slice level. The PLL circuit 9 generates a timing clock signal based on the binary signal. The A/D converter 13 and the maximum likelihood data detecting circuit 14 operates in synchronism with the timing clock signal from the PLL circuit 9. The states of signals obtained from a process for generating the reproduction signal to the maximum likelihood data detecting process are shown, for example, in FIG. 12A (5), (6), (7) and (8) and FIG. 12B (9) and (18). (FIG. 12A (8) and FIG. 12B (8) show the same signal transition state). The signal obtained in the maximum likelihood data detection process is further modulated to last data (the 1/7 modulation).

Referring to FIG. 12A, a characteristic in accordance with which the recording signal (4) is converted into the reproduction signal (6) corresponds to the partial response class I characteristic. Thus, the reproduction signal (6) corresponds to a signal obtained by the (1+D) conversion of the recording signal (4). The signal obtained by the (1+D) conversion of the recording signal may have three values as shown by dotted lines in FIG. 12A (6). The three values are made correspond to −2, 0 and +2 respectively. The maximum likelihood data detecting circuit 14 demodulates a converted signal into which the reproduction signal (6) is converted by the A/D converter 13 so as to obtain the recording signal. In the maximum likelihood data detecting circuit 14, when the maximum likelihood data is detected, the maximum likelihood data transition path leading to the detected data is decided, and data on the maximum likelihood data transition path is decided as recording signal data to be reproduced. Between recording signal data "+1" and "0", there may be the following four data transition paths: a data transition path from "1" to "1";

a data transition path from "0" to "0";
a data transition path from "1" to "0"; and
a data transition path from "0" to "1".

These data transition paths are shown in a Trellis diagram of FIG. 11. The data transmission path from "1" to "1" corresponds to a value "+2" of the signal obtained by the (1+D) conversion (see FIG. 12A (6)). This data transition state is defined as "+merge". The data transition path from "0" to "0" corresponds to a value "−2" of the signal obtained by the (1+D) conversion. This data transition state is defined as "−merge". The data transition paths from "0" to "1" and from "1" to "0" correspond to a value "0" of the signal obtained by the (1+D) conversion. A state where the data transition path "0" to "1" nor the data transition path from "1" to "0" is selected is defined as "no merge".

Figure 13:
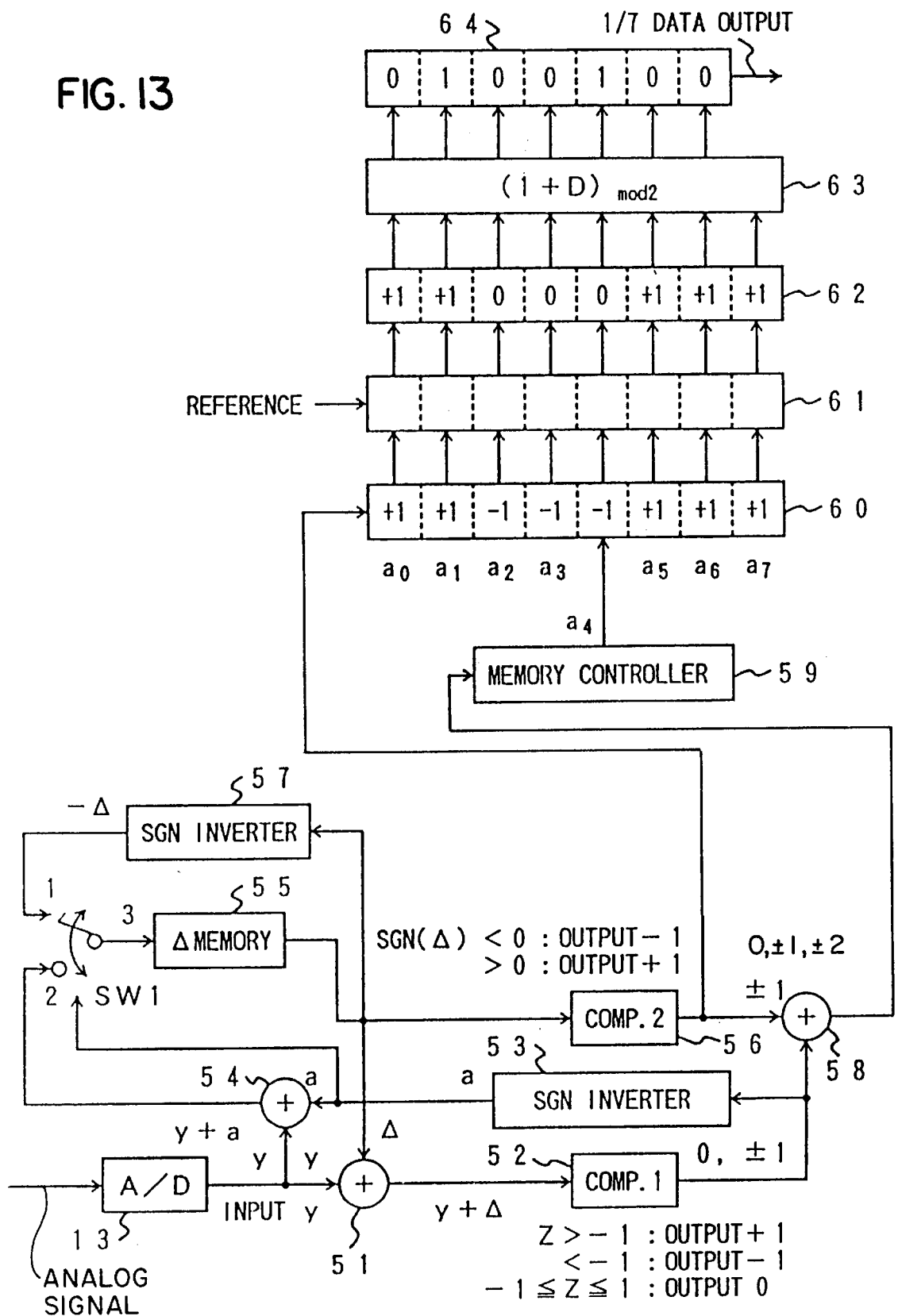
FIG. 13 is a block diagram illustrating an example of a structure of a maximum likelihood data detecting circuit shown in FIG. 9.

The maximum likelihood data detecting circuit 14 is formed, for example, as shown in FIG. 13. Referring to FIG. 13, the maximum likelihood data detecting circuit 14 connected to the A/D converter 13 has a first adder 51, a first comparator 52, a first sign inverter 53, a second adder 54, a Δmemory 55, a second comparator 56, a second sign inverter 57, a switch circuit SW1 and a third adder 58. The maximum likelihood data detecting circuit 14 also has a memory controller 59, a data memory 60, a comparator 61 a register 62, a $(1+D)_{mod2}$ converter 63 and an output register 64.

The first adder 51 adds the input data y (corresponding to the reproduction signal including noises) and a reference value Δ which will be described later, and outputs an adding value Z (=y+Δ). The first comparator 52 determines whether the sum Z is greater than 1 (Z>1), less than −1 (Z<−1) or in a range between −1 and +1 (−1≦Z≦+1). When the adding value Z is greater than 1 (Z>1), the first comparator 52 outputs "+1". When the adding value Z is less than −1 (Z<−1), the first comparator 52 outputs "−1". Further, when the adding value Z is within the range of −1≦Z≦+1, the first comparator 52 outputs "0". The first sign inverter 53 inverts the sign of the output value from the first comparator 52 and outputs data a. That is, when the output value from the first comparator 52 is "+1", the first sign inverter 53 outputs the data a of "−1" (a=−1), and when the output value from the first comparator 52 is "−1", the first sign inverter 53 outputs the data a of "+1" (a=+1). In addition, when the output value from the first comparator 52 is "0", the first sign inverter 53 outputs the data a of "0" (a=0). The second adder 54 adds the input data y from the A/D converter 13 and the above data a and outputs an adding value (y+a). The switch circuit SW1 has a terminal (1) connected to the second sign inverter 57 and a terminal (2) connected to the second adder 54. The switch circuit SW1 selects the terminal (1) or (2) in accordance with the state of the data a. When the data a is not "0" (a =+1 or −1), the terminal (2) is selected so that the adding value (y+a) is supplied to the Δmemory 55 via the switch circuit SW1. In this case, the adding value (y+a) is stored as the reference value Δ in the Δmemory 55 (Δ=y+a). On the other hand, when the data a is equal to "0", the terminal (1) is selected so that an output value −Δ from the second sign inverter 57 which inverts the sign of the reference value Δ from the Δmemory 55 is supplied to the Δmemory 55 via the switch circuit SW1. In this case, the output value −Δ from the second sign inverter 57 is stored as a new reference value Δ in the Δmemory 55 (Δ=−Δ). The second comparator 56 determines whether the sign SGN(Δ) of the reference value Δ supplied from the Δmemory 55 is positive or negative. When the sign SGN(Δ) of the reference value Δ is positive, the second comparator 56 outputs a determination signal "+1". When the sign SGN(Δ) of the reference value Δ is negative, the second comparator 56 outputs a determination signal "−1". The third adder 58 adds the determination signal (0, −1 or +1) from the first comparator 52 and the determination signal (+1 or −1) from the second comparator 56 and supplies an adding value (0, ±1 or ±2) to the memory controller 59.

The determination signal (+1 or −1) from the second comparator 56 is written in the data memory 60. the memory controller 59 receives the adding value (0, ±1 or ±2) as a control signal and controls the data memory 60 in accordance with an algorithm indicated in Table-1.

TABLE 1

| MERGE | 1st COMP. (52) | 2nd COMP. (56) | CONTROL SIGNAL | CONTROL OPERATION |
|---|---|---|---|---|
| +merge | +1 | +1 | +2 | 0 → P |
|  |  | −1 | 0 | COMPLEMENT OF MEMORY VALUE 0 → P |
| no merge | 0 | +1 | +1 | SHIFT DATA & POINTER BY ONE |
|  |  | −1 | −1 |  |
| −merge | −1 | +1 | 0 | COMPLEMENT OF MEMORY VALUE 0 → P |
|  |  | −1 | −2 | 0 → P |

The data (+1 or −1) written in the data memory 60 is compared with a reference "0" by the comparator 61 so that "+1" and "−1" are respectively converted into "1" and "0". The binary data obtained by the comparator 61 is set in the register 62, and the data set therein is supplied from the register 62 to the $(1+D)_{mod2}$ converter 63. The $(1+D)_{mod2}$ converter 63 performs the $(1+D)_{mod2}$ conversion of the input data, so that original data which has been modulated in accordance with the 1/7 encoding rule is obtained. The 1/7 encoded data is set in the output register 64. The data set in the output register 64 is supplied to the demodulator 10 and decoded in accordance with the 1/7 run length limitation.

The maximum likelihood data detecting circuit 14 which is formed as described above operates a flow chart shown in FIG. 14. A description will now be given, with reference to an example shown in FIG. 12B (10)–(18), of the operation of the maximum likelihood data detecting circuit 14.

The input data $y_k$ from the A/D converter 13 is changed, for example, as follows (see FIG. 12B (10)).

| k | $y_k$ | k | $y_k$ |
|---|---|---|---|
| 1 | −1.98 | 8 | −0.1 |
| 2 | −2.05 | 9 | +1.9 |
| 3 | 0.1 | 10 | +2.0 |
| 4 | +1.95 | 11 | +2.1 |
| 5 | +1.85 | 12 | +0.1 |
| 6 | 0.1 | 13 | −1.9 |
| 7 | −2.1 |  |  |

The input data $y_k$ is sampled data obtained from the reproduction signal shown in FIG. 12A (6) and includes noise components.

For example, at a timing k=2, when the input data $y_k$=−2.05 is supplied to the maximum likelihood data detecting circuit 14 (S100 shown in FIG. 14), the first adder 51 adds a reference value Δ=−0.98 which has been supplied from the Δmemory 55 at a timing k=1 and the input data $y_k$=−2.05, so that an adding value Z=−3.03 (=−0.98−2.05) is output from the first adder 51 (S101). In this case, since the adding value Z is less than "−1", it is determined that the state of the data transition is "−merge" (S102 and S103), so that the first comparator 52 outputs the determination result "−1". As a result, the data a of "+1" is supplied from the sign inverter 53 to the second adder 54 (S110). In addition, since the reference value Δ (=−0.08) is negative, the second comparator 56 outputs the determination result "−1" (S111). Due to the data a of "+1", the switch circuit SW1 selects the terminal (2), so that the adding value (y+a)(=−2.05+1=−1.05) calculated by the second adder 54 is stored in the Δmemory 55 (S113). The memory controller 59 then receives a control signal "−2", so that a pointer P of the data memory 60 is reset to "0" (S114) (see Table-1). Data in the data memory 60 is shifted ($a_i \rightarrow a_{i-1}$), and the determination result "−1" (SGN(Δ)) output from the second comparator 56 is written at a bit $a_0$ (corresponding to P=0) of the data memory 60 (step S105).

Next, at a timing k=3, when the input data $y_k$=0.1 is supplied to the maximum likelihood data detecting circuit 14 (S100), the first adder 51 adds the reference value Δ=−0.95 which has been supplied from the Δmemory 55 at the timing k=2 and the input data $y_k$=0.1 and outputs an adding value Z=−0.95 (=−1.05+0.1) (S101). In this case, since the adding value Z falls with in the range of −1≦Z≦+1, it is determined that the state of the data transition is "no merge" (S102 and S103), so that the first comparator 52 outputs the determination result "0". As a result, the data a of "0" is output from the sign inverter 53. Due to the data a of "0", the switch circuit SW1 is switched from the terminal (2) to the terminal (1). At this time, the second comparator 56 outputs the determination result "−1" (SGN(Δ)) based on the reference value Δ=−1.05 in the Δmemory 55. Thus, the memory controller 59 receives the control signal "−1" from the third adder 58, so that the pointer P of the data memory 59 is incremented by one (S104) (see Table-1). The sign of the reference value Δ=−1.05 which has been stored in the Δ memory 55 is inverted by the second sign inverter 57, and a new reference value Δ=1.05 is stored in the Δmemory 55 (S104). The new reference value Δ=1.05 is supplied from the Δmemory 55 to the second comparator 56, so that the second comparator 56 outputs the determination result "+1". After this, data in the data memory 60 is shifted ($a_i \rightarrow a_{i-1}$), and the determination result "+1" (SGN(Δ)) output from the second comparator 56 is written at the bit $a_0$ of the data memory 60 (S105).

Further, at a timing k=4, when the input data $y_k$=+1.95 is supplied to the maximum likelihood data detecting circuit 14, the first adder 51 adds the reference value Δ=1.05 which has been supplied from the Δmemory 55 and the input data $y_k$=1.95 and outputs an adding value Z=3.0 (=1.05+1.95) (S101).

In this case, the adding value Z is greater than 1, it is determined that the state of the data transition is "+merge" (A102), so that the first comparator 52 outputs the determination result "+1". As a result, the data a of "−1" is supplied from the sign inverter 53 to the second adder 54 (S120). In addition, since the reference value Δ(=1.05) is positive, the second comparator 56 outputs the determination result "−1" (SGN(Δ)) (S121). Due to the data a of "−1", the switch circuit SW1 is switched from the terminal (1) to the terminal (2), and the adding value (y+a) (=+1.95−1=0.95) is stored in the Δmemory 55 (S123). The memory controller 59 then receives the control signal "+2" from the third adder 58, so that the pointer P (=1) of the data memory 60 is reset to "0" (S114) (see Table-1). The data in the data memory 60 is shifted ($a_i \rightarrow a_{i-1}$), and the determination result "+1" (SGN (Δ)) is written at the bit $a_0$ (corresponding to a state of P=0) of the data memory 60.

The above process is repeated. While the process being repeated, every time the pointer P is reset to "0", the contents of the data memory 60 are decided. As has been described above, in a case where the state of the data transition is the "no merge", the pointer P is incremented by one and "+1" or "−1" corresponding to the sign of the reference value Δ is written in the data memory 60. After this, when the state of the data transition is changed to the "+merge" and the reference value Δ is positive, or when the state of the data transition is changed to the "−merge" and the reference value Δ is negative, data which has been stored in the data memory 60 under a condition of the "no merge" and data subsequently stored in the data memory 60 under a condition of the "+merge" or the "−merge" are decided. On the other hand, when an acceptable case (disagree) occurs, such as a case where the reference value Δ is negative in the "+merge" after the "no merge" or a case where the reference value Δ is positive in the "−merge" after the "no merge", complements of the data bits $a_0$–$a_p$ (p is a value of the pointer P) are calculated (S112 or S122). The data bits $a_0$–$a_p$ in the data memory 60 are changed to the complements thereof. After this, the pointer P is reset to "0" (S113 or S123) and the contents of the data memory 60 are decided.

The above process is based on a concept by which the data transition path has not yet been decided in the "no merge". That is, the data transition path in the "no merge" is decided as 0→1 or 1→0 in accordance with the state change from the "no merge" to the "+merge" or from the "no merge" to the "−merge" (see FIG. 10). The maximum likelihood transition path is decided as described above.

As has been described above, the data memory 60 is provided with the data of "+1" or "−1". The data ("+1" or "−1") is compared with the reference "0" by the comparator 61, so that the data ("+1" or "−1") is converted into "1" or "0". The output ("1" or "0") from the comparator 61 is stored in the register 62 (see FIG. 12B (17)). Bit sequence set in the register 62 corresponds to a data transition path shown in FIG. 12B (8). After this, the data set in the register 62 is converted in accordance with the $(1+D)_{mod2}$ rule by the $(1+D)_{mod2}$ converter 63. The converted data is stored in the output register 64 (see FIG. 12B (18)). The data obtained by the $(1+D)_{mod2}$ converter 63 corresponds to the original 1/7 encoded data (see FIG. 12A (2)). The data set in the output register 64 is supplied to the demodulator 10, and the demodulator 10 carries out the 1/7 run length limitation decoding so that the original data is obtained (see FIG. 12A (1)).

A description will now be given, with reference to FIGS. 15 and 16, of an embodiment of the maximum likelihood data detecting circuit carrying out the maximum likelihood data detection in consideration of the 1/7 run length limitation rule.

In a bit sequence in which bits are arranged in accordance with the 1/7 run length limitation rule, one or more bits "0" always exist between a bit "1" and a bit "1", and eight or more bits "0" are not continuously arranged. According to this rule, the next bit of a bit "1" is always "0", and the next bit of seven bits "0" continuously arranged is always "1". The input data is decoded into this 1/7 run length limitation data (hereinafter referred to as 1/7 data).

Figure 15:
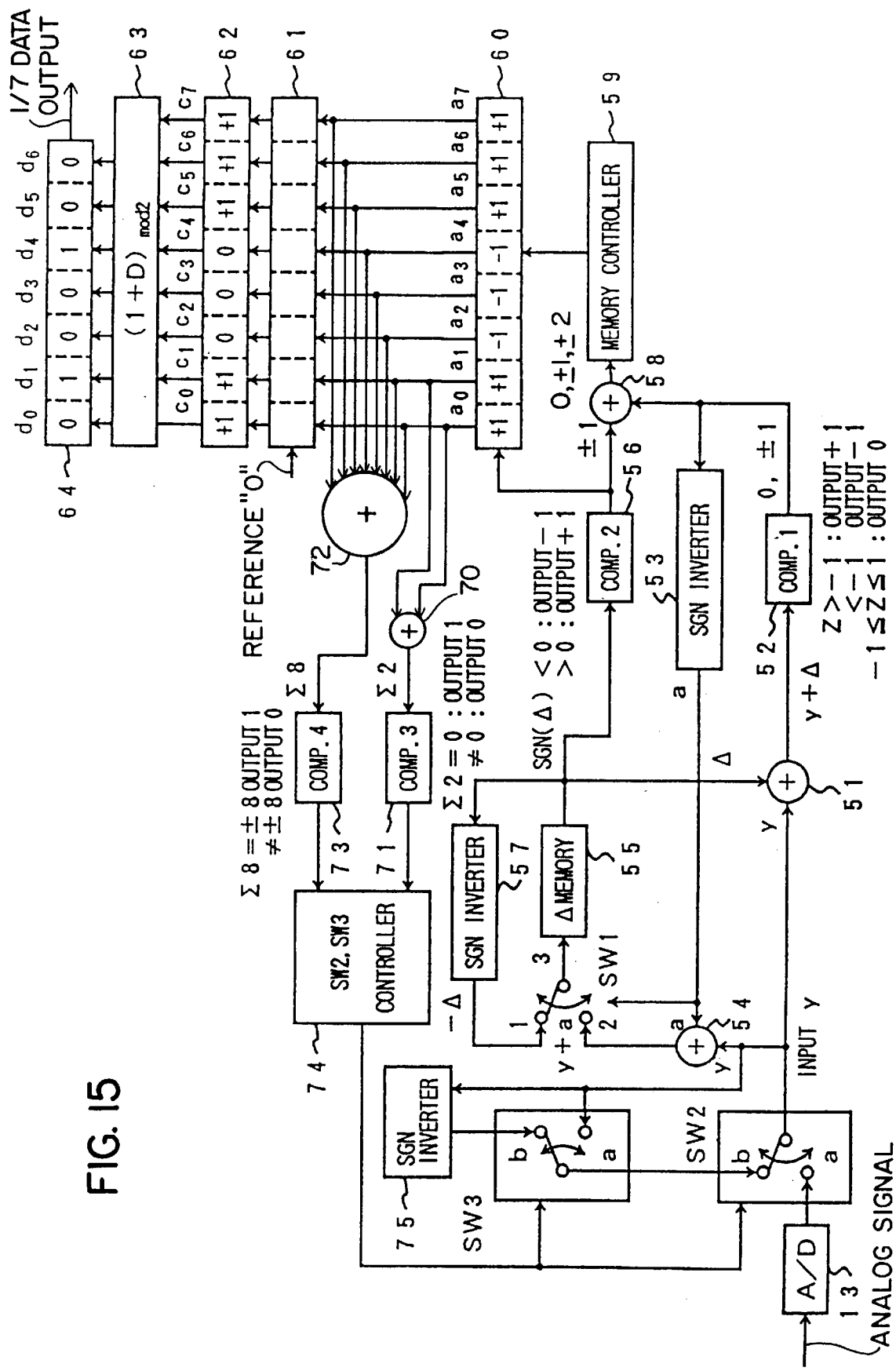
FIG. 15 is a block diagram illustrating another example of the structure of the maximum likelihood data detecting circuit.

The maximum likelihood data detecting circuit according to this embodiment is formed, for example, as shown in FIG. 15. Referring to FIG. 15, in the same manner as that shown in FIG. 13, there are provided the first adder 51, the first comparator 52, the first sign inverter 53, the second adder 54, the Δmemory 55, the second comparator 56, the second sign inverter 57, the switch SW1, the third adder 58, the memory controller 59, the data memory 60, the comparator 61, the register 62, the $(1+D)_{mod2}$ converter 63 and the output register 64. The maximum likelihood data detecting circuit also has a fourth adder 70, a third comparator 71, a fifth adder 72, a fourth comparator 73, a switch controller 74 and a switch SW2.

The fourth adder 70 adds the lowest bit $a_0$ and the next bit $a_1$ to each other, and supplies an adding result $\Sigma 2$ $(a_p+a_1)$ to the third comparator 71. The third comparator 71 outputs "1" when the adding result $\Sigma 2$ is equal to "0" ($\Sigma 2=0$), and outputs "0" when the adding result $\Sigma 2$ is not equal to "0" ($\Sigma 2 \neq 0$). The bits $a_0$ and $a_1$ and corresponding adding results may have the following values.

| $a_0$ | $a_1$ | $\Sigma 2$ |
|---|---|---|
| +1 | +1 | +2 |
| +1 | −1 | 0 |
| −1 | +1 | 0 |
| −1 | −1 | −2 |

Thus, when $a_0=+1$ and $a_1=-1$, and when $a_0=-1$ and $a_1=+1$, the third comparator 71 outputs "1". When $a_0=+1$ and $a_1=+1$, and when $a_0=-1$ and $a_1=-1$, the third comparator 71 outputs "0". A bit $d_0$ is obtained by the $(1+D)_{mod2}$ conversion using bits $c_0$ and $c_1$ of the register 62 corresponding to the bits $a_0$ and $a_1$. In this case, when the output of the third comparator 71 is "1", the bit $d_0$ is equal to "1" ($d_0=1$), and when the output of the third comparator 71 is "0", the bit $d_0$ is equal to "0" ($d_0=0$). To satisfy the above rule in which the next bit of a bit "1" must be "0", when the output of the third comparator 71 is "1", a value must be set in the bit $a_0$ by the next input data y so that the bit $d_0$ becomes "0" ($d_0=0$).

The fifth adder 72 adds all bits $a_0-a_7$ (8 bits) of the data memory 60, and supplies an adding result $\Sigma 8$ $(a_0+a_1+a_2+ \ldots +a_7)$ to the fourth comparator 73. The fourth comparator 73 outputs "1" when the adding result $\Sigma 8$ obtained by the fifth adder 72 is +8 or −8 ($\Sigma 8=\pm 8$), and outputs "0" when the adding result $\Sigma 8$ is neither +8 nor −8 ($\Sigma 8=\pm 8$). That is, when all bits $a_0-a_7$ of the data memory 60 are "+1" or "−1", the fourth comparator 73 outputs "1". In other cases, the fourth comparator 73 outputs "0". When all bits $a_0-a_7$ of the data memory 60 are "+1" or "−1", all bits $d_0-d_6$ of the 1/7 data are "0". Thus, to satisfy the rule in which the next bit of seven bits "0" continuously arranged must be "1", when the output of the fourth comparator is "1", a value must be set in the bit $a_0$ of the data memory 60 by the next input data y so that the bit $d_0$ becomes "1" ($d_0=1$).

The input data y from the A/D converter 13 is supplied to a terminal a of the switch SW2. The switch SW2 also has a terminal b connected to an output terminal of the switch SW3. An output terminal of the switch SW2 is connected to the first adder 51 and the second adder 54. The input data y input through the switch SW2 is further supplied to the third sign inverter 75, and the output of the third sign inverter 75 is connected to a terminal b of the switch SW3. The switch controller 74 receives outputs signals from the third comparator 71 and the fourth comparator 73 and carries out switching control of the switches SW2 and SW3 in accordance with these output signals so that the above conditions are satisfied. That is, the switch controller 74 carries out the switching control of the switches SW2 and SW3 in accordance with rules indicated in Table-2.

TABLE 2

| 3rd COMP. | 4-th COMP. | SW2 | SW3 |
|---|---|---|---|
| 0 | 0 | a | ... |
| 0 | 1 | b | b |
| 1 | 0 | b | a |
| 1 | 1 | a | ... |

Figure 16:
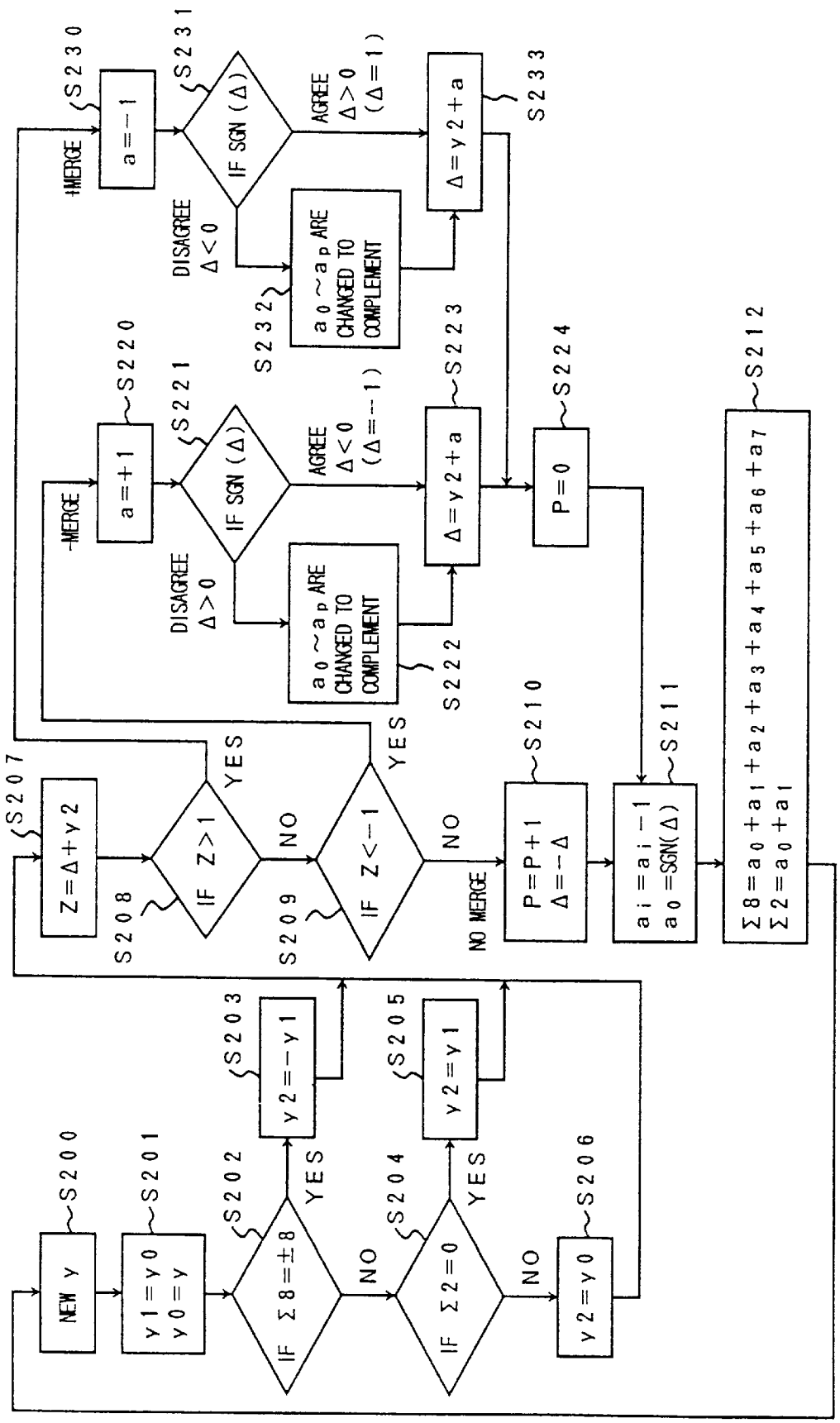
FIG. 16 is a flow chart illustrating a process executed in the maximum likelihood data detecting circuit shown in FIG. 15.

The maximum likelihood data detecting circuit formed as described above operates in accordance with a flow chart shown in FIG. 16.

Referring to FIG. 16, when new input data y is supplied to the maximum likelihood data detecting circuit (S200), input data $y_0$ supplied at the last time is defined as previous data $y_1$ and the new data y is defined as current data $y_0$ (S201). When the total sum $\Sigma 8$ of all bits $a_0-a_7$ of the data memory 60 is neither +8 nor −8 and the sum $\Sigma 2$ of the bits $a_0$ and $a_1$ is not "0" (the output of the third comparator 71 is "0" and the output of the fourth comparator 72 is "0") (S202 and S203), the current data $y_0$ is defined as data $y_2$ to be processed. That is, the switch SW2 selects the terminal a (see Table-2), so that current data $y_0$ is supplied as the data $y_2$ to be processed to the first adder 51 and the second adder 54 (S207, S223 and S233). In this case, the data $y_2$ is processed in the same manner as in the case described in FIGS. 13 and FIG. 14. That is, when it is determined that the state of the data transition is "+merge" (S208), the process is performed in accordance with steps S230, S231, S233, S224 and S211 in the same manner as in steps S120, S121, S123, S114 and S105 shown in FIG. 14. In this case, the respective bits $a_0-a_7$ of the data memory 60 are shifted by one bit, and the sign data $SGN(\Delta)$ of the reference value $\Delta(=y_2-1)$ stored in the $\Delta$memory 55 is set in the least significant bit $a_0$ of the data memory 60. The third and fourth adders 71 and 73 respectively output the adding results $\Sigma 2$ and $\Sigma 8$ using the updated bits $a_0-a_7$ (S212). When it is determined that the state of the data transition is "−merge" (S208 and S20-9), the process is performed in accordance with steps S220, S221, S223, S224 and S211 in the same manner as in steps S110, S111, S113, S114 and S105 shown in FIG. 14. In this case, the respective bits $a_0-a_7$ are shifted and the sign data $SGN(\Delta)$ of the reference value $\Delta(=y_2+1)$ stored in the $\Delta$memory 55 in step S223 is set in the least significant bit $a_0$ of the data memory 60. Furthermore, when it is determined that the state of the data transition is "no merge" (S208 and S209), the process is performed in accordance with steps S210, S211 and S212 in the same as in steps S104 and S105 shown in FIG. 14. That is, the pointer P is incremented by one and the reference value $\Delta$ whose sign is inverted by the second sing inverter 57 is stored in the $\Delta$memory 55. The respective bits $a_0-a_7$ are then shifted and the sign data $SGN(\Delta)$ of the reference value $\Delta(=-\Delta)$ stored in the $\Delta$memory 55 in step S210 is set in the least significant bit $a_0$ of the data memory 55.

On the other hand, when the sum $\Sigma 2$ of the bits $a_0$ and $a_1$ of the data memory 60 is "0" (S202 and S204), that is, when the output of the third comparator 71 is "1" and the output of the fourth comparator 73 is "0", the switch SW2 is switched from the terminal a to the terminal b and the switch SW3 selects the terminal a (see Table-2). As a result, the input data y supplied at the last time is supplied to the first adder 51 again via the switches SW3 and SW2. That is, the previous data $y_1$ is defined as the data $y_2$ to be processed (S205). What the sum $\Sigma 2$ of the bits $a_0$ and $a_1$ is "0" means that the bits $a_0$ and $a_1$ obtained at the last time differ from each other (+1 and −1). In this case, the least significant bit $d_0$ of the 1/7 data is equal to "1". As described above, in a case where the previous data $y_1$ is defined as the data $y_2$ to be processed, the value of the bit $a_0$ obtained at this time is equal to the value of the bit $a_0$ which was obtained at the last time (that is, the value of the bit $a_1$ obtained at this time). In this case, since the corresponding bits $c_0$ and $c_1$ of the comparator 61 are equal to each other, the least significant bit $d_0$ of the new 1/7 data is equal to "0". That is, the 1/7 run length limitation rule that one or more bit "0" exists between bits "1" is satisfied.

As has been described above, in the case where the sum $\Sigma 2$ of the bits $a_0$ and $a_1$ is "0", the previous data $y_1$ is defined as the data $y_2$ to be processed even if any data $y$ is supplied, so that the 1/7 run length limitation rule is satisfied.

In addition, when the total sum $\Sigma 8$ of all the bits $a_0$–$a_7$ of the data memory 60 is "+8" or "–8" (S202), that is, when the output of the third comparator 71 is "0" and the output of the fourth comparator 73 is "1", the switch SW2 maintains a state where the terminal b is selected and the switch SW3 switches from the terminal a to the terminal b (see Table-2). As a result, the input data y is supplied to the first adder 51 via the third sign inverter 75, the switch SW3 and the switch SW2. That is, data $-y_1$ having the sign to which the sign of the previous data $y_1$ is inverted is defined as the data $y_2$ to be processed (S203). What the total sum $\Sigma 8$ of all the bits $a_0$–$a_7$ of the data memory 60 is equal to "+8" or "–8" means that the values of the all the bits $a_0$–$a_7$ are equal to each other. In this case, all the seven bits $d_0$–$d_6$ of the 1/7 data are equal to "0". In the case where the data $-y_1$ having the sign to which the sign of the previous data $y_1$ is inverted is defined as the data $y_2$ to be processed as has described above, the value of the bit $a_0$ obtained at this time differs from the value of the bit $a_0$ obtained at the last time (that is, the value of the bit $a_1$ obtained at this time). In this case, since the corresponding bits $c_0$ and the $c_1$ differ from each other ("1" and "0" or "0" and "1"), the least significant bit $d_0$ of the new 1/7 data is "1". That is, the 1/7 run length limitation rule that eight or more bits "0" are not continuously arranged is satisfied.

As has been described above, in the case where the total sum $\Sigma 8$ of the all the bits $a_0$–$a_7$ of the data memory 60 is equal to "8" or "–8", the data $-y_1$ having the sign to which the sign of the previous data $y_1$ is inverted is defined as the data $y_2$ to be processed even if any data $y$ is supplied, so that the 1/7 run length limitation rule is satisfied.

When the comparison result SGN(Δ) (the sign data) obtained by the second comparator 56 differs from the value which should be properly obtained in cases where the data transition state is "+merge" and "–merge", the values of the bit $a_0$ to $a_p$ identified by the pointer P are changed to the complements thereof, in the same manner as in the case shown in FIGS. 13 and 14.

According to the above embodiment, since the maximum likelihood data detection is carried out in consideration of the 1/7 run length limitation rule, further accurate data can be reproduced from the optical disk.

In the above embodiment, it is determined, based on the sum of the bits $a_0$ and $a_1$ of the data memory 60, whether or not the least significant bit do of the 1/7 data is equal to "0". Furthermore, it may also be determined, based on the value of the output bits $c_0$ and $c_1$ of the comparator 61, whether or not the bit $d_0$ is "0". The exclusive logical sum of the output bits $c_0$ and $c_1$ ($c_0$ EOR $c_1$) of the comparator 61 has the following values.

| $a_0$ | $a_1$ | $c_0$ | $c_1$ | $c_0$ EOR $c_1$ |
|---|---|---|---|---|
| +1 | +1 | 1 | 1 | 0 |
| +1 | −1 | 1 | 0 | 1 |
| −1 | +1 | 0 | 1 | 1 |
| −1 | −1 | 0 | 0 | 0 |

When the exclusive logical sum ($c_0$ EOR $c_1$) is "0", the least significant bit $d_0$ of the 1/7 data is "0". Thus, it can be determined, based on the exclusive logical sum ($c_0$ EOR $c_1$) of the output bits $c_0$ and $c_1$ of the comparator 61, whether or not the least significant bit $d_0$ of the 1/7 data.

Still further, the switches SW2 and SW3 can be directly controlled based on the value of the least significant bit $d_0$ of the 1/7 data stored in the output register 64.

A description will now be given, with reference to FIGS. 17 and 18, an embodiment of the maximum likelihood data detecting circuit in which the maximum likelihood data detection is performed in consideration to a 2/7 run length limitation rule. In this case, the data has been written in the optical disk by the recording system in accordance with the 2/7 run length limitation rule.

In a bit sequence having bits arranged in accordance with the 2/7 run length limitation rule, two or more bits "0" exist between bits "1" and eight or more bits "0" are not continuously arranged between the bits "1". According to this rule, the next bit of a bit "1" is always "0", the next bit of a bit sequence "1, 0" is always "0" and the next bit of seven bits "0" continuously arranged is always "1". From the input data, the data in which bits are arranged in accordance with this 2/7 run length limitation rule (hereinafter referred to as 2/7 data) is decoded.

Figure 17:
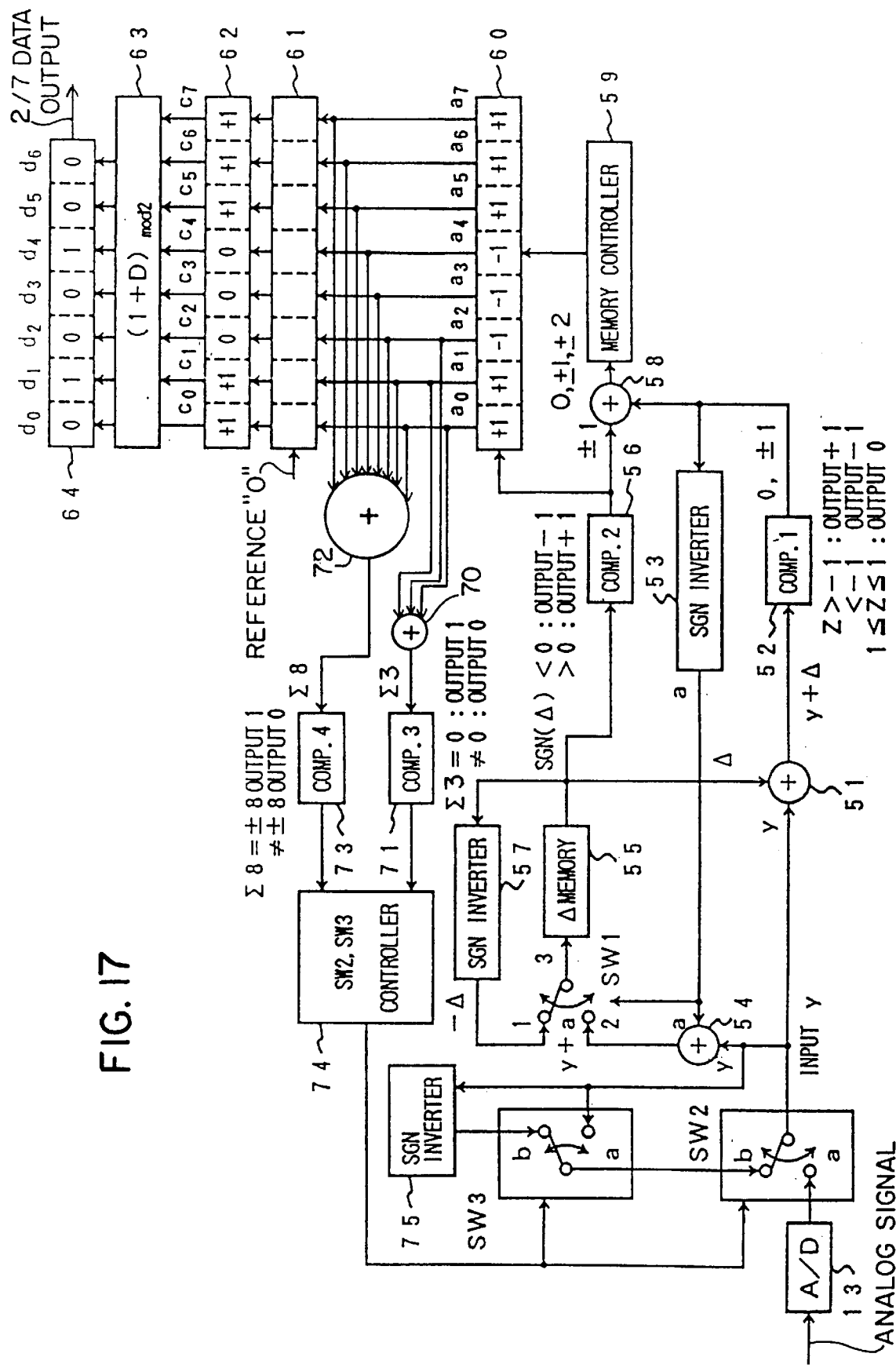
FIG. 17 is a block diagram illustrating still another example of the structure of the maximum likelihood data detecting circuit.

The maximum likelihood data detecting circuit according to this embodiment is formed, for example, as shown in FIG. 17. In FIG. 17, those parts which are the same as those shown in FIG. 15 are given the same reference numbers. In this embodiment, an adder 70' is substituted for the fourth adder 70 shown in FIG. 15. This adder 70' adds the least significant bit $a_0$ of the data memory 60, the second bit $a_1$, and the third bit $a_2$ thereof to each other. A adding result $\Sigma 3$ ($a_0+a_1+a_2$) obtained by the adder 70' is supplied to the third comparator 71. In the same manner as in the case shown in FIG. 15, the third comparator 71 outputs "1" when the adding result $\Sigma 3$ is equal to "0" ($\Sigma 3=0$) and outputs "0" when the adding result $\Sigma 3$ is not equal to "0" ($\Sigma 3 \neq 3$). The bits $a_0$, $a_1$ and $a_2$ and the corresponding adding results $\Sigma 3$ have the following values.

| $a_0$ | $a_1$ | $a_2$ | $\Sigma 3$ |
|---|---|---|---|
| +1 | +1 | +1 | +2 |
| +1 | +1 | −1 | 0 |
| +1 | −1 | +1 | +2 |
| −1 | +1 | +1 | 0 |
| +1 | −1 | −1 | 0 |
| −1 | +1 | −1 | −2 |
| −1 | −1 | +1 | 0 |
| −1 | −1 | −1 | −2 |

Thus, the third comparator 71 outputs "1" when ($a_0$, $a_1$, $a_2$)=(+1, +1, −1), (−1, +1, +1), (+1, −1, −1) or (−1, −1, +1), and outputs "0" when ($a_0$, $a_1$, $a_2$)=(+1, +1, +1), (+1, −1, +1), (−1, +1, −1) or (−1, −1, −1). The outputs bits $c_0$, $c_1$ and $c_2$ of the comparator 61 corresponding to the above bits $a_0$, $a_1$ and $a_2$ and corresponding bits $d_0$ and $d_1$ of the 2/7 data have the following values.

| $a_0$ | $a_1$ | $a_2$ | $c_0$ | $c_1$ | $c_2$ | $d_0$ | $d_1$ |
|---|---|---|---|---|---|---|---|
| +1 | +1 | +1 | 1 | 1 | 1 | 0 | 0 |
| +1 | +1 | −1 | 1 | 0 | 0 | 0 | 1 |
| +1 | −1 | +1 | 1 | 0 | 1 | 1 | 1 |
| −1 | +1 | +1 | 0 | 1 | 1 | 1 | 0 |
| +1 | −1 | −1 | 1 | 0 | 0 | 1 | 0 |
| −1 | +1 | −1 | 0 | 1 | 0 | 1 | 1 |
| −1 | −1 | +1 | 0 | 0 | 1 | 0 | 1 |
| −1 | −1 | −1 | 0 | 0 | 0 | 0 | 0 |

To satisfy the above rule in which the next bit of a bit "1" is always "0" and the next bit of the bit sequence "1, 0" is always "0", when the output of the third comparator 71 is "1", a value making the least significant bit $d_0$ of the 2/7 data be equal to "0" must be set in the bit $a_0$ of the data memory 60 at a time when the next data y is input.

The fifth adder 72 and the fourth comparator 73 determine, in the same manner as those shown in FIG. 15, whether or not there are seven bits "0" continuously arranged in the reproduced 2/7 data ($d_0$–$d_6$).

To carry out the maximum likelihood data detection in consideration to the 2/7 run length limitation rule described above, the switch controller 74, in the same manner as that shown in FIG. 15, receives output signals from the third comparator 71 and the fourth comparator 73 and controls the switches SW2 and SW3 in accordance with the rule indicated in Table-2.

Figure 18:
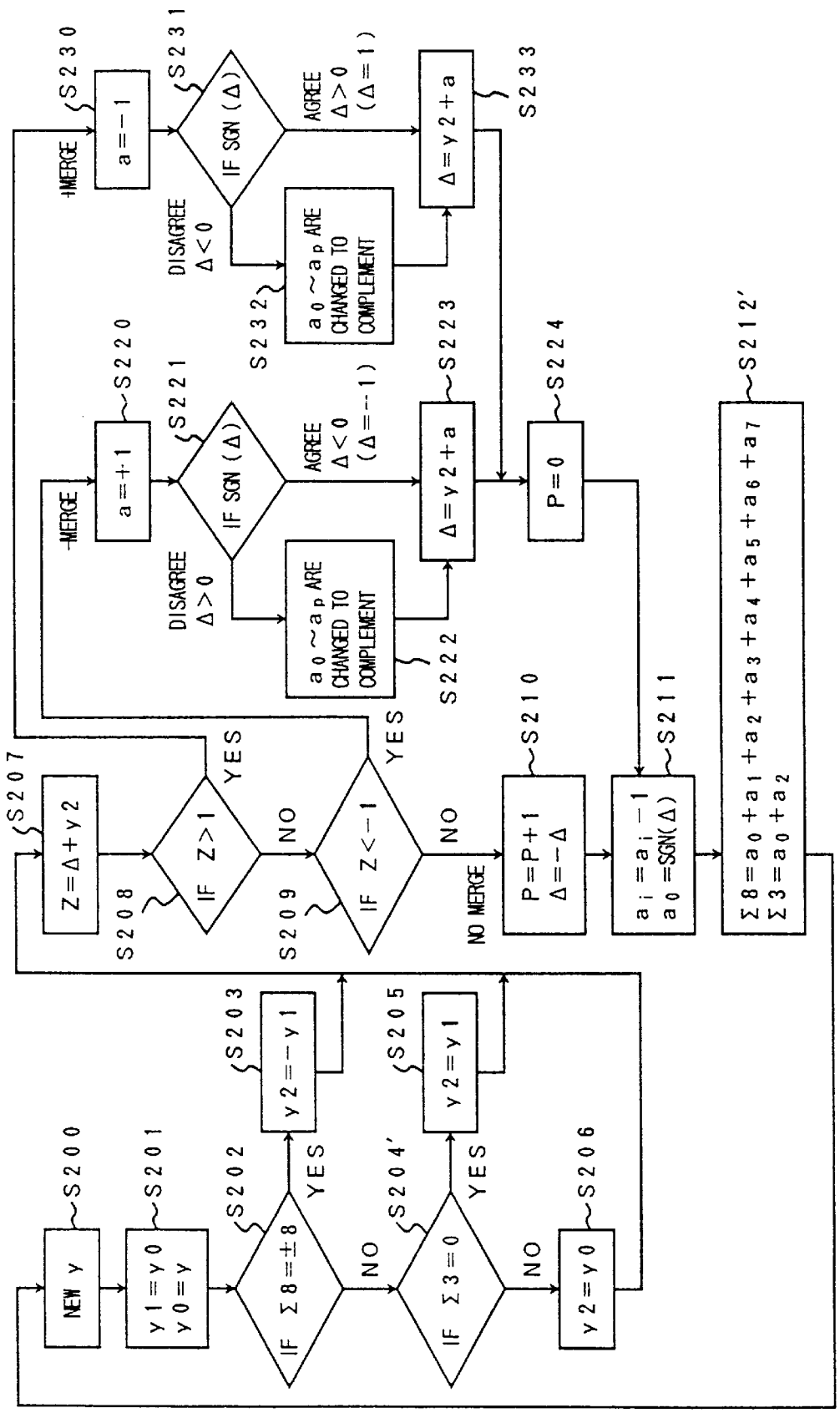
FIG. 18 is a flow chart illustrating a process executed in the maximum likelihood data detecting circuit shown in FIG. 17.

The maximum likelihood data detecting circuit formed as described above operates in accordance with a flow chart shown in FIG. 18.

The operation is almost the same as that shown in FIG. 16. That is, when the outputs of the third comparator 71 and the fourth comparator 73 are "0" (S202 and S204'), the normal maximum likelihood data detection is performed. Also in a case, corresponding to an unrealized case of ($d_0$, $d_1$)=(1, 1), in which ($a_0$, $a_1$, $a_2$)=(+1, −1, +1) or (−1, +1, −1), the output of the third comparator 71 is "0". In this embodiment, if this case occurs, the system accepts this state (without correction) and carries out the normal maximum likelihood data detection.

On the other hand, if the output of the third comparator 71 is "1" and the output of the fourth comparator is "0", the previous data $y_1$ is defined as the data $y_2$ to be processed so that the least significant bit $d_0$ of the 2/7 data is "0". In addition, if the output of the third comparator 71 is "0" and the output of the fourth comparator 73 is "1", data −$y_1$ having the sign to which the sign of the previous data $y_1$ is inverted is defined as the data $y_2$ to be processed so that the least significant bit $d_0$ of the 2/7 data is "1".

In the above embodiment, it can be determined, based on the exclusive logical sum of the output bits $c_0$ and $c_1$ of the comparator 61 ($c_0$ EOR $c_1$) or the exclusive logical sum of the least significant bit $d_0$ and the second bit $d_1$ of the 2/7 data ($d_0$ EOR $d_1$), whether the least significant bit $d_0$ of the 2/7 data should be set to "0" (($d_0$, $d_1$)=(0,1) or (1,)).

According to this embodiment, since the maximum likelihood demodulation is carried out in consideration of the 2/7 run length limitation rule, further accurate data can be reproduced from the optical disk.

Figure 19:
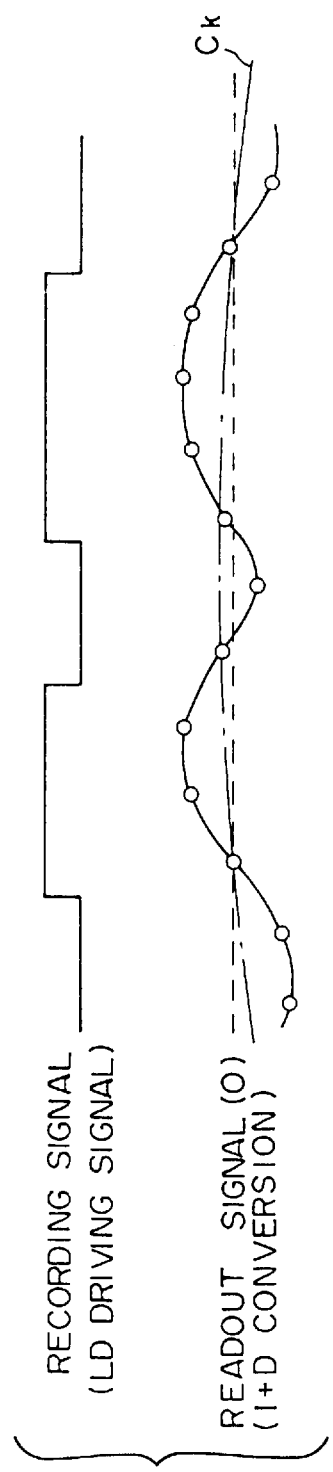
FIG. 19 is a waveform chart illustrating a reproduction signal including an envelope variation.

Now, the reproduction signal of the optical disk has a frequency band including a DC component. An actual circuit for processing the reproduction signal limits, to eliminate influence of DC offset, the frequency band to that from which low frequencies including the DC band are eliminated. As a result, the waveform of the signal processed by the circuit varies in a low frequency band according to the recording pattern. In addition, since a polycarbonate substrate, having large variation of reflected lights based on the birefringence, is apt to be used for the optical disk, the envelope of the reproduction signal varies, so that the margin of the detected signal (the slice detection) is lowered. That is, as shown in FIG. 19, the reproduction signal corresponding to the recording signal (the LD driving signal) does not vary in a zero level as the fixed center level, but the center level $C_k$ thereof slowly varies. If the reproduction signal varies in a direction of the amplitude thereof at a time of A/D converting due to the low frequency component variation and the envelope variation based on the DC component of the reproduction signal, the adding value Z of the reference value Δ and the sampling value y which is obtained in the maximum likelihood data detection shown in FIG. 14 emphasizes the DC component. In addition, since the detected data corresponds to the sign data SGN(Δ) representing the sign of the reference value Δ, the DC component of the reproduction signal affects the sign data SGN(Δ). As a result, the system fails to detect accurate data, so that the error rate deteriorates.

Further, in the maximum likelihood data detecting circuit 14 described above, to modulate the detected data into data, prior to the preceding, applied to the run length limitation rule, the detected data must be converted by the $(1+D)_{mod2}$ converting process. The $(1+D)_{mod2}$ conversion is carried out by using two data items detected at continuous timings (see FIG. 12B (18)). Thus, if one detected data item is in error, two modulated data items are in error.

In the following embodiment, the above disadvantages are eliminated.

Figure 20:
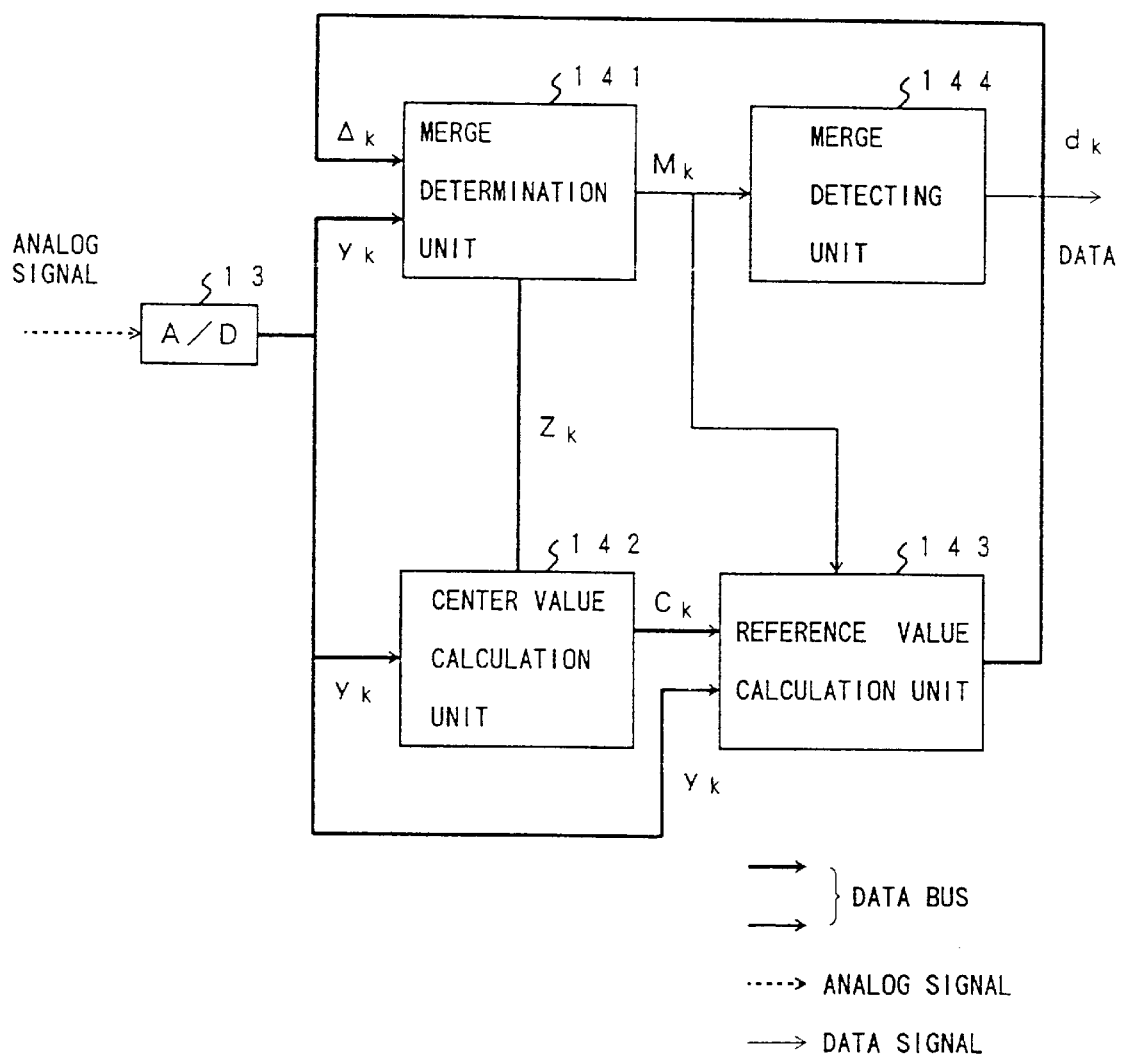
FIG. 20 is a block diagram illustrating another example of the structure of the maximum likelihood data detecting circuit.

The maximum likelihood data detecting circuit 14 according to this embodiment is formed as shown in FIG. 20. Referring to FIG. 20, the maximum likelihood data detecting circuit 14 has a merge determination unit 141, a center value calculation unit 142, a reference value calculation unit 143 and a merge detecting unit 144. The merge determination unit 141 carries out merge determination of input data $y_k$ by using the input data $y_k$ from the A/D converter 13 and a reference value $\Delta_k$ from the reference value calculation unit 143 which will be described later, and outputs a determination value $M_k$.

Figure 21:
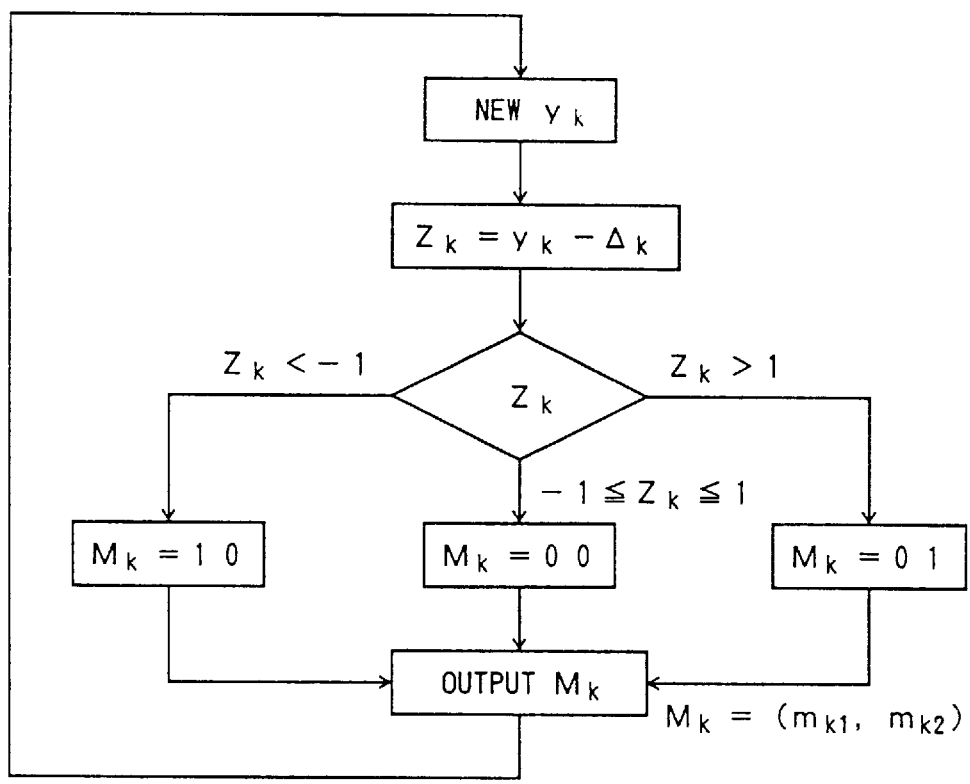
FIG. 21 is a flow chart illustrating a process executed in a merge determination unit of the maximum likelihood data detecting circuit shown in FIG. 20.
Figure 25:
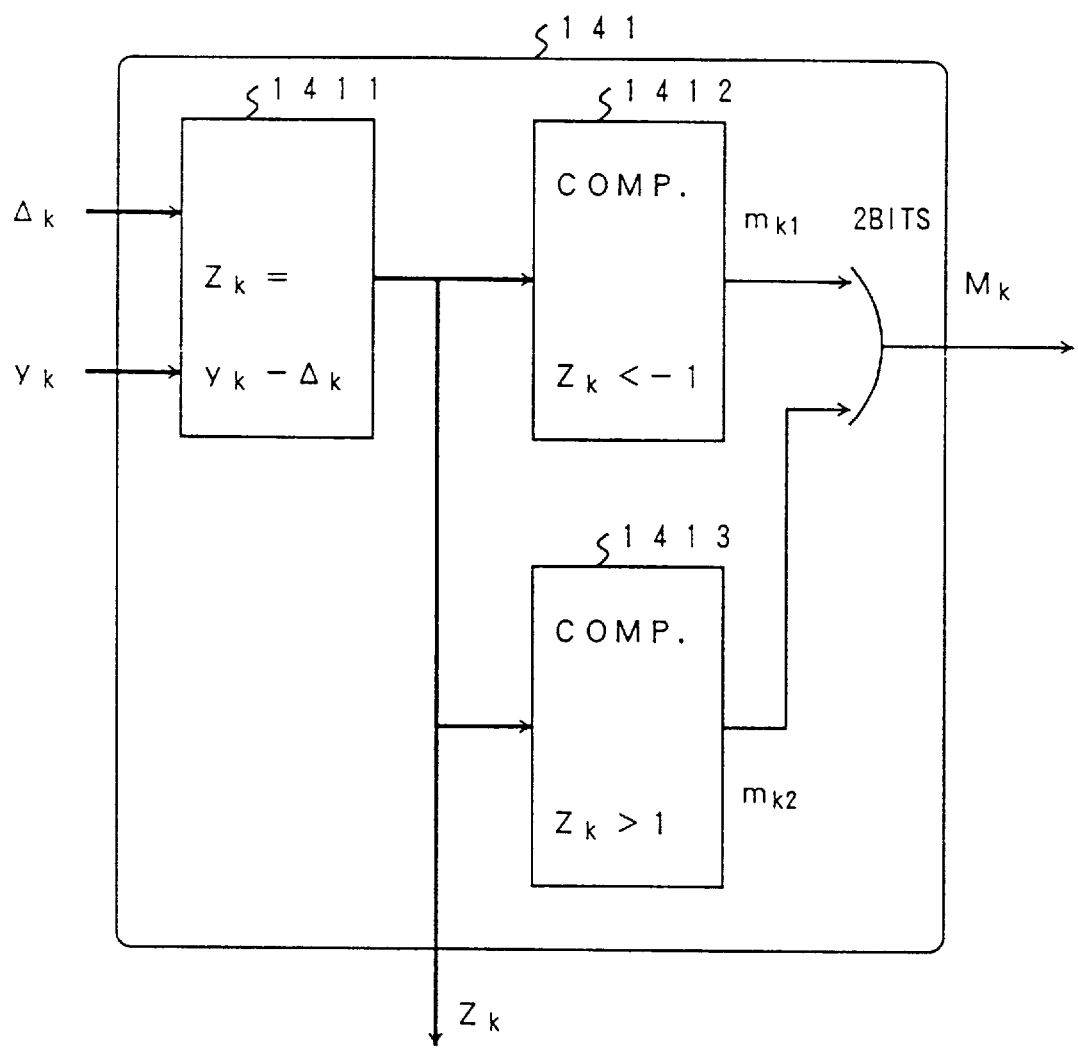
FIG. 25 is a block diagram illustrating a structure of the merge determination unit.

The merge determination unit 141 carries out a process in accordance with a flow shown in FIG. 21. That is, $Z_k$ (=$y_k$−$\Delta_k$) is calculated by using new input data $y_k$ and the reference value $\Delta_k$, it is determined, in accordance with the value, which the state of the input data is in "+merge", "−merge" or "no merge". In the "+merge" ($Z_k$>1), a determination value $M_k$=($m_{k1}$, $m_{k2}$)=01 is output, and in the "−merge" ($Z_k$<−1), a determination value $M_k$=10 is output. Furthermore, in the "no merge" (−1≦$Z_k$≦1), a determination value $M_k$=00 is output. The process in the merge determination unit 141 corresponds to steps S100–S103 shown in FIG. 14. To carry out the above process, the merge determination unit 141 has, for example, a subtracter 1411 ($Z_k$=$y_k$−$\Delta_k$), a first comparator 1412 ($Z_k$<−1) and a second comparator 1413 ($Z_k$>1), as shown in FIG. 25.

Figure 22:
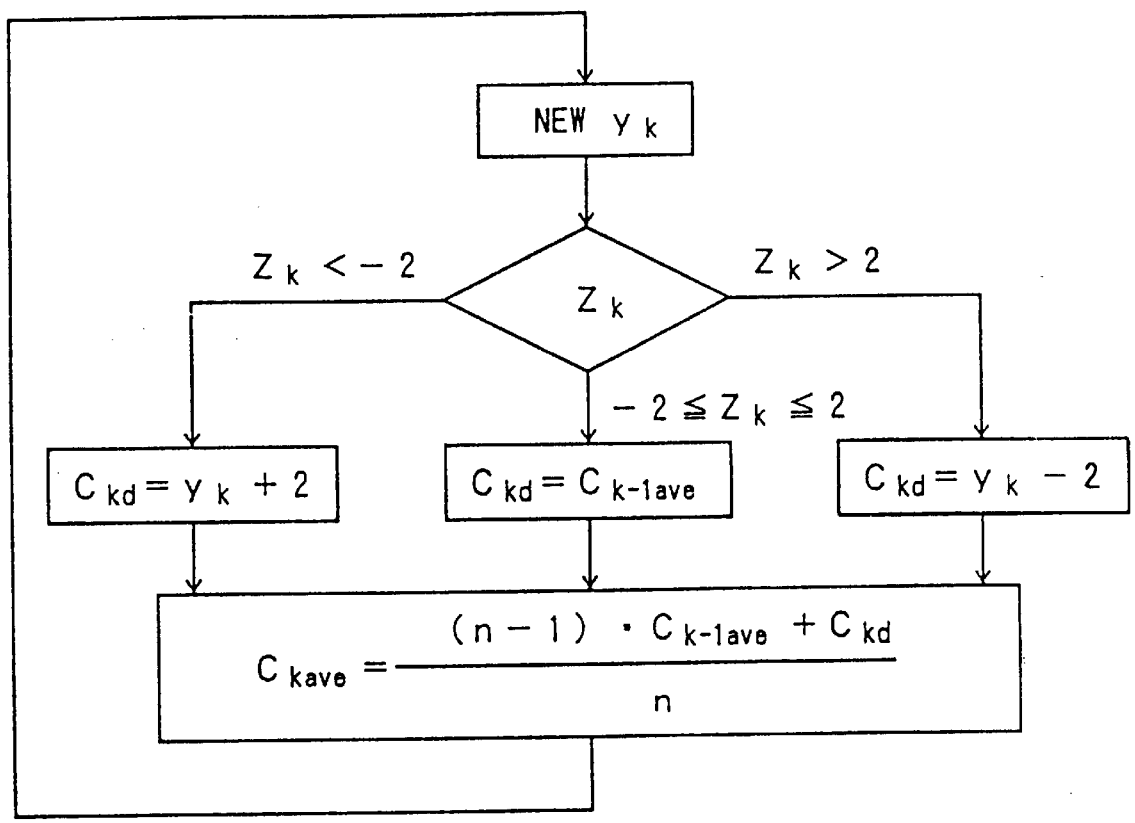
FIG. 22 is a flow chart illustrating a process executed in a center value calculation unit of the maximum likelihood data detecting circuit shown in FIG. 20.

The center value calculation unit 142 carries out a process in accordance with a flow shown in FIG. 22. That is, when new input data $y_k$ is supplied from the A/D converter 13, center value data $C_{kd}$ is calculated depending on the $Z_k$ value obtained in the merge determination unit 141 is calculated. In a case of $Z_k$>2, the center value data $C_{kd}$ is calculated by an equation:

$$C_{kd}=y_k-2.$$

In a case of −2≦$Z_k$≦2, the center value data $C_{kd}$ is calculated by an equation:

$$C_{kd}=C_{k-lave}.$$

Further, in a case of $Z_k<-2$, the center value data $C_{kd}$ is calculated by an equation:

$$C_{kd}=y_k+2.$$

The case of $Z_k>2$ means that the input data $y_k$ is certainly in the "+merge" state. Thus, in this case, by subtracting the ideal amplitude value "2" of the reproduction signal from the input data $y_k$, the center value data $C_{kd}$ is obtained (see FIG. 12A (6)). The case of $Z_k<-2$ means that the input data $y_k$ is certainly in the "−merge" state. Thus, in this case, by subtracting the negative ideal amplitude value "−2" from the input data $y_k$, the center value data $C_k$ is obtained. The case of $-2 \leq Z_k \leq 2$ means that it is not determined whether the input data is in the "+merge" state or the "−merge" state (including "no merge" state). Thus, the center value $C_{k-lave}$ which has been calculated in the last time as will be described later is used as the center value data $C_{kd}$. The center value $C_{kave}$ is calculated by the following equation using the center value data $C_{kd}$ calculated as described above and the center value $C_{k-lave}$ which has been obtained at the last time:

$$C_{kave}=[(n-1)C_{k-lave}+C_{kd}]/n$$

The center value $C_{kave}$ calculated as described above corresponds to an average of n center value data items $C_{kd}$. A curve connecting the center value data items $C_{kd}$ represents the center level $C_k$ of the reproduction signal shown in FIG. 19.

Figure 27:
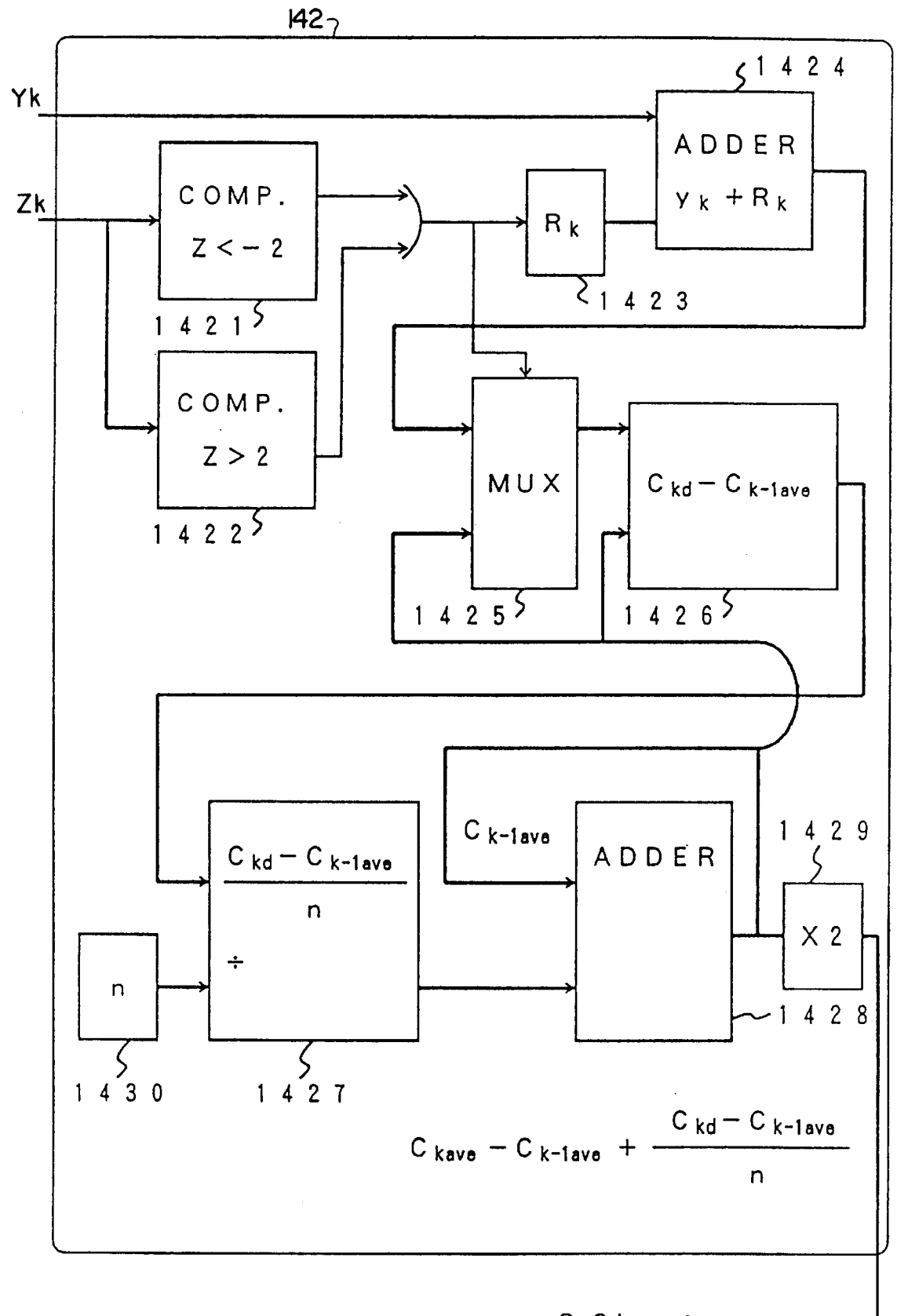
FIG. 27 is a block diagram illustrating the center value calculation unit.

To carry out the above process, the center value calculation unit 142 is formed, for example, as shown in FIG. 27. Referring to FIG. 27, the center value calculation unit 142 has a first comparator 1421 for determining whether or not $Z_k$ is less than "−2" ($Z_k<-2$), a second comparator 1422 for determining whether or not $Z_k$ is greater than "2" ($Z_k>2$), a constant output circuit 1423 ($R_k$), an adder 1424, a multiplexer 1425, a subtracter 1426, a divider 1427, an adder 1428, a multiplier 1429 and a register 1430 in which a count value n is to be set. The constant output circuit 1423 outputs a constant $R_k$ (eight bits) depending on the determination result 11 from the first comparator 1421 and the determination result 12 form the second comparator 1422. This constant $R_k$ is "−2" (11=0 and 12=1) or "+2" (11=1 and 12=0). The adder 1424 adds the input data $y_k$ and the constant $R_k$ (−2 or 2) to each other. The multiplexer 1425 selects, as the center value data $C_{kd}$, the adding result ($y_k+R_k$) from the adder 1424 or the center value $C_{k-lave}$ which has been calculated in the last time by the adder 1428 in accordance with the determination result $L_k=(11, 12)$ from the first comparator 1421 and the second comparator 1422. When the determination result $L_k=(11, 12)$ is equal to $(0, 0)$ (corresponding to the "no merge" state), the center value $C_{k-lave}$ which has been calculated in the last time is selected. The subtracter 1426 then subtracts the center value $C_{k-lave}$ from the center value data $C_{kd}$ supplied from he multiplexer 1425. The divider 1427 divides the calculation result ($C_{kd}-C_{k-lave}$) from the subtracter 1426 by the count value n set in the register 1430 and outputs a calculating value ([$C_{kd}-C_{k-lave}$]/n). The adder 1428 adds the calculating value ([$C_{kd}-C_{k-lave}$]/n) and the center value $C_{k-lave}$ which has been calculated in the last time and outputs a current center value $C_{kave}$ represented by the following formula:

$$C_{kave}=C_{k-lave}+[C_{kd}-C_{k-lave}]/n.$$

The multiplier 1429 doubles the center value $C_{kave}$ from the adder 1428 and outputs a value $2C_{kave}$. The value $2C_{kave}$ which is doubled center value $C_{kave}$ is used in the reference value calculation unit 143.

Figure 23:
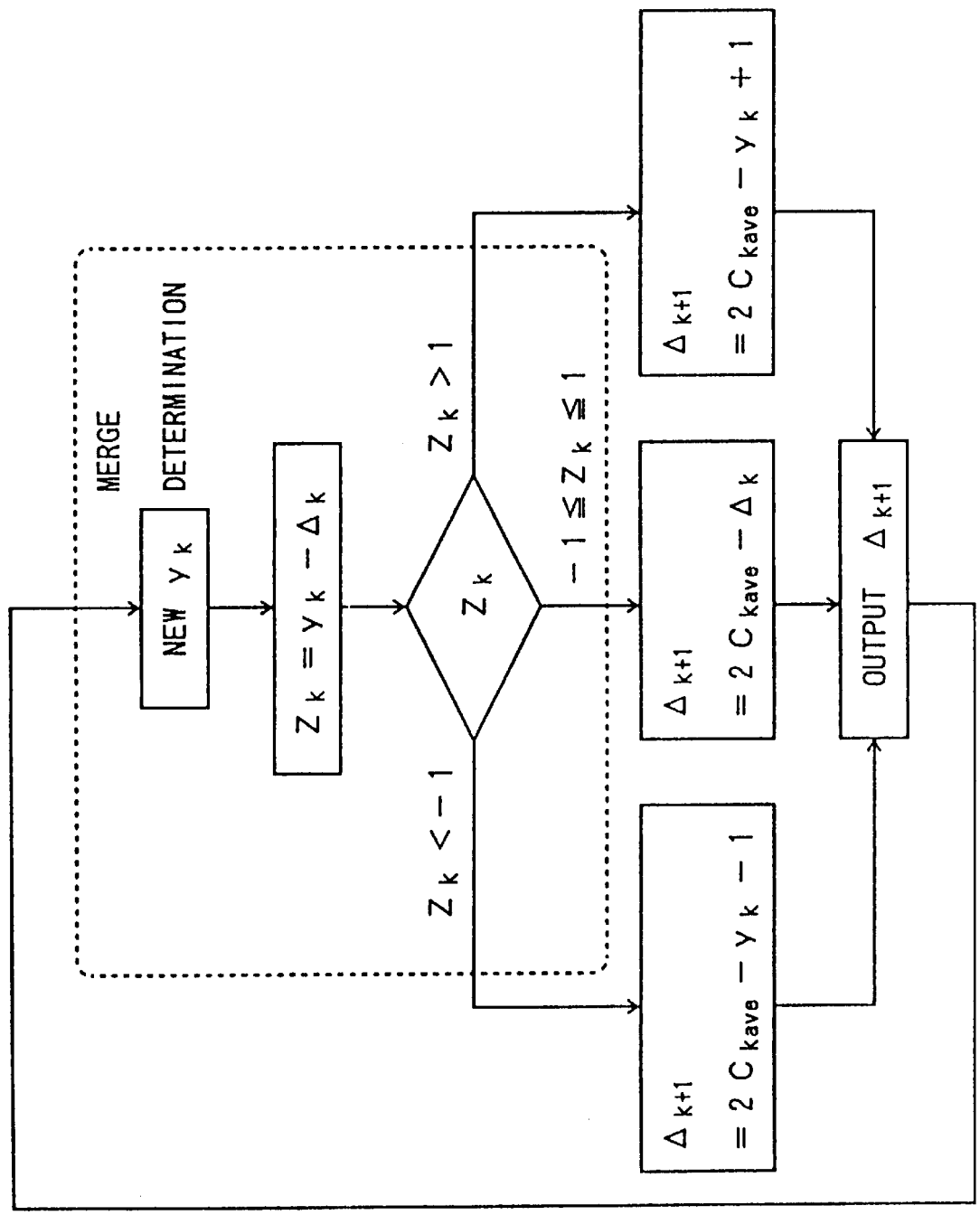
FIG. 23 is a flow chart illustrating a process executed in a reference value calculation unit of the maximum likelihood data detecting circuit shown in FIG. 20.

The reference value calculation unit 143 carries out a process in accordance with a flow shown in FIG. 23. That is, the reference value calculation unit 143 outputs the reference value $\Delta_{k+1}$ depending on the determination value $M_k$ from the merge determination unit 141. In a case of $M_k=01$ ($Z_k>1$: +merge), the reference value $\Delta_{k+1}=2C_{kave}-y_k+1$ is output from the reference value calculation unit 143. In a case of $M_k 10$ ($Z_k<-1$: −merge), reference value $\Delta_{k+1}=2C_{kave}-y_k-1$ is output from the reference value calculation unit 143. Further, in a case of $M_k=00$ ($-1<Z_k<1$: no merge), the reference value $\Delta_{k+1}=2C_{kave}-\Delta_k$ is output from the reference value calculation unit 143. The reference values $(\Delta_{k+1}=y_k-1)$, $(\Delta_{k+1}=y_K+1)$ and $(\Delta_{k+1}=\Delta_k)$ obtained by the process shown in FIG. 14 are respectively corrected by using the center value $C_{kave}$ so that the above reference values $\Delta_{k+1}$ are obtained.

Figure 26:
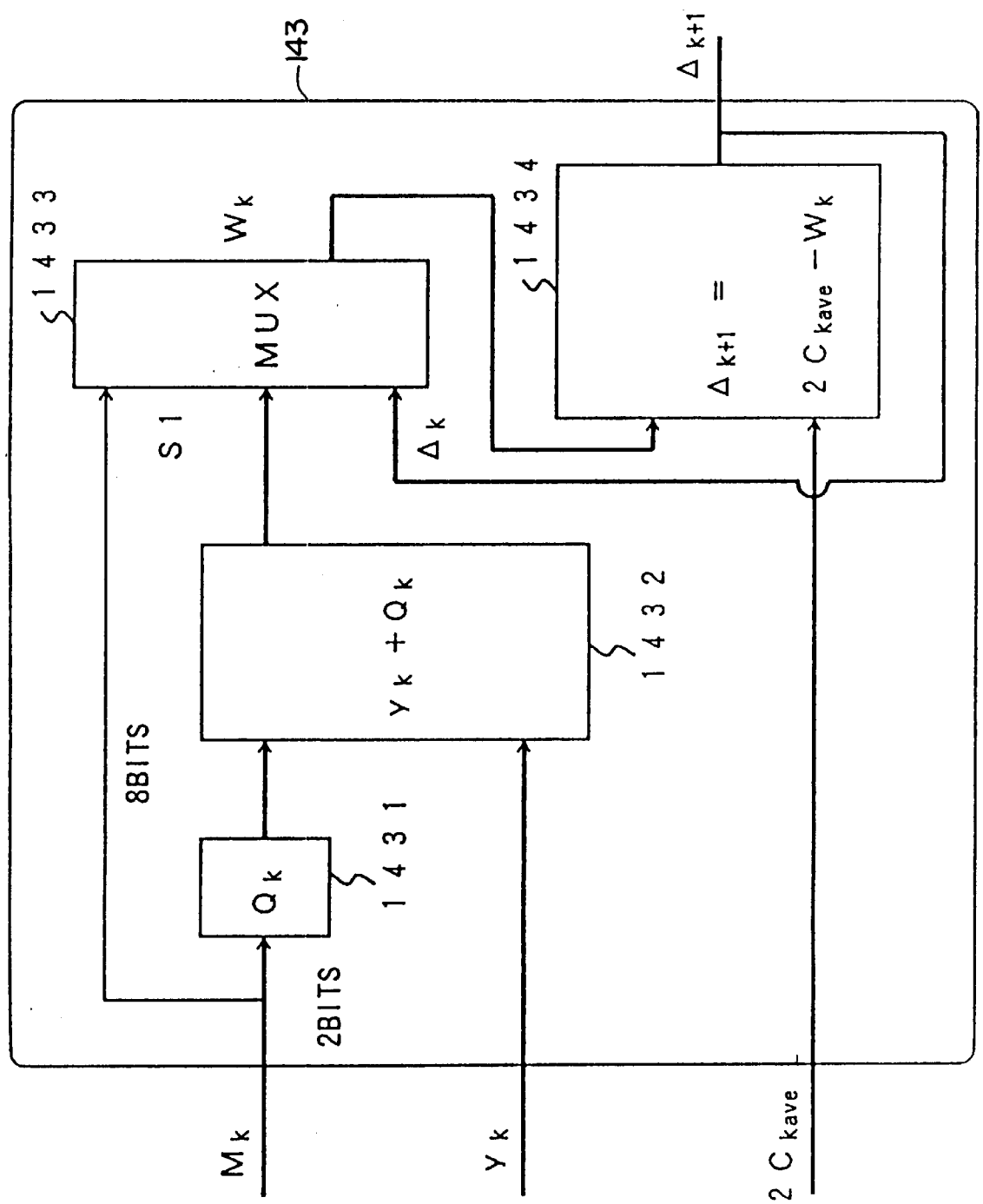
FIG. 26 is a block diagram illustrating a structure of the reference value calculation unit.

To carry out the above process, the reference value calculation unit 143 is formed, for example, as shown in FIG. 26. That is, the reference value calculation unit 143 has a constant output circuit 1431, an adder 1432, a multiplexer 1433 and a subtracter 1434. The constant output circuit 1431 outputs a constant $Q_k$ (eight bits) depending on the determination value $M_k$. In a case of $M_k=01$ (+merge), a constant $Q_k=-1$ is output from the constant output circuit 1431. In a case of $M_k=10$ (−merge), a constant $Q_k=1$ is output from the constant output circuit 1431. Further, in a case of $M_k=00$ (no merge), a constant $Q_k=0$ is output from the constant output circuit 1431. The adder 1432 adds the input data $y_k$ and the constant $Q_k$ from the constant output circuit 1431 and outputs an adding value ($y_k+Q_k$). The multiplexer 1433 selects, in accordance with the determination value M from the merge determination unit 141, the adding value ($y_k+Q_k$) from the adder 1432 or the reference value $\Delta_k$ from the subtracter 1434 which has been calculated in the last time. That is, in the cases of $M_k=01$ and $M_k=10$, the adding value ($y_k+Q_k$) is selected, and in the case of $M_k=00$, the reference value $\Delta_k$ which has been calculated in the last time is selected. The subtracter 1434 subtracts a value $W_k$ ($y_k+Q_k$ or $\Delta_k$) selected by the multiplexer 1433 from the value $2C_{kave}$ supplied from the center value calculation unit 142 and outputs the next reference value $\Delta_{k+1}$.

The merge detecting unit 144 detects, based on the determination value $M_k$ from the merge determination unit 141, that the state of the input data $y_k$ is changed from "−merge" to "+merge" and from "+merge" to "−merge".

Figure 24:
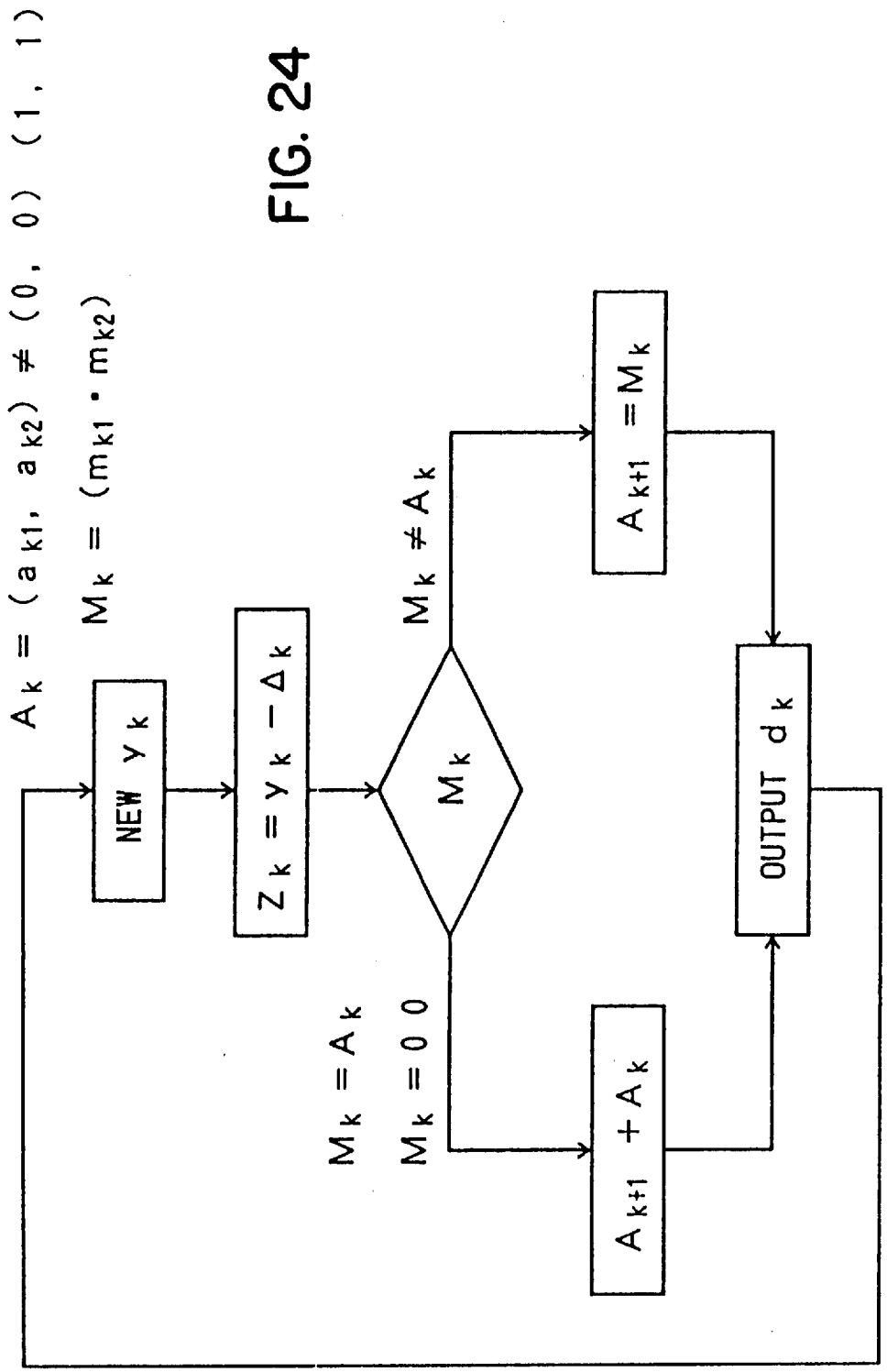
FIG. 24 is a flow chart illustrating a process executed in a merge detecting unit of the maximum likelihood data detecting circuit shown in FIG. 20.

The merge detecting unit 144 carries out a process in accordance with a flow shown in FIG. 24. In the process, a variable $A_k=(a_{k1}, a_{k2})\neq(0, 0)$ and $(1, 1)$ is defined. In cases of $M_k=00$ (no merge) and $M_k=A_k$ (no change in +merge or −merge), the previous variable $A_k$ is not changed ($A_k=A_{k+1}$). In a case of $M_k \neq A_k$ (change from +merge to −merge or from −merge to +merge), the variable $A_{k+1}$ is set to a value of the previous determination value $M_k$ ($A_{k+1}=M_k$). The data $d_k$ is then calculated in accordance with the following equation.

$$d_k=(\overline{a_{k1}}\cdot a_{k2}\cdot m_{k1}\cdot\overline{m_{k}2})+(a_{k1}\cdot\overline{a_{k}2}\cdot\overline{m_{k1}}\cdot m_{k2})$$

In a case of "no merge" or a case where no change of input data occurs in the "+merge" state or the "−merge" state, the data $d_k$ is equal to "0" ($d_k=0$). In a case where the state of the input data $y_k$ is changed from the "+merge" state to the "−merge" or from the "−merge" to the "+merge", the data $d_k$ is equal to "1" ($d_k=1$) (see FIG. 29). The output data $d_k$ from the merge detecting unit 144 is decoded in the 1/7 decoding rule, and the 1/7 decoded data is output as the output data of the maximum likelihood data detecting circuit 14.

To carry out the above process, the merge detecting unit 144 is formed, for example, as shown in FIG. 28. That is, the merge detecting unit 144 has a first calculator 1441, a second calculator 1442 and a third calculator 1443. The first calculator 1441 calculates a value $a_{k+11}$ by using the determination value $M_k$ and the variable $A_k$ as follows.

$$a_{k+11} = (\overline{a_{k1}} \cdot m_{k1} \cdot \overline{m_{k2}}) \Leftrightarrow (\overline{a_{k2}} \cdot m_{k1} \cdot \overline{m_{k2}}) + (a_{k1} \cdot \overline{a_{k2}} \cdot m_{k2})$$

The second calculator 1442 calculates a value $a_{k+12}$ as follows.

$$a_{k+12} = (\overline{a_{k1}} \cdot a_{k2} \cdot \overline{m_{k1}}) + (a_{k1} \cdot \overline{m_{k1}} \cdot m_{k2}) + (\overline{a_{k2}} \cdot \overline{m_{k1}} \cdot m_{k2})$$

The third calculator 1443 calculates the data $d_k$ by using the determination value $M_k$ and the above values $a_{k+11}$ and $a_{k+12}$ as follows.

$$d_k = (\overline{a_{k1}} \cdot a_{k2} \cdot m_{k1} \cdot \overline{m_{k2}}) + (a_{k1} \cdot \overline{a_{k2}} \cdot fheight \overline{m_{k1}} \cdot m_{k2})$$

According to the above maximum likelihood data detecting circuit 14, since the reference value $\Delta_k$ used to determine the merge state slowly varies following the center value $C_k$ of the input data $y_k$, the maximum likelihood data can be detected by using the reference value $\Delta_k$ even if the envelope variation occurs in the reproduction signal. In addition, the rising of the input data (change from the "−merge" to the "+merge") and the falling of the input data (change from the "+merge" to the "−merge") can be directly detected based on the determination value $M_k$ without the $(1+D)_{mod2}$ conversion. Thus, even if one input data item is in error, the error affects only one modulated data. As a result, the error rate can be improved.

Figure 30:
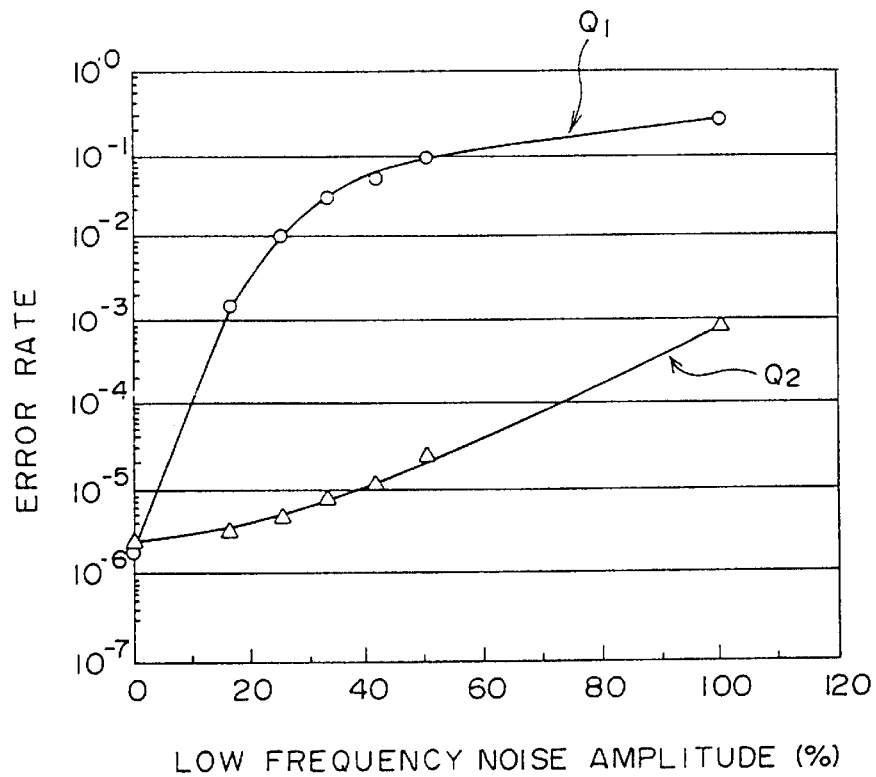
FIG. 30 is a graph illustrating states of an error rate with respect to a low frequency noise amplitude.

FIG. 30 indicates relationships between the low frequency noise amplitude (%) and the error rate. A characteristic Q2 of the maximum likelihood data detection according to the embodiment was superior to a characteristic Q1 of that in accordance with the process shown in FIG. 14. In FIG. 30, the low frequency noise amplitude is represented by a relative value with respect to the amplitude (100%) of the reproduction signal.

Figure 31:
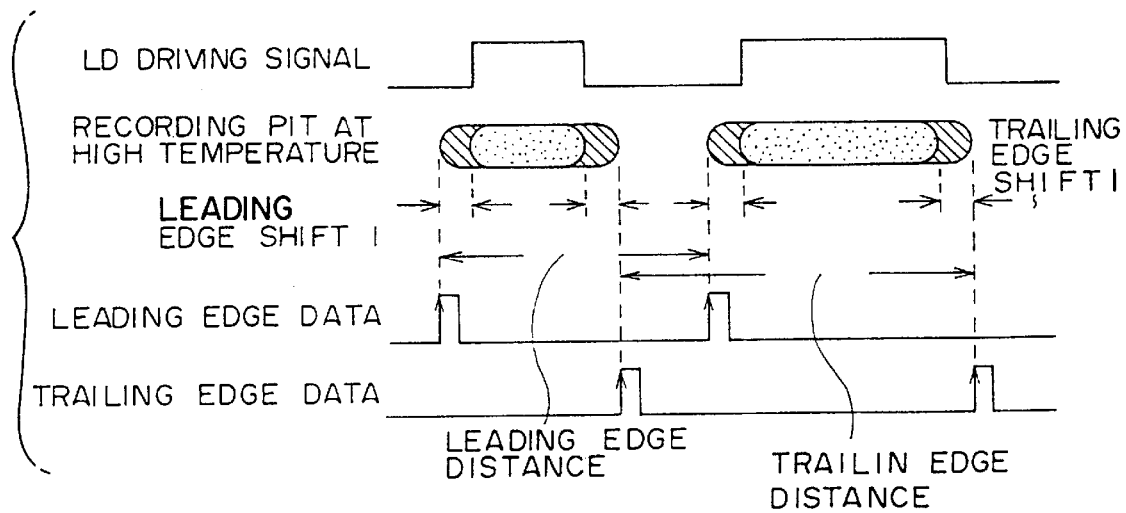
FIG. 31 is a diagram illustrating data corresponding to recording pits which have bee formed under a high temperature condition.
Figure 32:
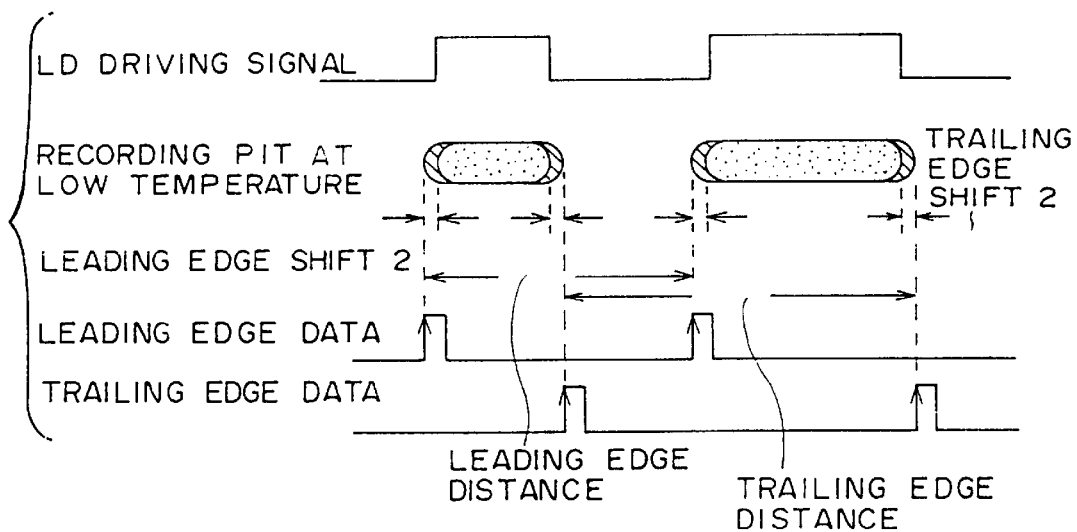
FIG. 32 is a diagram illustrating data corresponding to recording pits which have been formed under a low temperature condition.

Due to unevenness of sensitivity of the optical disk, variation of the circumstance temperature in the data recording process and variation of the light spot control, the size (the length in a direction in which each track extends) of a mark formed on the optical disk is varied. When the size of the mark is varied, the reproduction signal waveform obtained from the optical disk is varied. Specifically, since the maximum likelihood data detecting circuit 14 reproduces a data signal corresponding to the edge of the mark, in the reproduction signal corresponding to the leading edge of the mark and the reproduction signal corresponding to the trailing edge of the mark, directions in which phases are varied based on the variation of the size of the mark differ from each other. That is, the distance between the leading edge of each recording pit (each mark) and the trailing edge thereof in a case where each recording pit is enlarged in a high temperature condition as shown in FIG. 31 differs from the distance between the leading edge of each recording pit and the trailing edge thereof in a case where each recording pit is shortened in a low temperature condition as shown in FIG. 32. Thus, data corresponding to the respective edges of each pit can not be obtained by using only one synchronizing signal. However, even if the size of each pit are varied based on the variation of the circumstance temperature, the distance between the leading edges of adjacent recording pits and the distance between the trailing edges of the adjacent recording pits are respectively approximately constant, as shown in FIGS. 31 and 32. Thus, if data sampling of the reproduction signal is carried out by using a synchronizing signal synchronized with the leading edges of the recording pits (corresponding to the rising of the reproduction signal) and a synchronizing signal synchronized with the trailing edges of the recording pits (corresponding to the falling of the reproduction signal), accurate data can be demodulated. In this case, the structure of the signal reproduction system is formed as shown in FIG. 33.

Figure 33:
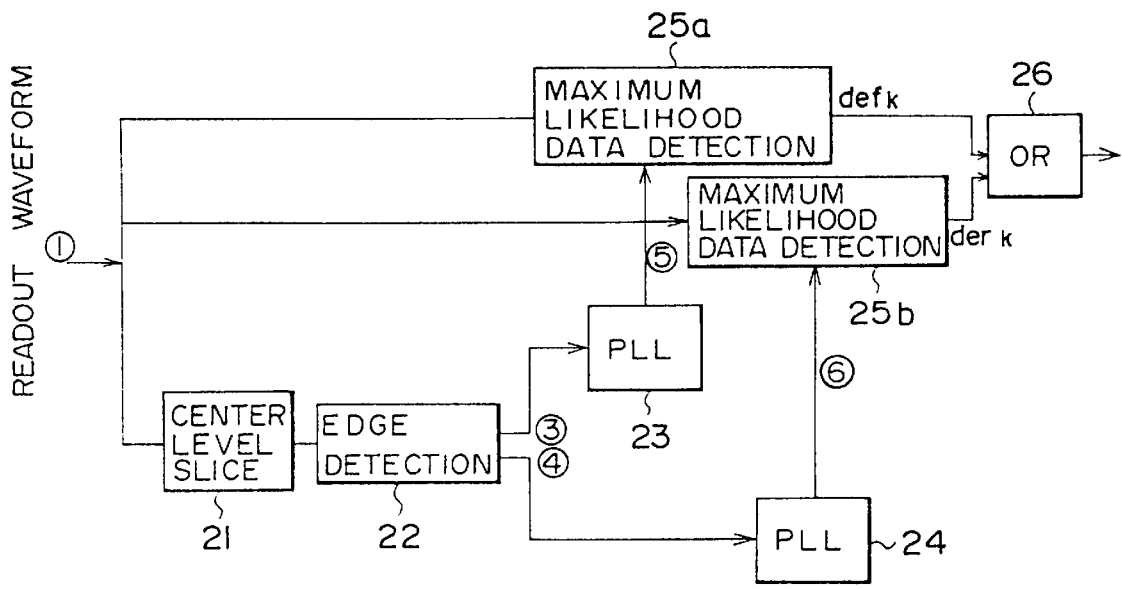
FIG. 33 is a block diagram illustrating another example of the structure of the maximum likelihood data detecting circuit.

Referring to FIG. 33, the signal reproduction system has a center level binarizing circuit 21, an edge detecting circuit 22, a first PLL circuit 23 and a second PLL circuit 24. The center level binarizing circuit 21 binarizes the reproduction signal waveform (1) by using a reference level (Lc) corresponding to the center of the amplitude of the reproduction signal waveform. The edge detecting circuit 22 detects rising and falling points of the binary signal (2) from the center level binarizing circuit 21 and outputs a leading edge detecting signal (3) corresponding to the rising points and a trailing edge detecting signal (4) corresponding to the falling points. The first PLL circuit 23 generates a leading edge synchronizing clock (5) based on the leading edge detecting signal (3). The second PLL circuit 24 generates a trailing edge synchronizing clock (6) based on the trailing edge detecting signal (4).

Figure 34:
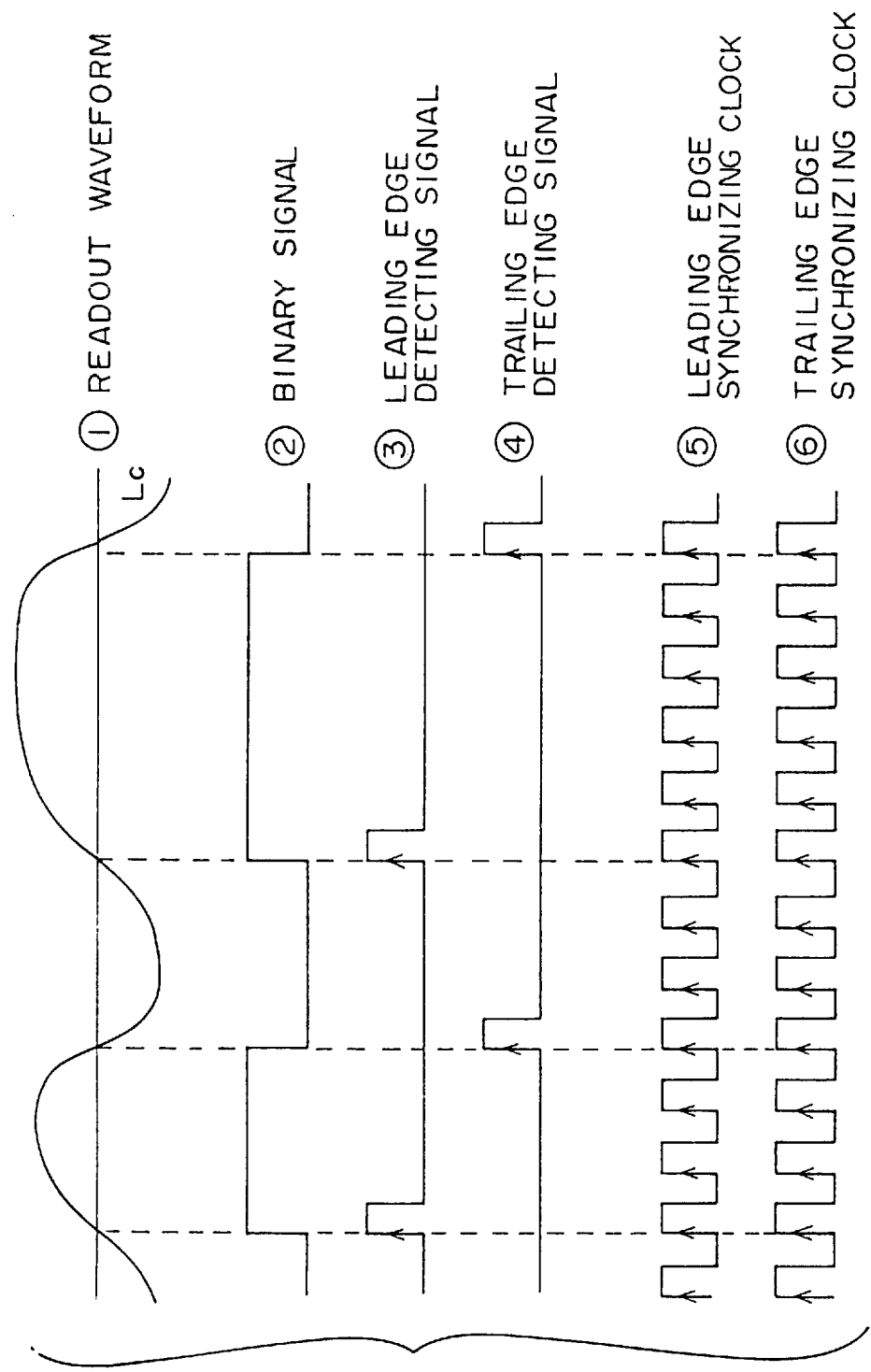
FIG. 34 is a timing chart illustrating signals including synchronizing signals.

The states of the respective signals are shown in FIG. 34.

Figure 35:
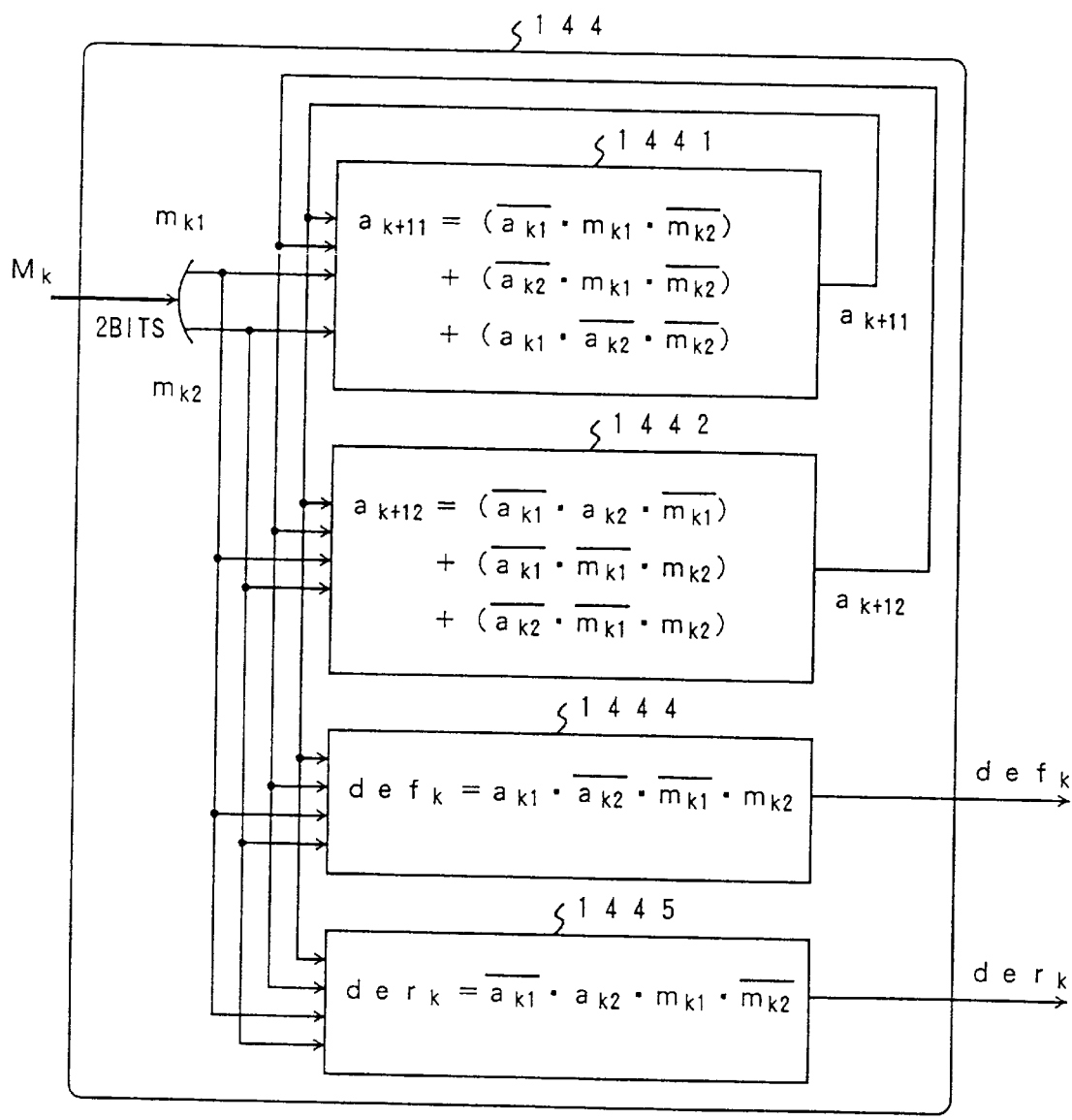
FIG. 35 is a block diagram illustrating the merge detecting circuit of the maximum likelihood data detecting circuit shown in FIG. 33.
Figure 36:
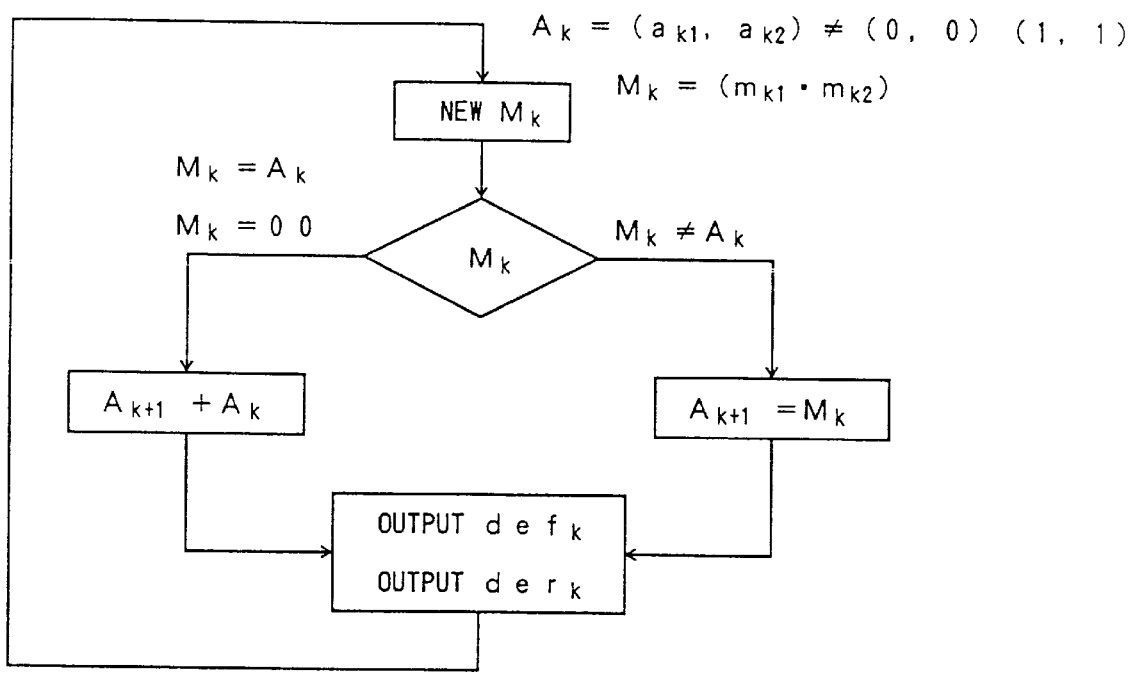
FIG. 36 is a flow chart illustrating a process executed in the merge detecting circuit shown in FIG. 35.

The signal reproduction system has also a first maximum likelihood data detecting circuit 25a, a second maximum likelihood data detecting circuit 25a and an OR circuit 26. The first maximum likelihood data detecting circuit 25a operates in synchronism with the leading edge synchronizing clock (5), and the second maximum likelihood data detecting circuit 25b operates in synchronism with the trailing edge synchronizing clock (6). Each of the first and second maximum likelihood data detecting circuits 25a and 25b has the same structure as that shown in FIG. 20. The merge detecting unit 144 of each of the first and second maximum likelihood data detecting circuits 25a and 25b is formed as shown in FIG. 35, and it carries out a process in accordance with a flow show in FIG. 36. That is, in the same manner as in the previous embodiment, the merge detecting unit 144 has the first calculator 1441 for calculating the value $a_{k+11}$ and the second calculator 1442 for calculating the value $a_{k+12}$. The merge detecting unit 144 has also has a third calculator 1444 for calculating leading edge data $def_k$ in accordance with the following formula:

$$def_k = a_{k1} \cdot \overline{a_{k2}} \cdot \overline{m_{k1}} \cdot m_{k1}, \text{ and}$$

a fourth calculator 1445 for calculating trailing edge data $der_k$ in accordance with the following formula:

$$der_k = \overline{a_{k1}} \cdot a_{k2} \cdot \overline{m_{k1}} \cdot m_{k2}.$$

In the first maximum likelihood data detecting circuit 25a operating in synchronism with the leading edge synchronizing clock (5), the leading edge data $def_k$ is equal to "1" ($def_k$=1) at each point, corresponding to a rising point of the input data $y_k$, at which the state is changed from the "−merge" to the "+merge". In the second maximum likelihood data detecting circuit 25b operating in synchronism with the trailing edge synchronizing clock (6), the trailing edge data $der_k$ is equal to "1" ($der_k$=1) at each point, corresponding to a falling point of the input data $y_k$, at which the state is changed from the "+merge" to the "−merge". The leading edge data $def_k$ from the first maximum likelihood data detecting circuit 25a and the trailing edge data $der_k$ from the second maximum likelihood data detecting circuit 25b are combined with each other by the OR circuit 26, so that decoded data is obtained.

According to the above embodiment, the maximum likelihood data detecting circuit for detecting leading edges corresponding to rising points of the reproduction signal and trailing edges corresponding to falling points of the reproduction signal can be provided. Thus, even if the size of each recording pit (a recording mark) is varied based on the variation of the circumstance temperature, accurate data can be obtained in accordance with the maximum likelihood data detection.

In the above respective embodiments, data is recorded on the optical disk (the magneto-optical disk) in accordance with the so called mark length recording method so that edges of reproduction signal have meanings as data. Thus, in the above respective embodiments, data can not be directly reproduced from the optical disk in which data has been recorded in accordance with the so called mark position recording method so that each recording pit corresponds to data "1". Thus, a description will now be given of a system capable of reproducing data in accordance with the maximum likelihood data detection process from an optical disk on which data has been recorded in accordance with one of the mark length recording method and the mark position recording method.

Figure 37:
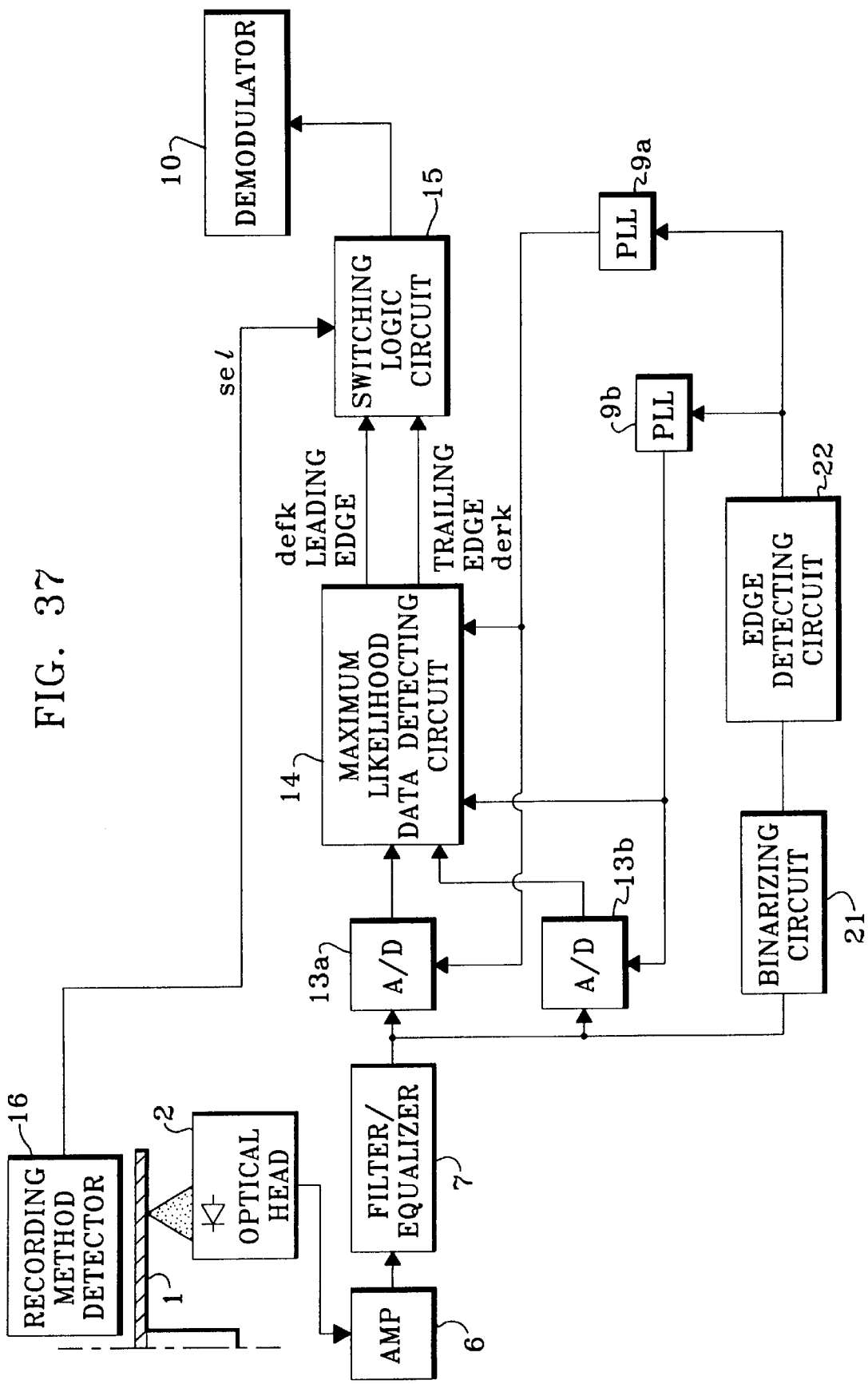
FIG. 37 is a block diagram illustrating a reproduction system of a magneto-optic disk unit according to another embodiment of the present invention.
Figure 38:
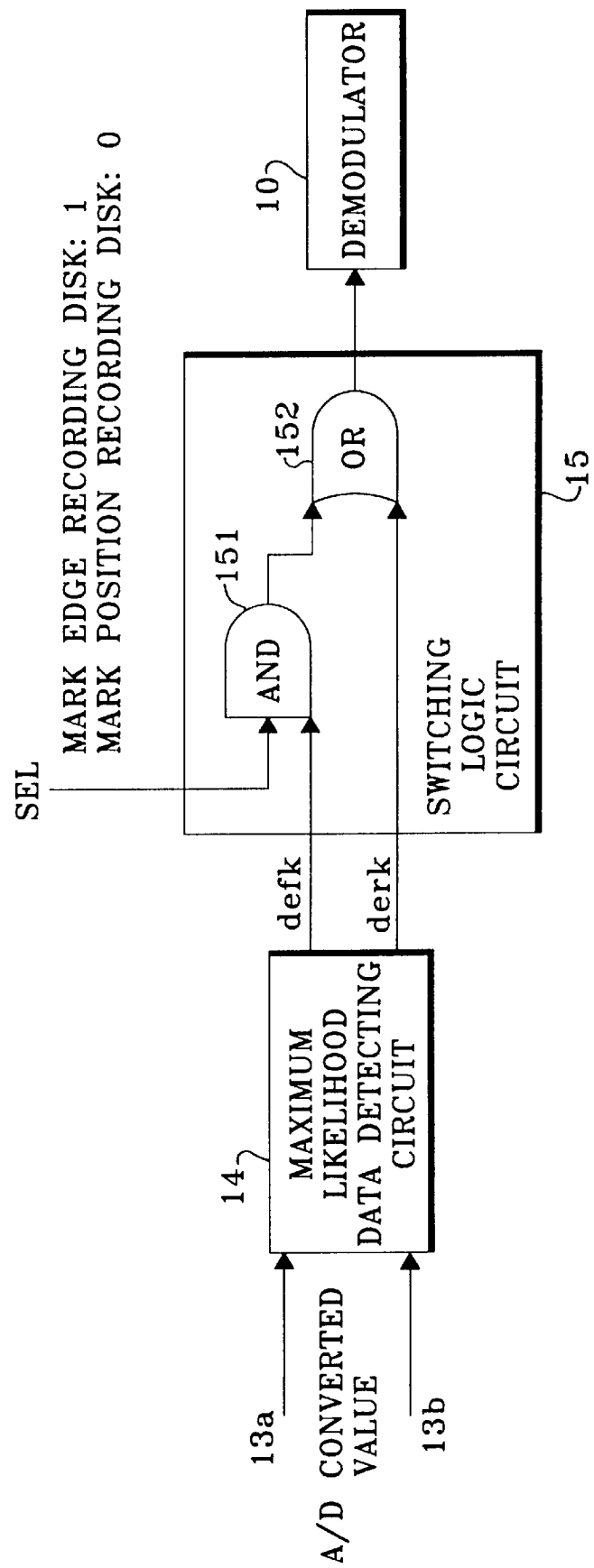
FIG. 38 is a block diagram illustrating an example of a structure of a switching logic circuit of the reproduction system shown in FIG. 37.

FIG. 37 shows a reproduction system of a magneto-optic disk unit according to the embodiment of the present invention. Referring to FIG. 37, the reproduction system has, in the same manner as that shown in FIG. 9, the optical disk 1, the optical head 2, the amplifier 6, the filter/equalizer 7, the first and second PLL circuits 9a and 9b, the demodulator 10, the first and second A/D converters 13a and 13b, the maximum likelihood data detecting circuit 14, the binarizing circuit 21 and the edge detecting circuit 22. This reproduction system also has a switching logic circuit 15 and a recording method detector 16. The maximum likelihood data detecting circuit 14 is formed of the first circuit and second circuit in the same manner as that shown in FIG. 33. Each of the first and second circuits is formed as shown in FIG. 20, and the merge detecting unit 144 is formed as shown in FIG. 35. The first circuit detects the leading edge data $\text{def}_k$ and the second circuit detects the trailing edge data $\text{der}_k$. The recording method detector 16 outputs a selecting signal (sel) having a level "1" in a case where data has been recorded in accordance with the mark length method, and outputs the selecting signal (sel) having a level "0" in a case where data has been recorded in accordance with the mark position method. The switching logic circuit 15 is formed, for example, as shown in FIG. 38. That is, the switching logic circuit 15 has an AND circuit 151 receiving the leading edge data $\text{def}_k$ from the maximum likelihood data detecting circuit 14 and the selecting signal (sel) from the recording method detector 16 and an OR circuit 152 receiving the output signal of the AND circuit 151 and the trailing edge data $\text{def}_k$ from the maximum likelihood data detecting circuit 14.

In the magneto-optic disk unit having the above structure, when the recording method detector 16 detects that the data has been recorded in accordance with the mark length method in the optical disk 1, the recording method detector 16 outputs the selecting signal (sel) having the level "1" (a high level). As a result, the AND circuit 151 becomes in an allowable state, so that the leading edge data $\text{def}_k$ and the trailing edge data $\text{der}_k$ both of which are output from the maximum likelihood data detecting circuit 14 are supplied to the demodulator 10 via the switching logic circuit 15. On the other hand, when the recording method detector 16 detects that the data has been recorded in accordance with the mark position method in the optical disk 1, the recording method detector 16 outputs the selecting signal (sel) having the level "0" (a low level). As a result, the AND circuit 151 becomes in an inhibit state, so that only the trailing edge data $\text{der}_k$ is supplied to the demodulator 10 via the switching logic circuit 15.

Figure 39:
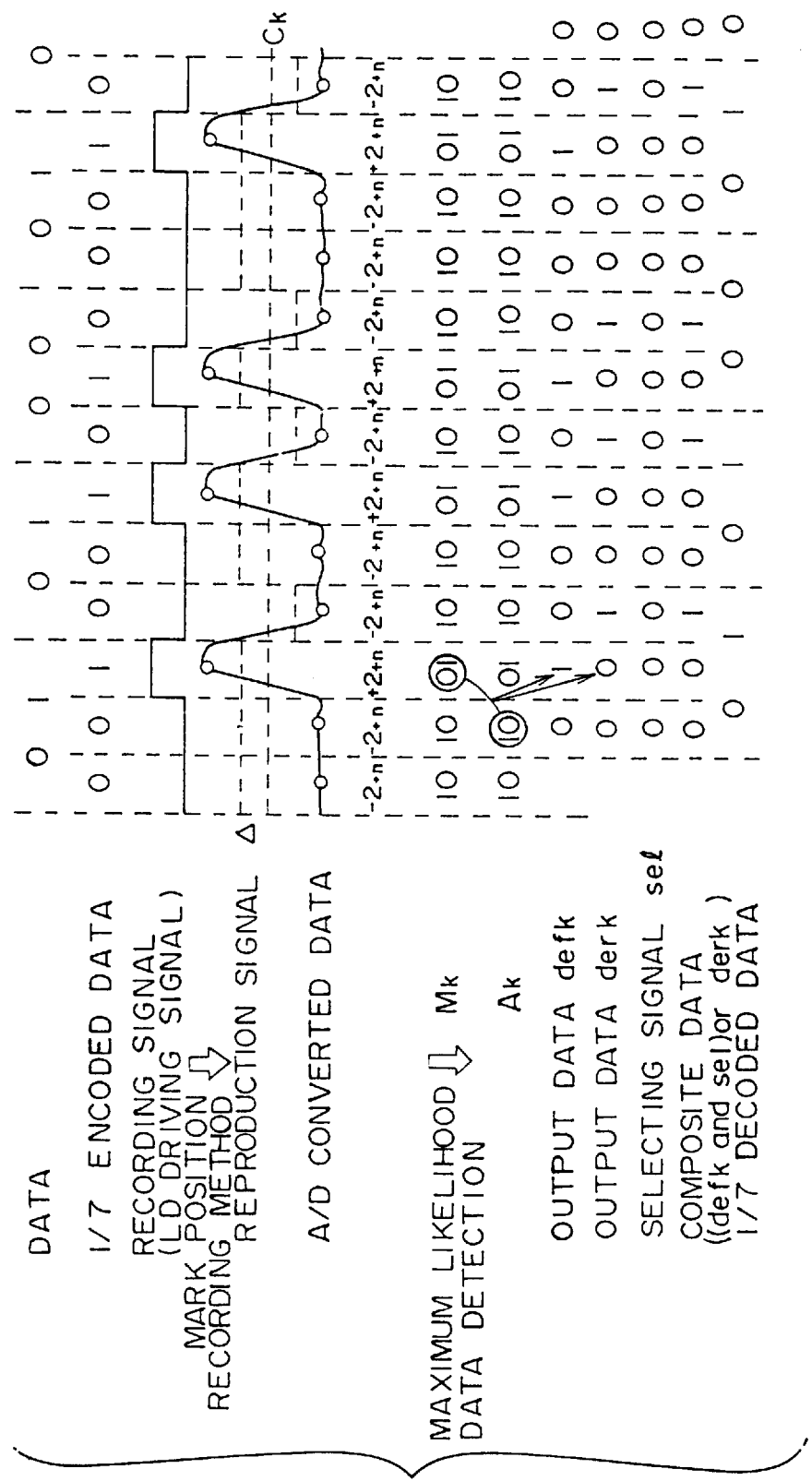
FIG. 39 is a timing chart illustrating signals in the recording system for recording data in accordance with the so called mark position recording method and signals in the reproduction system.

FIG. 39 shows an example of signal processing in the case of the maximum likelihood data detection of the data recorded in accordance with the mark position method. In this case, the laser driving signal and the reproduction signal differ from those in a case of the maximum likelihood data detection of the data recorded in accordance with the mark length method, as shown in FIGS. 12A and 12B. Only the trailing edge data $\text{der}_k$ is decoded into the 1/7 data.

According to the above embodiment, the data can be reproduced in accordance with the maximum likelihood data detecting process from the optical disk in which the data has been recorded in accordance with one of the mark edge recording method and the mark position recording method.

In the above embodiments, the data is formed of eight bits. However, the number of bits of the data may be equal to or greater than seven.

To merge a concept in which the leading edge data and the trailing edge data are individually detected in accordance with the maximum likelihood detecting process and a concept in which the maximum likelihood detection of the data recorded in accordance with one of the mark edge method and the mark position method is carried out, the switching logic circuit 15 shown in FIG. 38 may be substituted for the OR circuit 26 shown in FIG. 33.

In the reproduction system of the optical disk unit using the maximum likelihood data detecting circuit 14, as shown in FIGS. 33 and 37, the reproduction signal in which the waveform shaping is carried out by the filter/equalizer 7 is converted into a binary signal using a slice level, and the PLL circuit 9 (9a and 9b) generates a clock signal by using the binary signal as a synchronizing signal.

Figure 40:
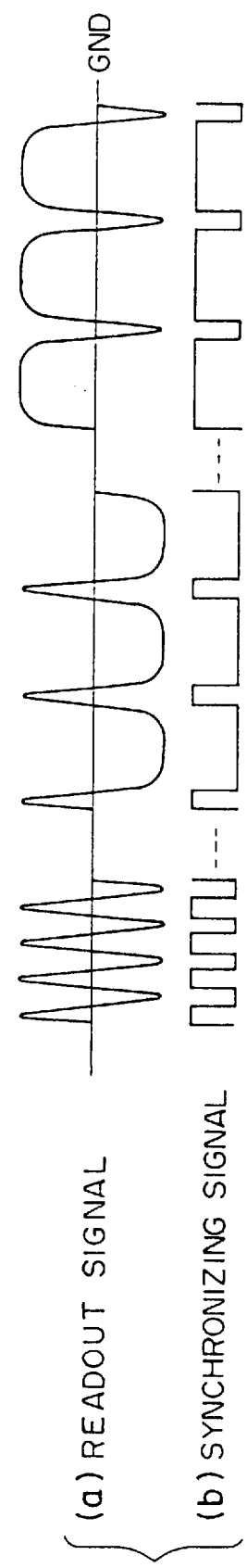
FIG. 40 is a waveform chart illustrating an ideal reproduction signal and a binarized signal (a synchronizing signal) obtained from the ideal reproduction signal.
Figure 41:
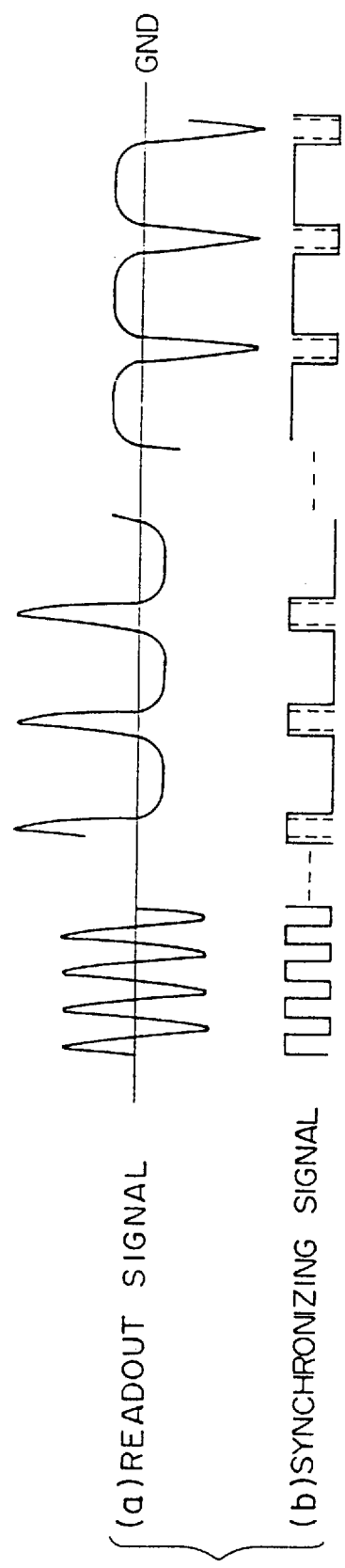
FIG. 41 is a waveform chart illustrating an actual reproduction signal and a binarized signal obtained by slicing the actual reproduction signal at a ground level.

The reproduction signal has frequency bands including the DC band. Thus, if actual circuits of the reproduction system have frequency characteristics including the DC component, the signal reproduced by the actual circuits accurately swings between a positive region and a negative region with respect to the ground level (GND), as shown in FIG. 40 (a). In this case, if the slice detection of the reproduction signal is carried out by using the ground level, an accurate binary signal as shown in FIG. 40 (b) is obtained. Thus, the clock signal generated based on the binary signal is synchronized with the reproduction signal. However, the actual circuits of the reproduction system have frequency characteristics in which the low frequency components including the DC component are eliminated. Thus, in the reproduction system, a reproduction signal, different from a sine wave, in which the ON-time and OFF-time differ from each other is shifted in a positive direction or a negative direction as shown in FIG. 41 (a). When this reproduction signal is converted into a binary signal by using the ground level as the slice level, the binary signal is not accurately synchronized with the reproduction signal, as shown in FIG. 41 (b). The level of the reproduction signal is shifted in accordance with the variation of the recording patterns, so that the envelope of the reproduction signal is varied as has been described above. Further, as has been described above, due to the unevenness of the birefringence in the substrate (made of polycarbonate) of the optical disk, the envelope variation of the reproduction signal occurs. Thus, the slice level used to obtain the binary signal must vary so as to follow the envelope variation of the reproduction signal.

Figure 42:
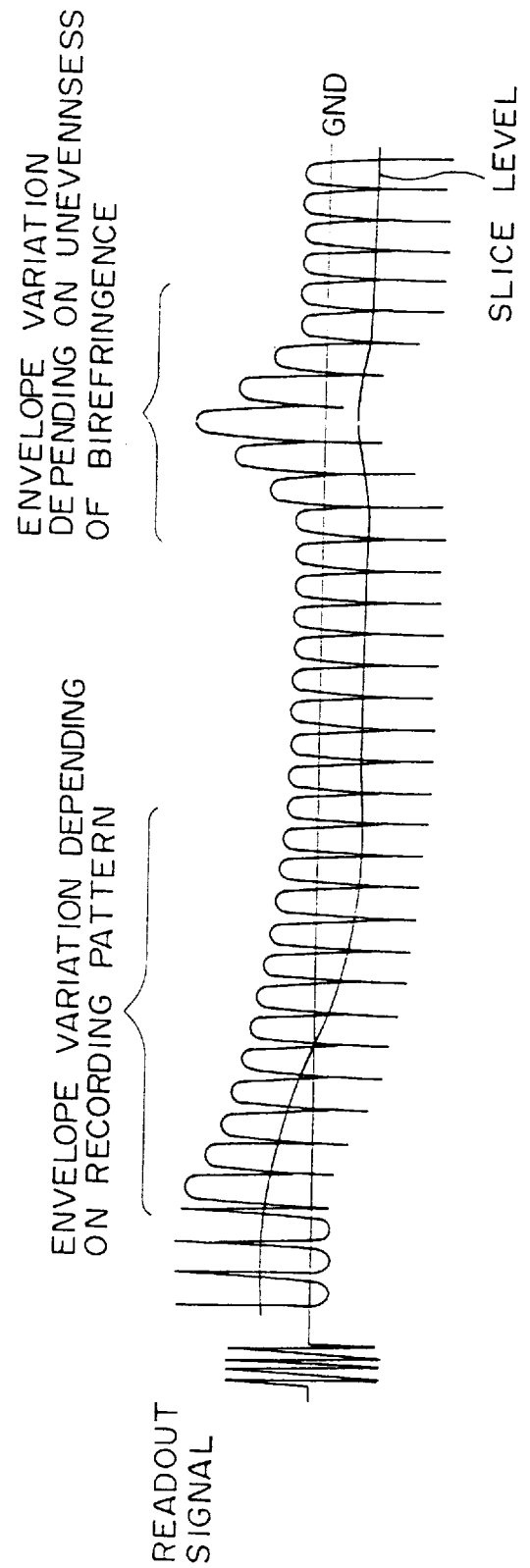
FIG. 42 is a waveform chart illustrating a slice level obtained from a reproduction signal including an envelope variation.
Figure 43:
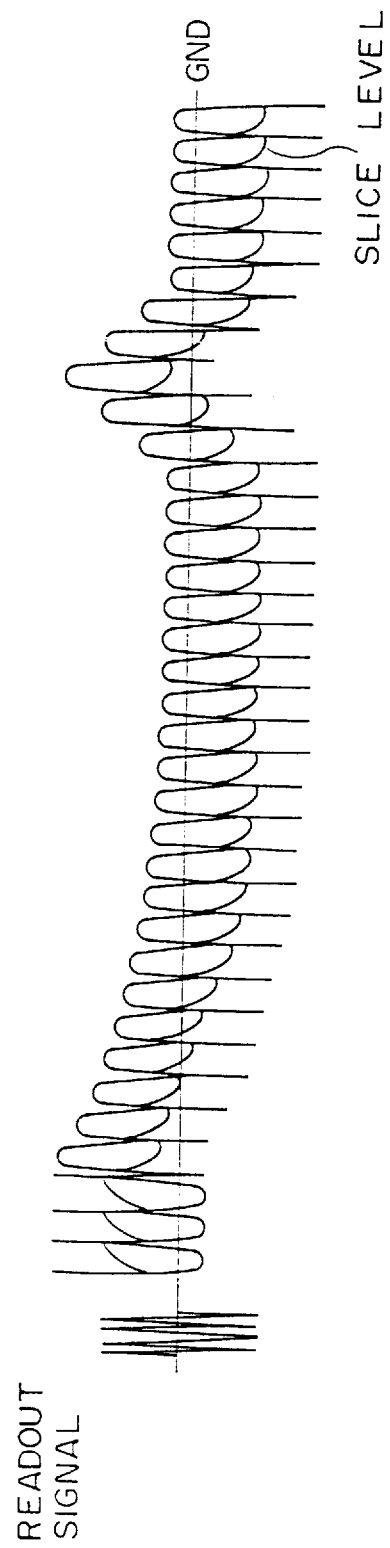
FIG. 43 is a wave form chart illustrating another slice level obtained from a reproduction signal including an envelope variation.

However, as shown in FIG. 42, although the envelope of the reproduction signal slowly varies in accordance with variation of the recording pattern, the envelope of the reproduction signal rapidly varies in accordance with the unevenness of the birefringence in the substrate of the optical disk. Thus, if the slice level detection would be performed so that the slice level follows the envelope variation of the reproduction signal caused by the variation of the recording pattern (e.g. an integral slice detection), the slice level can not follow the envelope variation of the reproduction signal caused by the unevenness of the birefringence in the substrate of the optical disk, as shown in FIG. 42. On the other hand, if the slice level detection would be performed so that the slice level follows the envelope variation of the reproduction signal caused by the birefringence in the substrate of the optical disk (e.g. the integral slice detection), the detected slice level follows fine variations of the reproduction signal, as shown in FIG. 43. In this case, a stable slice level can not be obtained.

Thus, a description will now be given of an embodiment in which, even if the envelope of the reproduction signal slowly and rapidly varies, a stable binary signal used to generate the synchronizing signal in the PLL circuit can be extracted from the reproduction signal.

Figure 44:
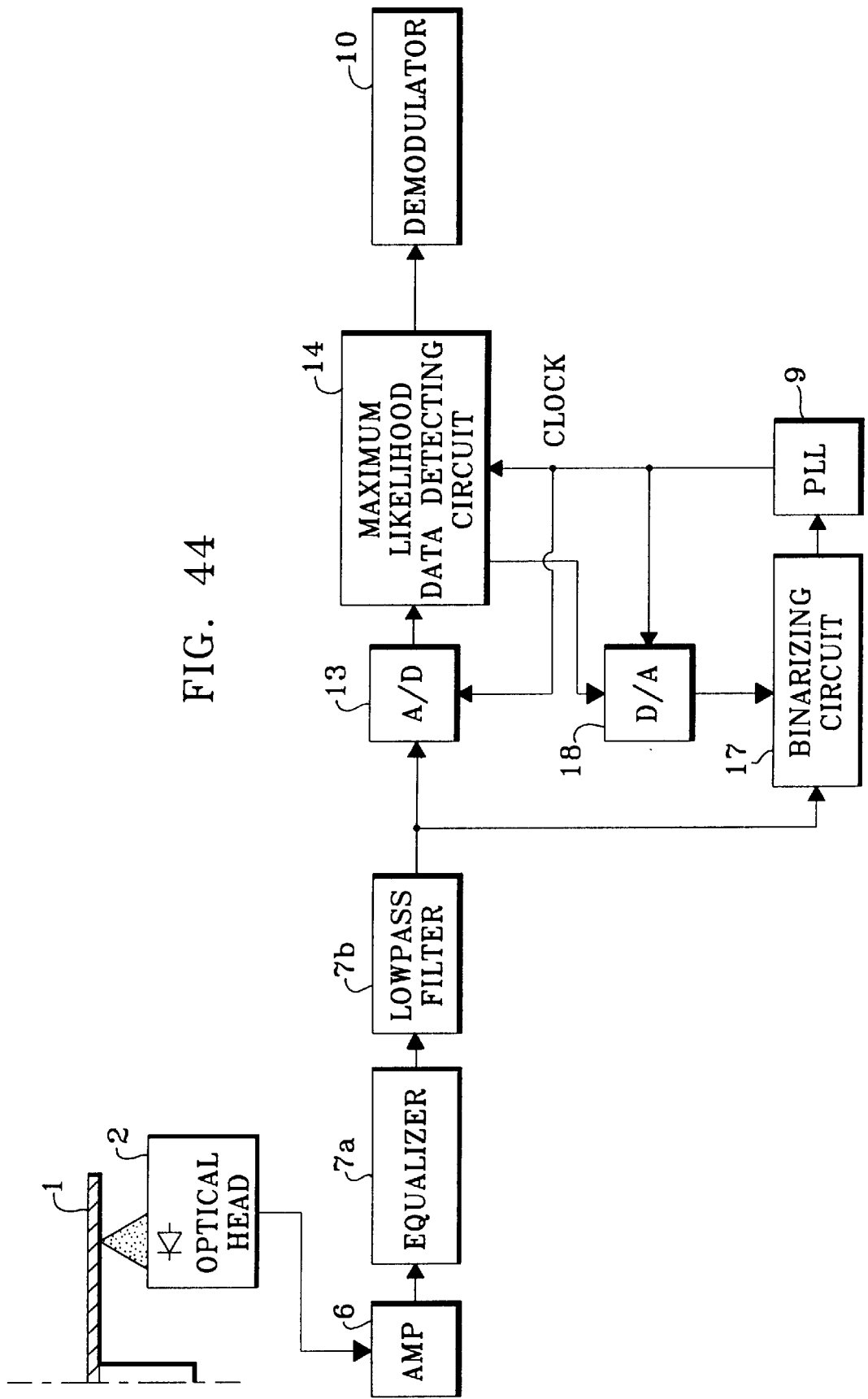
FIG. 44 is a block diagram illustrating a reproduction system of the magneto-optic disk unit according to another embodiment of the present invention.

FIG. 44 shows a reproduction system of a magneto-optic disk unit according to the embodiment.

Referring to FIG. 44, the reproduction system has, in the same manner as that shown in FIG. 9, the optical disk 1, the optical head 2, the amplifier 6, the equalizer 7a, the low pass filter 7b, the PLL circuit 9, the demodulator 10, the A/D converter 13, the maximum likelihood data detecting circuit 14 and the binarizing circuit 17. This reproduction system also has a digital-to-analog converter (a D/A converter) 18. The maximum likelihood data detecting circuit 14 has, in the same manner as that in the previous embodiments, the merge determination unit 141, the center value calculation unit 142, the reference value calculation unit 143 and the merge detecting unit 144. The respective units 141, 142, 143 and 144 of the maximum likelihood data detecting circuit 14 operate in synchronism with the clock signal from the PLL circuit 9. The center value calculation unit 142 calculates the center value data $C_{kd}$ of the level of the reproduction signal. The center value data $C_{kd}$ is obtained as a digital value in the center value calculation unit 142, and the center value data $C_{kd}$ is converted into an analog signal by the D/A converter 18. The signal level output from the D/A converter 18 always represents the center value of reproduction signal, this signal (referred to as a center value signal) is supplied, as a signal representing a slice level, to the binarizing circuit 17. The binarizing circuit 17 converts the reproduction signal into a binary signal by using the center value signal from the D/A converter 18 as the slice level.

The binary signal from the binarizing circuit 17 is supplied to the PLL circuit 9, and the PLL circuit 9 generates a synchronizing clock signal based on the binary signal. The A/D converter 13, the maximum likelihood data detecting circuit 14 and the D/A converter 18 operate in synchronism with the synchronizing clock signal generated by the PLL circuit 9.

Figure 45:
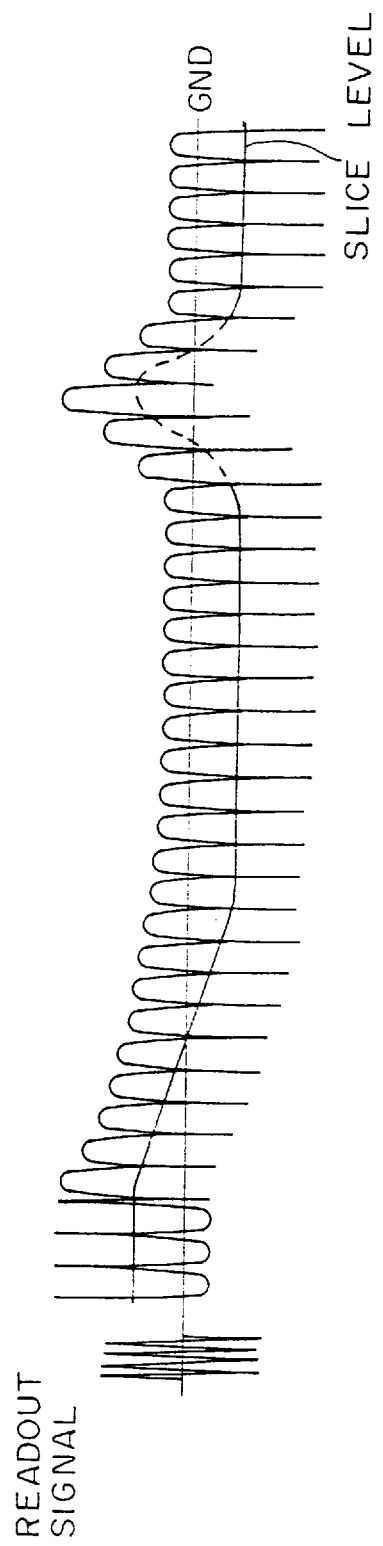
FIG. 45 is a waveform chart illustrating a slice level obtained in the reproduction system shown in FIG. 44.

The center value signal level corresponding to the center value data $C_{dk}$ calculated by the center value calculation unit 141 of the maximum likelihood data detecting circuit 14 is used as the slice level for the reproduction signal. Thus, even if the envelope of the reproduction signal slowly and rapidly varies, the slice level varies and follows the envelope variation of the reproduction signal so as to be maintained at the center level of the reproduction signal, as shown in FIG. 45. The reproduction signal is converted into the binary signal by using this the slice level, and the PLL circuit 9 generates the clock signal based on the binary signal. Thus, the PLL circuit 9 can generate the clock signal stably synchronized with the reproduction signal, so that a stable synchronization operation can be performed in the maximum likelihood data detecting circuit 14.

The above clock signal generated by the PLL circuit 9 is synchronized with rising points of the reproduction signal (the leading edge points) and falling points thereof (the trailing edge points). However, in a case where data is reproduced from the optical disk in which data has been recorded in a higher density, the phase of the clock signal slightly differs from the phase of the leading edges and the trailing edges of the reproduction signal in the A/D converter 13 due to the processing delay in a circuit (including the binary circuit 17 and the PLL circuit 9) for generating the clock signal from the reproduction signal. If the phase of the clock signal differs from the phase of the leading edges and the trailing edges of the reproduction signal in the A/D converter 13, the reproduction signal is not converted by the A/D converter 13 at proper timing, so that it can not be guaranteed to reproduce accurate data. Thus, in the following embodiment, the difference between the phase of the clock signal and the phase of the leading edges and trailing edges of the reproduction signal is compensated.

Figure 46:
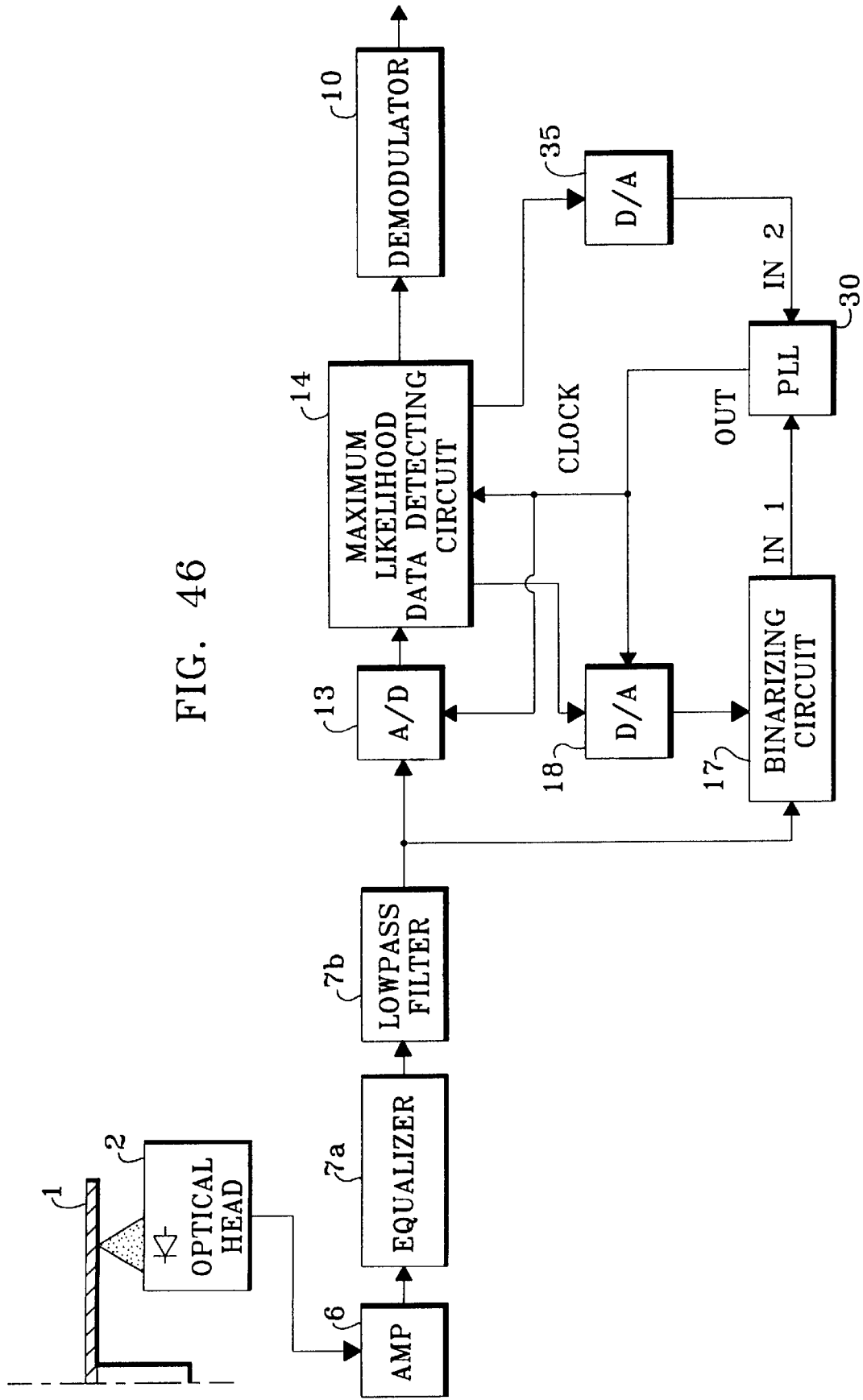
FIG. 46 is a block diagram illustrating a reproduction system of the magentooptical disk unit according to another embodiment of the present invention.

A reproduction system according to the embodiment is formed, for example, as shown in FIG. 46. Referring to FIG. 46, the reproduction system has, in the same manner as that shown in FIG. 44, the optical disk 1, the optical head 2, the amplifier 6, the equalizer 7a, the low pass filter 7b, the demodulator 10, the A/D converter 13, the maximum likelihood data detecting circuit 14, the binarizing circuit 17 and the D/A converter 18. This reproduction system also has a PLL circuit 30 having a new structure and a digital-to-analog converter (a D/A converter) 35.

Figure 47:
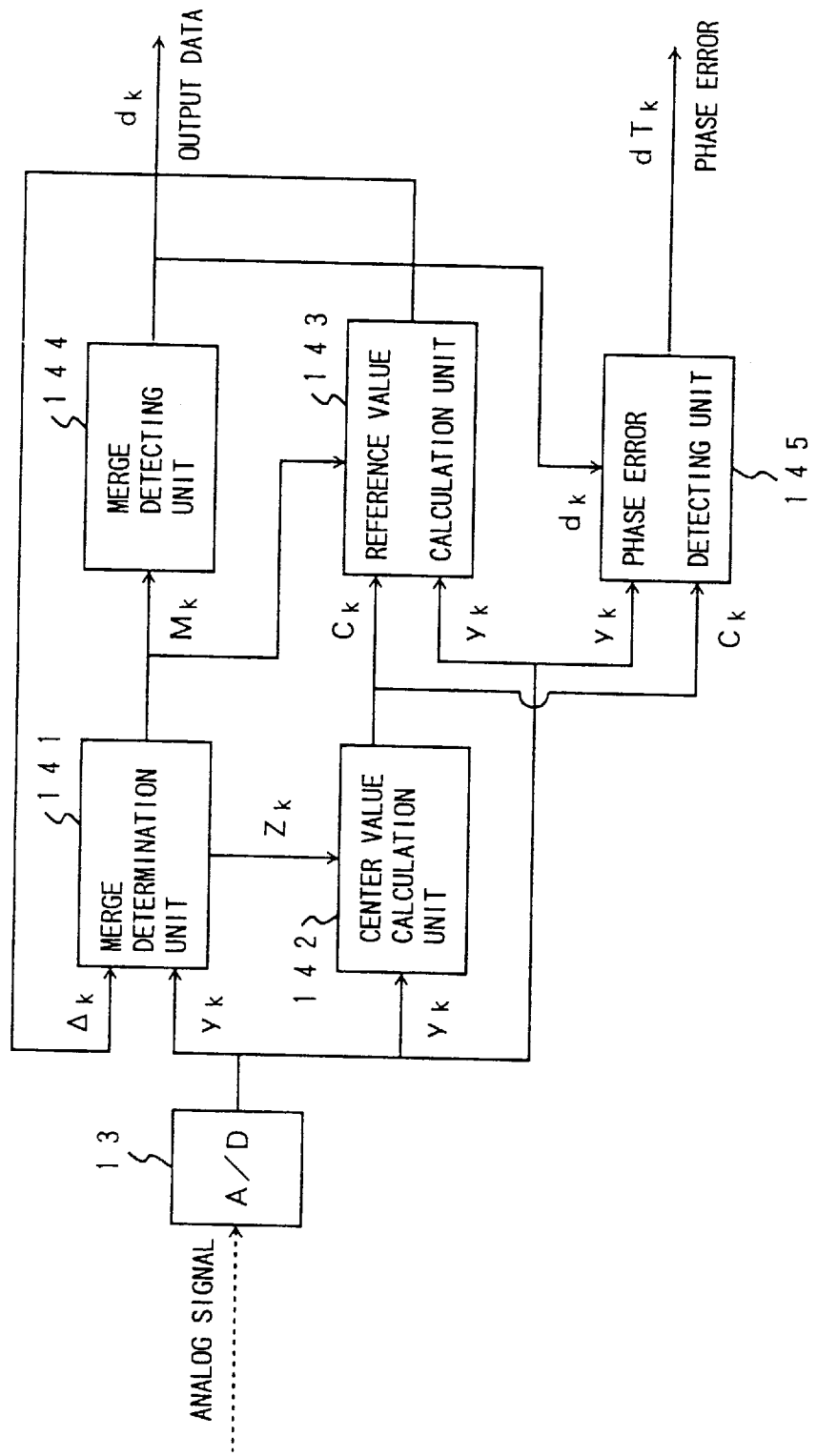
FIG. 47 is a block diagram illustrating a structure of a maximum likelihood data detecting circuit of the reproduction system shown in FIG. 46.
Figure 48:
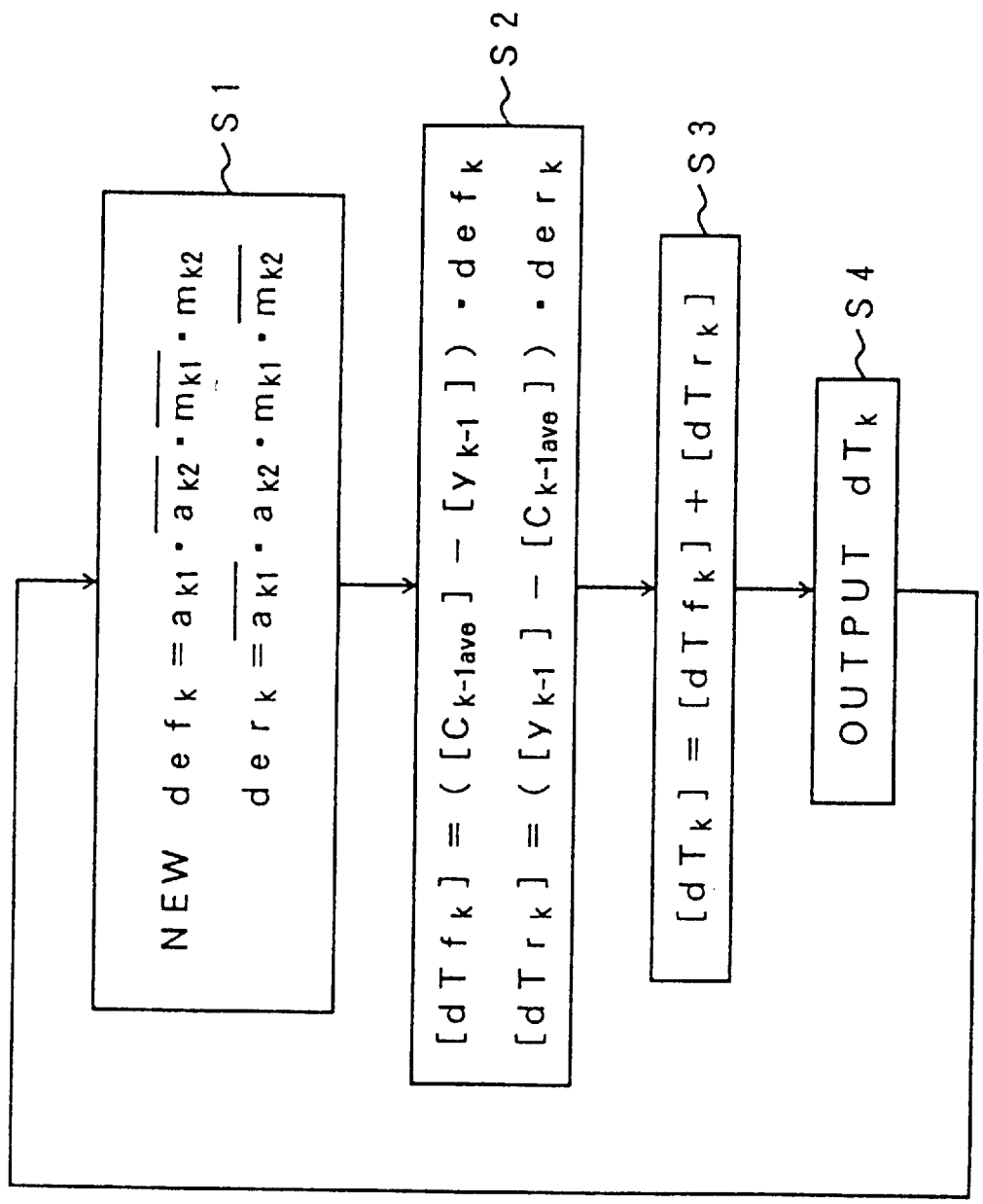
FIG. 48 is a flow chart illustrating a procedure in accordance with which phase error data is obtained.

The maximum likelihood data detecting circuit 14 is formed, for example, as shown in FIG. 47. Referring to FIG. 47, this maximum likelihood data detecting circuit 14 has, in the same manner as that in the previous embodiments, the merge determination unit 141, the center value calculation unit 142, the reference value calculation unit 143 and the merge detecting unit 144. The maximum likelihood detecting circuit 14 also has a phase error detecting unit 145. The phase error detecting unit 145 calculates phase error data $dT_k$ based on the center value $C_{kave}$ from the center value calculation unit 142, the sampling data $y_k$ from the A/D converter 13 and the leading edge data $def_k$ and the trailing edge data $der_k$ from the merge detecting circuit 144. The calculation of the phase error data $d_k$ is performed in accordance with a procedure shown ni FIG. 48. That is, every time new leading edge data $def_k$ ("1" or "0") and the trailing edge data $der_k$ ("1" or "0") are output at a clock timing k (S1), leading edge phase error data $dTf_k$ is calculated by using the center value $C_{k-lave}$ and the sampling data $y_{k-1}$ both of which have been obtained at the previous timing k−1 and the leading edge data $def_k$, in accordance with the following formula:

$$dTf_k = (C_{k-lave} - y_{k-1}) \cdot def_k.$$

In addition, trailing edge phase error data $dTr_k$ is calculated by using the center value $C_{k-lave}$ and the sampling data $y_{k-1}$ both of which have been obtained at the previous timing k−1 and the trailing edge data $der_k$, in accordance with the following formula:

$$dTr_k = (y_{k-1} - C_{k-lave}) \cdot der_k.$$

The leading edge data $def_k$ has a value "1" at only leading edge points of the reproduction signal. Thus, the leading edge phase error data $dTf_k$ corresponds to a difference between the center value of the reproduction signal and the sampling data at each leading edge point. In addition, the trailing edge phase error data $dTr_k$ corresponds to a difference between the center value of the reproduction signal and the sampling data at each trailing edge point. The phase error data $dT_k$ is obtained by adding the leading edge phase error data $dTf_k$ and the trailing edge phase error data $dTr_k$ to each other (S3). The phase error data $dT_k$ obtained is supplied to the D/A converter 35 (S4).

The leading edge data $def_k$ and the trailing edge data $der_k$ ought to be ideally obtained at clock timing corresponding to the leading edge points and the trailing edge points of the reproduction signal. That is, the phase error data $dT_k$ quantitatively represents a difference between the phase of the synchronizing clock signal (supplied to the A/D converter 13 and the maximum likelihood data detecting circuit 14) and the phase of the leading edge points and the trailing edge points of the reproduction signal.

Figure 49:
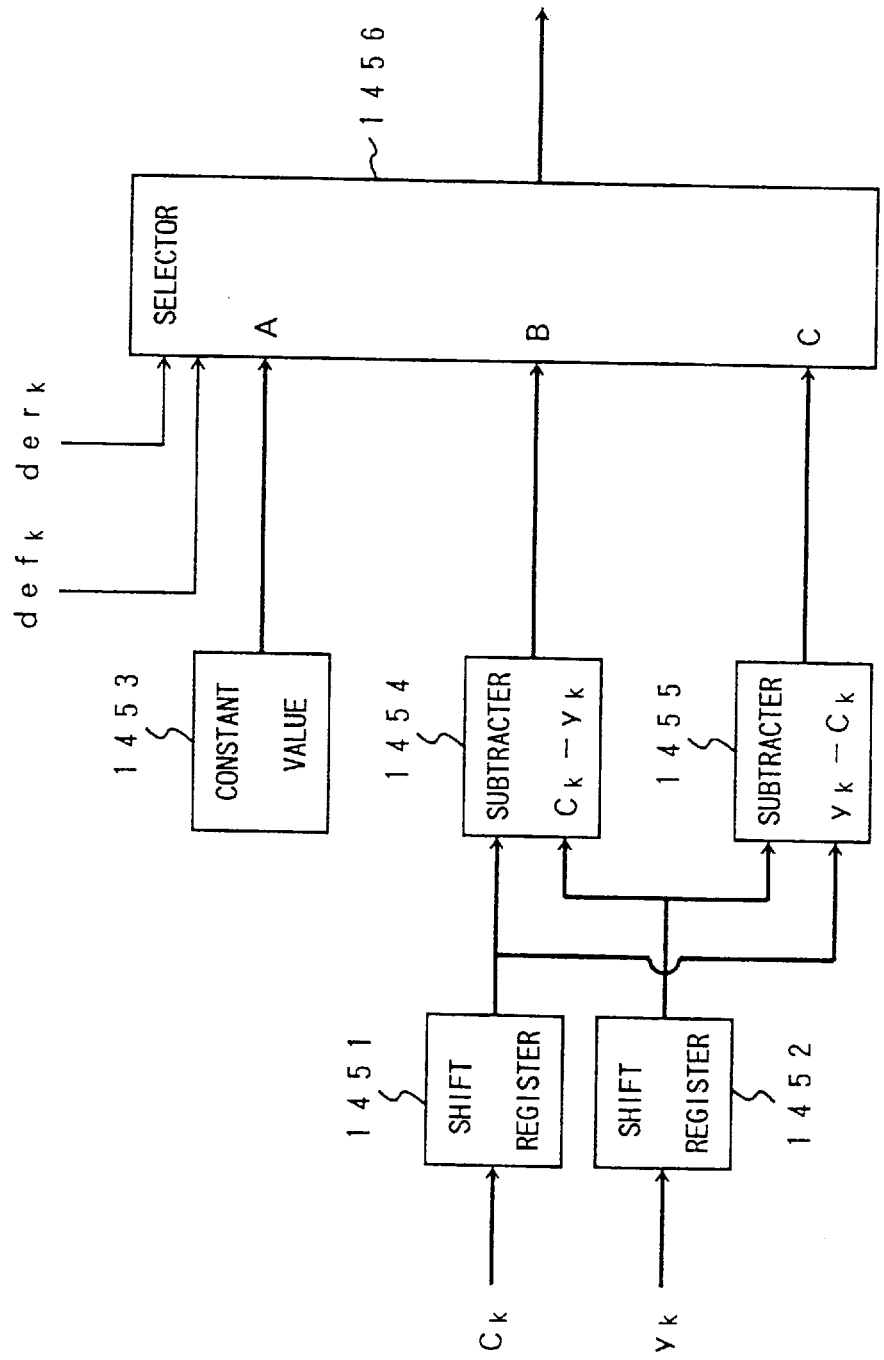
FIG. 49 is a block diagram illustrating a structure of a phase error detecting unit.

The phase error detecting unit 145 calculating the phase error data $dT_k$ in accordance with the above procedure is formed, for example, as shown in FIG. 49.

Referring to FIG. 49, the phase error detecting unit 145 has a first shift register 1451, a second shift register 1452, a constant setting unit 1453, a first subtracter 1454, a second subtracter 1455 and a selector 1456. The center value $C_{k-lave}$ from the center value calculation unit 142 is set in the first shift register 1451 at a clock timing k−1 and it is maintained therein until the next clock timing k. The sampling data $y_{k-1}$ from the A/D converter 13 is set in the second shift register 1452 at a clock timing k−1 and it is maintained therein until the next clock timing k. The first subtracter 1454 subtracts the sampling data $y_{k-1}$ set in the second shift register 1452 from the center value $C_{k-lave}$ set in the first shift register 1451. The value output from the first subtracter 1454 at a clock timing corresponding to a leading edge point is the leading edge phase error data $dTf_k$ calculated in step S2 shown in FIG. 48 (the leading edge data $def_k$ is equal to "1"). The second subtracter 1455 subtracts the center value $C_{k-lave}$ set in the first shift register 1451 from the sampling data $y_{k-1}$ set in the second shift register 1452. The value output from the second subtracter 1455 at a clock timing corresponding to a trailing edge point is the trailing edge phase error data $dTr_k$ calculated in step S2 shown in FIG. 48 (the trailing edge data $der_k$ is equal to "1"). For example, a constant "0" has been previously set in the constant setting unit 1453. The selector 1456 has three input terminal A, B and C. The constant value "0" set in the constant setting unit 1453, the output value of the first subtracter 1454 and the output value of the second subtracter 1455 are respectively supplied to the input terminal A, B and C of the selector 1456. The selector 1456 selects an input terminal corresponding to a pair of the leading edge data $def_k$ and the trailing edge data $der_k$ from among the input terminals A, B and C in accordance with a rule indicated in Table-3.

TABLE 3

| $def_k$ | $der_k$ | Select |
|---|---|---|
| 0 | 0 | A |
| 1 | 0 | B |
| 0 | 1 | C |
| 1 | 1 | A |

That is, at the clock timing corresponding to the leading edge point of the reproduction signal ($def_k$="1" and $der_k$="0"), the leading edge phase error data ($C_{k-lave}-y_{k-1}$) supplied to the input terminal B is output from the selector 1456. At the clock timing corresponding to the trailing edge point of the reproduction signal ($def_k$="0" and $der_k$="1"), the trailing edge phase error data ($y_{k-1}-C_{k-lave}$) supplied to the input terminal C is output from the selector 1456. In addition, at the clock timing other than the clock timing corresponding to the leading edge point and the trailing edge point of the reproduction signal, the constant value "0" supplied to the input terminal A is output from the selector 1456. Although a case where both the leading edge data $def_k$ and the trailing edge data $der_k$ are simultaneously equal to "1" does not theoretically occur, if this case occurs in error, the constant value "0" supplied to the input terminal A is output from the selector 1456.

As has been described above, the phase error data $dT_k$ is output from the phase error detecting unit 145 of the maximum likelihood data detecting circuit 14 at every clock timing corresponding to the leading edge point and the trailing edge point. The phase error data $dT_k$ is supplied to the D/A converter 35, and the D/A converter 35 outputs a rectangular shaped signal (a phase error signal) having the amplitude corresponding to the phase error data $dT_k$ as shown in FIGS. 50 and 51. FIG. 50 shows a case where the phase difference dτ between the phase of the actual clock signal (●) and the phase of ideal sampling points of the reproduction signal (○) (including the leading edge points and the trailing edge points) is positive (+). In this case, the phase error signal having a positive amplitude (+) corresponding to the phase error data $dT_k$ is output from the D/A converter 35 every timing corresponding to the leading edge points and the trailing edge points. FIG. 51 shows a case where the phase difference dτ between the phase of the actual clock signal (●) and the phase of the ideal sampling points of the reproduction signal (○) is negative (−). In this case, the phase error signal having a negative amplitude (−) corresponding to the phase error data $dT_k$ is output from the D/A converter 35 every timing corresponding to the leading edge points and the trailing edge points.

Figure 52:
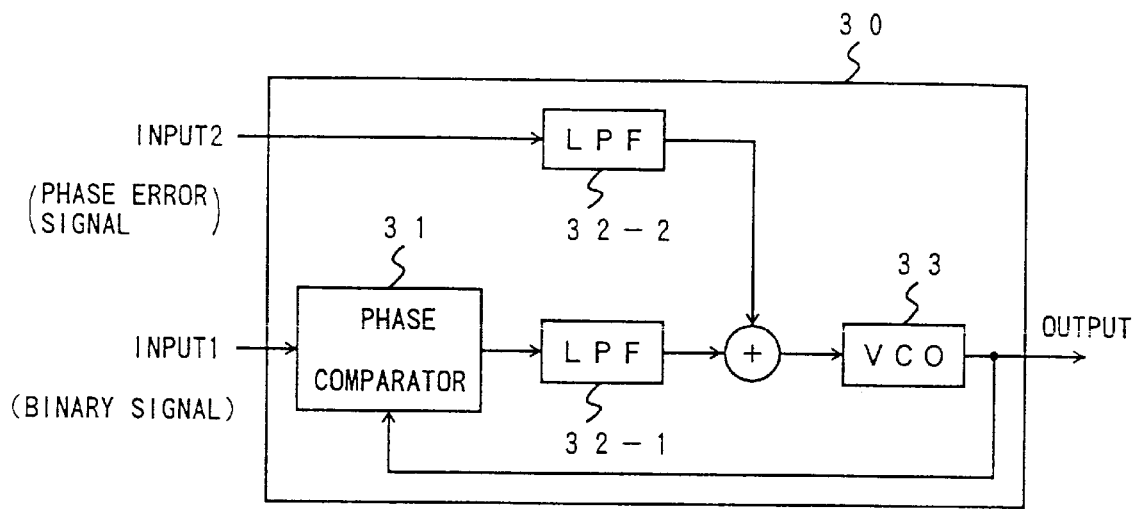
FIG. 52 is a block diagram illustrating a structure of a PLL circuit of the reproduction system shown in FIG. 46.

In addition, the PLL circuit 30 shown in FIG. 46 is formed, for example, as shown in FIG. 52. Referring to FIG. 52, the PLL circuit 30 has a phase comparator 31, low pass filters (LPF) 32-1 and 32-2 and a voltage controlled oscillator (VCO) 33. The binarizing circuit 17 outputs an edge detecting signal (corresponding to the leading edges and the trailing edges of the reproduction signal). The edge detecting signal represents rising points of a binary signal obtained by using as the slice level the center value of the reproduction signal and falling points of the binary signal. The phase comparator 31 compares the phase of the clock signal output from this PLL circuit 30 with the phase of the edge detecting signal (INPUT 1) from the binarizing circuit 17 and outputs a signal corresponding to a difference between the phases. The signal from the phase comparator 31 is converted into a voltage level corresponding to the difference between the phases by the low pass filter 32-1. The phase error signal from the D/A converter 35 is converted into a voltage level corresponding to the phase error signal by the low pass filter 32-2. In a case where the phase difference is positive (+), the voltage level output from the low pass filter 32-2 is positive (+) as shown in FIG. 50. In a case where the phase difference is negative (−), the voltage level output from the low pass filter 32-2 is negative (−) as shown in FIG. 51. The voltage levels output from the respective low pass filters 32-1 and 32-2 are added and the adding voltage level is supplied to the voltage controlled oscillator 33. The voltage controlled oscillator 33 controls the phase of a clock signal having the same frequency as the reference clock signal used for the data recording in accordance with the input voltage level and outputs the clock signal in which the phase is controlled. The clock signal from the voltage controlled oscillator 33 is supplied, as the output clock signal of the PLL circuit 30, to the A/D converter 13 and the maximum likelihood data detecting circuit 14. The PLL circuit 30 operates under a condition in which the phase difference signal is offset by the phase error, so that the phase of the clock signal output from the PLL circuit 30 is locked so that the phase error is canceled. That is, the phase of the synchronizing clock signal supplied to the A/D converter 13 and the maximum likelihood data detecting circuit 14 converges on the ideal sampling points of the reproduction signal.

Figure 53:
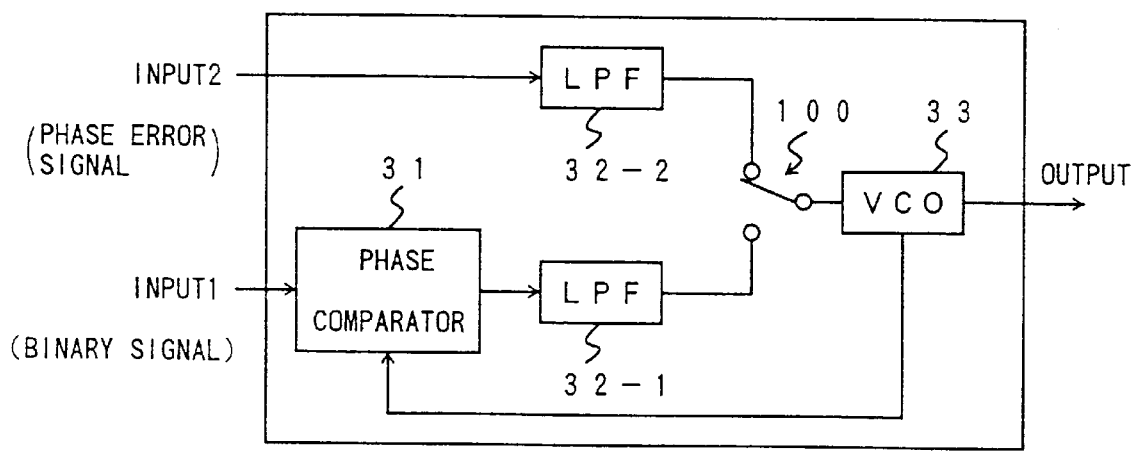
FIG. 53 is a block diagram illustrating another structure of the PLL circuit.

In addition, the PLL circuit 30 may be formed as shown in FIG. 53. In this PLL circuit 30, first, the voltage level from the low pass filter 32-1 is supplied to the voltage controlled oscillator 33 so that the pull-in operation of the PLL circuit 30 is performed. After this, a switch 100 switches the low pass filter 32-1 to the low pass filter 32-2 so that the voltage level from the low pass filter 32-2 is supplied to the voltage controlled oscillator 33. In this state, the phase of the clock signal is locked so that the phase error is canceled. As a result, the phase of the clock signal converges on ideal sampling points of the reproduction signal.

Figure 54:
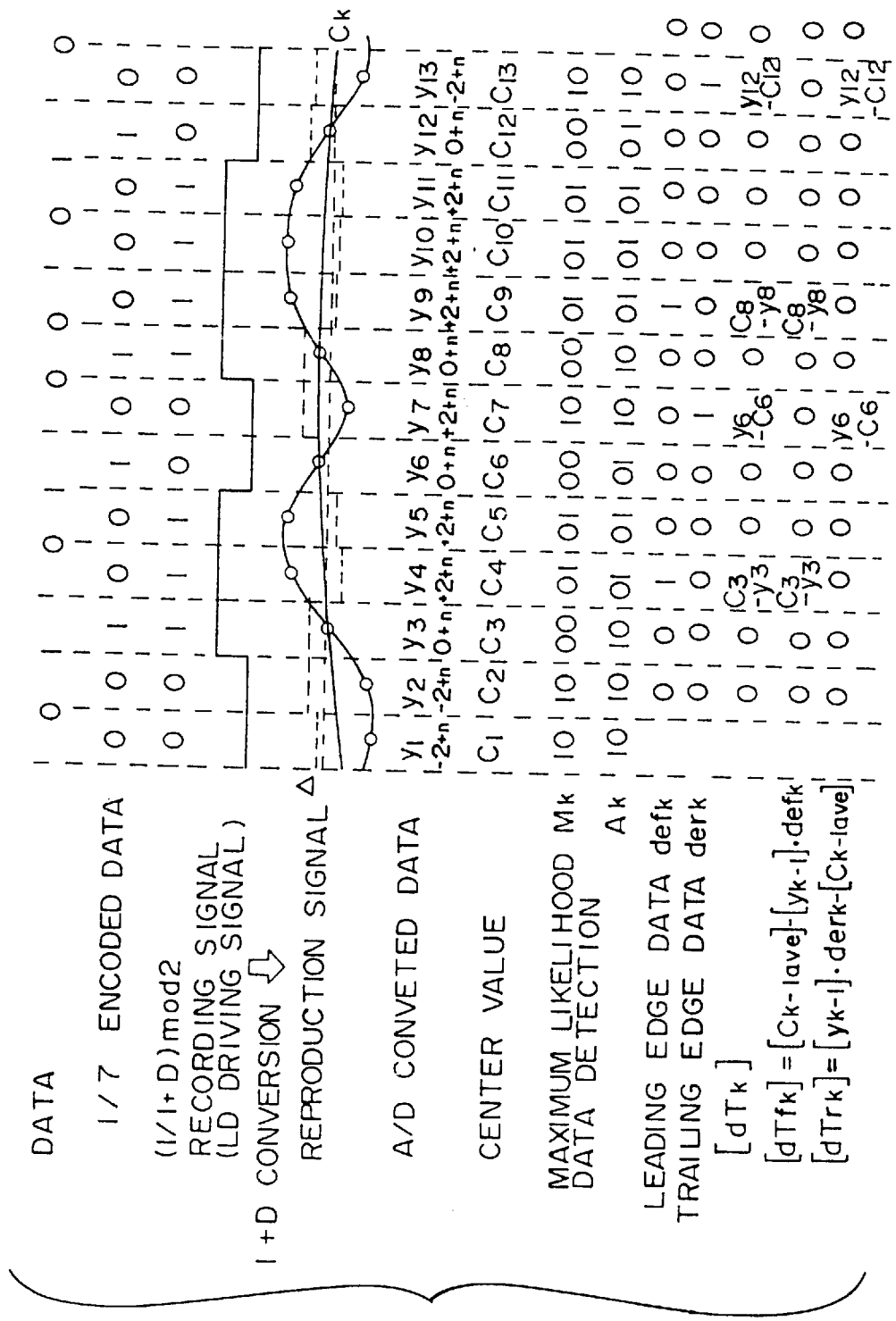
FIG. 54 is a timing chart illustrating signals in the recording system and the reproduction system.

The A/D converter 13 and the maximum likelihood data detecting circuit 14 operates in synchronism with the clock signal in the same manner as those shown in FIG. 44. For example, as shown in FIG. 54, the reproduction signal is sampled in synchronism with the clock signal, the phase of the clock signal being controlled based on the phase error data ($C_3-y_3$, $C_8$, ...) calculated at every clock timing (k=4, 9, ...) corresponding to the leading edge points and the phase error data ($y_6-C_6$, $y_{12}-C_{12}$, ...) calculated at every timing (k=7, 13, ...) corresponding to the trailing edge points. The center value $C_k$, the determination value $M_k$ and the variable $A_k$ are then calculated based on the sampling values. The leading edge data $def_k$ and the trailing edge data $der_k$ based on the determination value $M_k$ and the variable $A_k$ are output from the maximum likelihood data detecting circuit 14 in synchronism with the clock signal in which the phase thereof is controlled. Data sequence in which the leading edge data $def_k$ and the trailing edge data $der_k$ are alternately arranged is demodulated by the demodulator 10.

Figure 55:
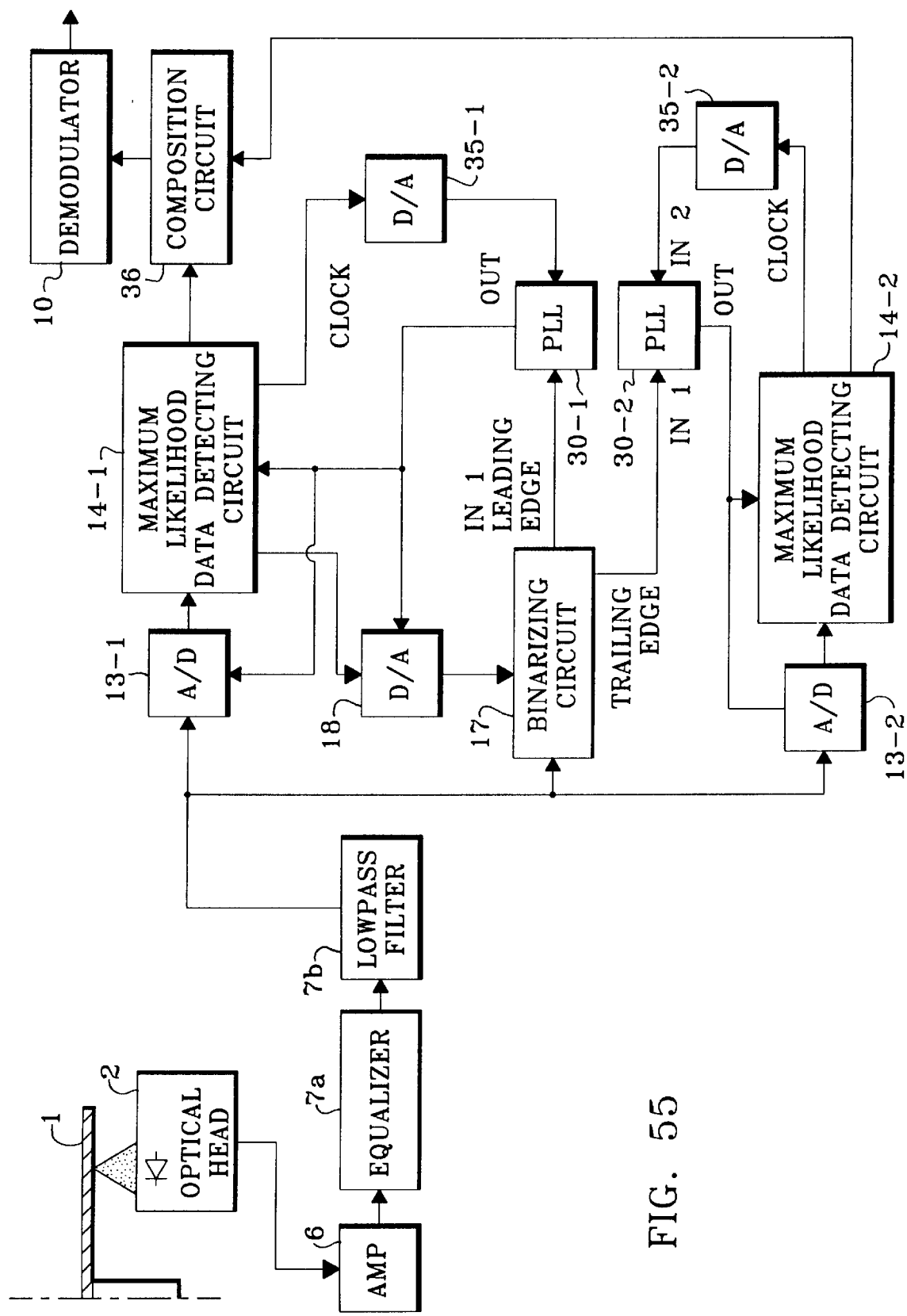
FIGS. 55, 56, 57, 58, 59 and 60 are block diagrams illustrating reproduction systems of the magneto-optical disk unit according to other embodiments of the present invention.

FIG. 55 shows an embodiment of the reproduction system in which the leading edge data and the trailing edge data are respectively calculated by using the leading edge synchronizing clock signal synchronized with the rising pints of the reproduction signal and the trailing edge synchronizing clock signal synchronized with the falling points of the reproduction signal. In this reproduction system, the leading edge synchronizing clock signal and the trailing edge synchronizing clock signal in both of which the phase are controlled as has been described above are obtained.

Referring to FIG. 55, the reproduction system has the optical disk 1, the optical head 2, the amplifier 6, the equalizer 7a, the low pass filter 7b, the D/A converter 18 and the binarizing circuit 17. The reproduction system further has, as a system relating to the leading edge synchronizing clock signal, a first A/D converter 13-1, a first maximum likelihood data detecting circuit 14-1, a first PLL circuit 30-1 and a first D/A converter 35-1. The reproduction system still further has, as a system relating to the trailing edge synchronizing clock signal, a second A/D converter 13-2, a second maximum likelihood data detecting circuit 14-2, a second PLL circuit 30-2 and a second D/A converter 35-2.

The first and the second maximum likelihood data detecting circuit 14-1 and 14-2 are formed in essentially the same manner as that shown in FIG. 47. The merge detecting unit 144 of each of the first and second maximum likelihood data detecting circuits 14-1 and 14-2 is formed as shown in FIG. 35. The merge detecting unit 144 of the first maximum likelihood data detecting circuit 14-1 outputs only the leading edge data $def_k$. The merge detecting unit 144 of the second maximum likelihood data detecting circuit 14-2 outputs only the trailing edge data $der_k$. The phase error detecting unit 145 of the first maximum likelihood detecting circuit 14-1 has the same structure as that shown in FIG. 49. The selector 1456 of the phase error detecting unit 145 selects, in accordance with the rule indicated in Table-4, an input terminal corresponding to a pair of the leading edge data $def_k$ and the trailing edge data $der_k$ from among the three input terminal A, B and C.

TABLE 4

| $def_k$ | $der_k$ | Select |
|---|---|---|
| 0 | 0 | A |
| 1 | 0 | B |
| 0 | 1 | A |
| 1 | 1 | A |

That is, at only clock timing corresponding to the leading edge points of the reproduction signal ($def_k=1$ and $der_k=0$), the leading edge phase error data ($C_{k-lave}-y_{k-1}$) supplied to the terminal B is output from the selector 1456. At other clock timing, the constant value "0" is always output from the selector 1456.

The center value $C_k$ from the first maximum likelihood data detecting circuit 14-1 is converted into a signal level by the D/A converter 18. The binarizing circuit 17 generates a binary signal using the signal level from the D/A converter 18 as the slice level. The binarizing circuit 17 outputs the leading edge detecting signal corresponding to the rising points of the binary signal and the trailing edge detecting signal corresponding to the falling points of the binary signal. The leading edge phase error data $dTf_k$ from the first maximum likelihood data detecting circuit 14-1 is converted into the phase error signal by the first D/A converter 35-1. The above leading edge detecting signal and the phase error signal are supplied to the first PLL circuit 30-1 which is formed as shown in FIG. 52. In the first PLL circuit 30-1, the phase of a clock signal generated therein is controlled based on the phase error signal and the leading edge detecting signal in the same manner as in the above case so that an phase error at each leading edge point is canceled. The clock signal whose phase is controlled is output as the leading edge synchronizing clock signal from the first PLL circuit 30-1.

The phase error detecting unit 145 of the second maximum likelihood data detecting circuit 14-2 is formed as shown in FIG. 49. The selector 1456 of the phase error detecting unit 145 selects, in accordance with a rule indicated in Table-5, an input terminal corresponding to a pair of the leading edge data $def_k$ and the trailing edge data $der_k$ from among the three input terminals A, B and C.

TABLE 5

| $def_k$ | $der_k$ | Select |
|---|---|---|
| 0 | 0 | A |
| 1 | 0 | A |
| 0 | 1 | C |
| 1 | 1 | A |

That is, at only clock timing corresponding to the trailing edge of the reproduction signal ($def_k=0$ and $der_k=1$), the trailing edge phase error data ($y_{k-1}-C_{k-lave}$) supplied to the input terminal C is output from the selector 1456. At other clock timing, the constant value "0" supplied to the input terminal A is output from the selector 1456. A system including the second PLL circuit 30-2 and the second D/A converter 35-2 controls the phase of a clock signal based on the leading edge detecting signal from the binarizing circuit 17 and the leading edge phase error data from the second maximum likelihood data detecting circuit 14-2. As result, the second PLL circuit 30-2 outputs the trailing edge synchronizing clock signal in which the phase thereof is controlled so that a phase error at each trailing edge point is canceled.

The leading edge data $def_k$ output from the first maximum likelihood data detecting circuit 14-1 and the trailing edge data $der_k$ output from the second maximum likelihood data detecting circuit 14-2 are combined with each other by the composition circuit 36 having an OR circuit. The composite data from the composition circuit 36 is demodulated by the demodulator 10.

Figure 56:
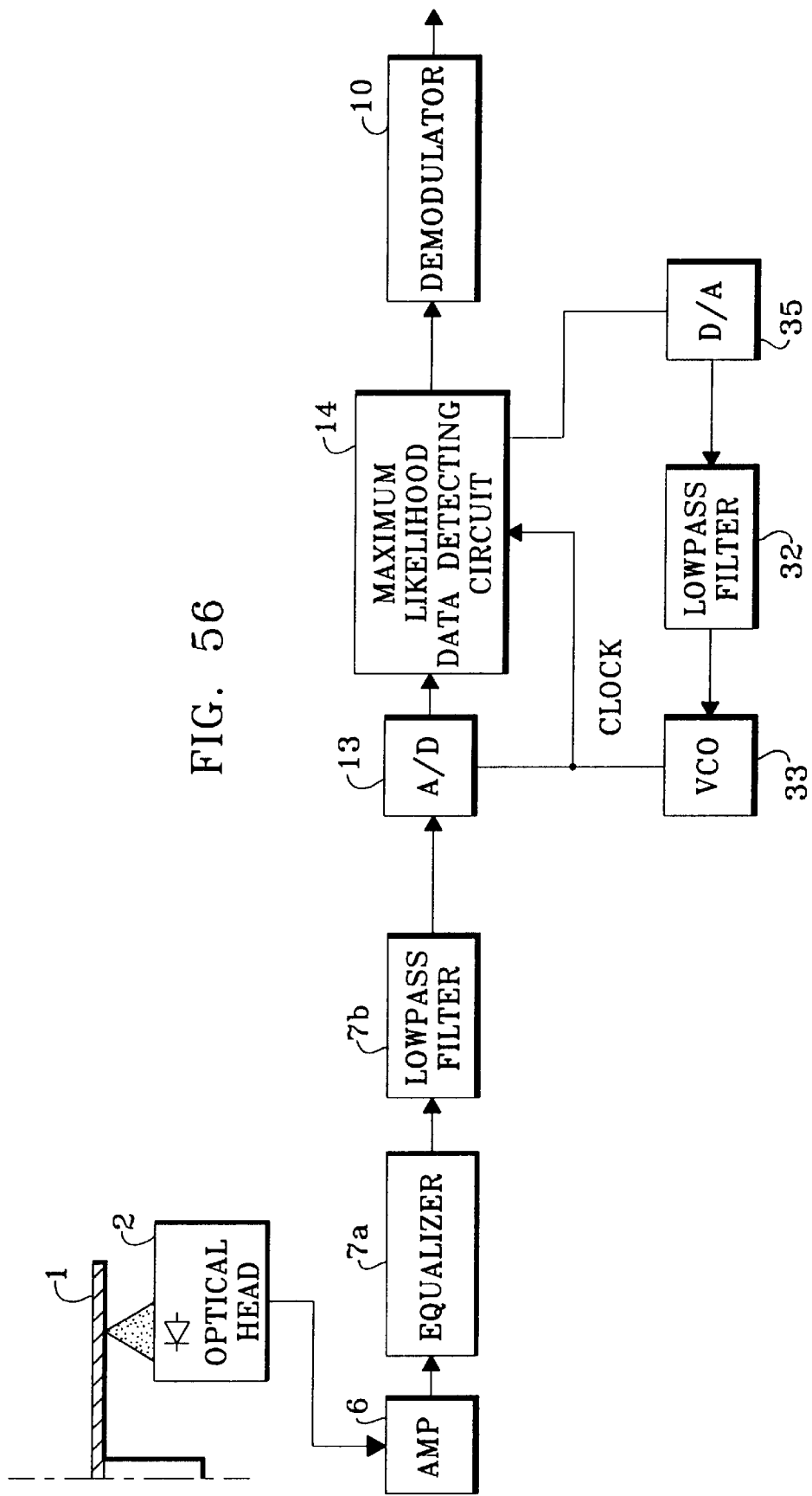

FIG. 56 shows an embodiment of the reproduction system in which the synchronizing signal is generated without using the binary signal generated from the reproduction signal. Referring to FIG. 56, the reproduction system has the optical disk 1, the optical head 2, the amplifier 6, the equalizer 7a, the low pass filter 7b, the A/D converter 13, the maximum likelihood data detecting circuit 14 and the demodulator 10. The reproduction system also has the D/A converter 35, a low pass filter 32 and a voltage controlled oscillator 33 (VCO). The maximum likelihood data detecting circuit is formed as shown in FIG. 47 and outputs the phase error data in the same manner as that in the previous embodiment. The phase error data is converted into the phase error signal (the rectangular shaped signal) by the D/A converter 35. The phase error signal is converted into a voltage level by the low pass filter 32. The voltage controlled oscillator 33 controls the phase of an output clock signal based on the voltage level supplied from the low pass filter 32. The voltage controlled oscillator 33 generates a reference clock signal which is the same as a synchronizing clock signal used to record data. In the voltage controlled oscillator 33, the phase of the reference clock signal is controlled based on the voltage level corresponding to the above phase error data. The clock signal from the voltage controlled oscillator 33 is supplied to the A/D converter 13 and the maximum likelihood data detecting circuit 14, so that the A/D converter and the maximum likelihood data detecting circuit 14 operate in synchronism with the clock signal.

In the reproduction system shown in FIG. 56, the phase error detecting unit 145 of the maximum likelihood data detecting circuit 14, the D/A converter 35, the low pass filter 32 and the voltage controlled oscillator 33 forms a so called PLL circuit. In a case where the phase of the reproduction signal is not largely varied, the clock signal accurately synchronized with the reproduction signal can be obtained by this system having the simple structure.

Figure 57:
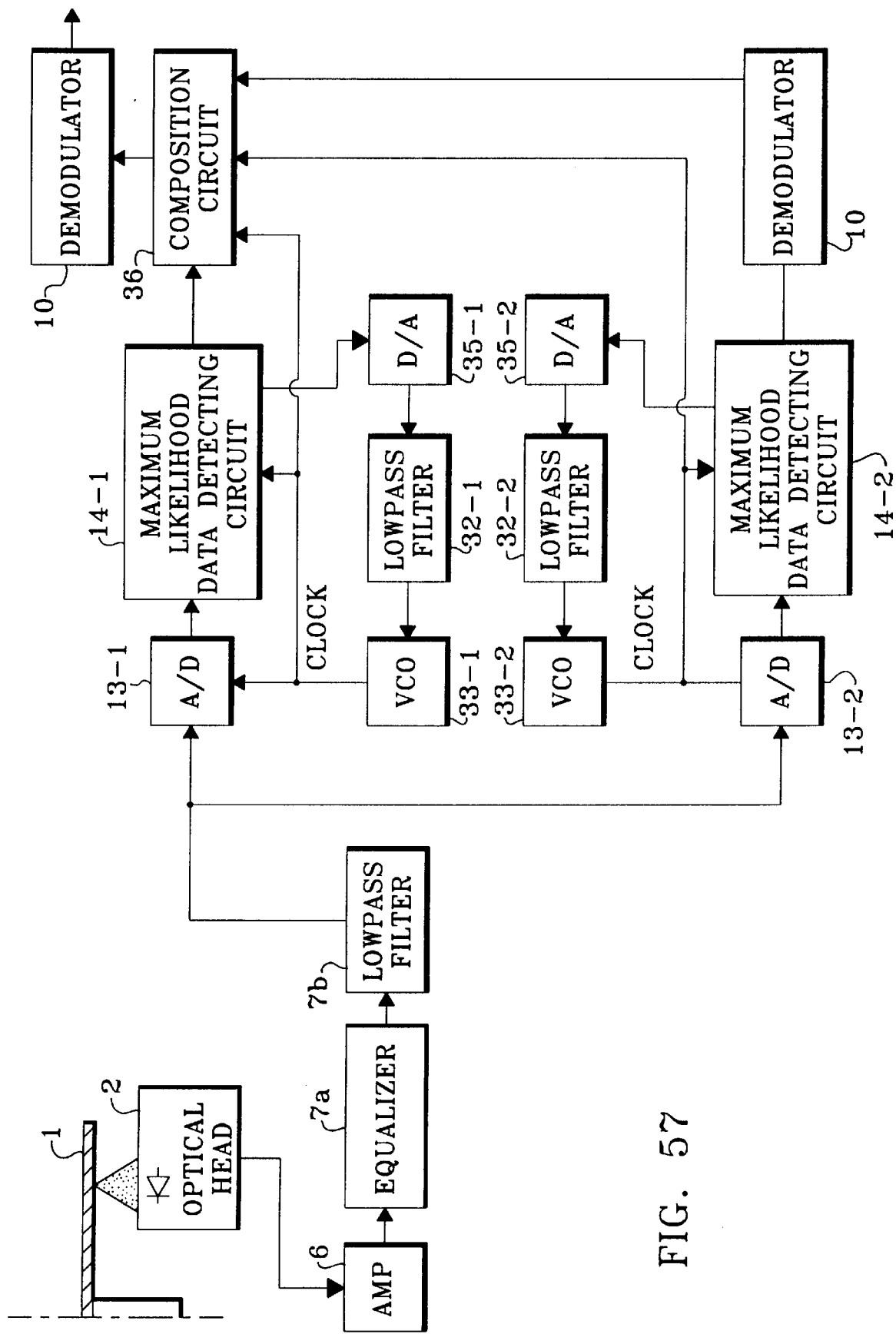

In an embodiment shown in FIG. 57, the technique of the phase control described with reference to FIG. 56 is applied to the reproduction system in which the leading edge data and the trailing edge data are separately detected. Referring to FIG. 57, the reproduction system has the optical disk 1, the optical head 2, the amplifier 6, the equalizer 7a and the low pass filter 7b. The reproduction system further has, as a system relating to the leading edge synchronizing clock signal, the first A/D converter 13-1, the first maximum likelihood data detecting circuit 14-1, the first D/A converter 35-1, a first low pass filter 32-1 and a first voltage controlled oscillator 33-1. The reproduction system still further has, as a system relating to the trailing edge synchronizing clock signal, the second A/D converter 13-2, the second maximum likelihood data detecting circuit 14-2, the second D/A converter 35-2, a second low pass filter 32-2 and a second voltage controlled oscillator 33-2. The first and second maximum likelihood data detecting circuits 14-1 and 14-2 have the same structure as that in the embodiment described with reference to FIG. 55. The system relating to the leading edge synchronizing clock signal and the system relating to the trailing edge synchronizing clock signal respectively have the same structure as a system including the A/D converter 13, the maximum likelihood data detecting circuit 14, the D/A converter 35, the low pass filter 32 and the voltage controlled oscillator 33 as shown in FIG. 56. The leading edge data is output, from the first maximum likelihood data detecting circuit 14-1, in synchronism with the leading edge synchronizing clock signal in which the phase thereof is controlled. The trailing edge data is output, from the second maximum likelihood data detecting circuit 14-2, in synchronism with the trailing edge synchronizing clock signal in which the phase thereof is controlled. The leading edge data and the trailing edge data respectively output from the first and second maximum likelihood data detecting circuit are combined with each other by the composition circuit 36. The composition circuit 36 is formed, for example, by using an FIFO (First-In First-Out) memory. The leading edge data is stored in the FIFO memory in synchronism with the leading edge synchronizing clock signal, and the trailing edge data stored in the FIFO in synchronism with the trailing edge synchronizing clock signal. The leading edge data and the trailing edge data stored in the FIFO memory are alternately read out from the FIFO memory in synchronism with one the leading edge synchronizing clock signal and the trailing edge synchronizing clock signal. As a result, the leading edge data and the trailing edge data are combined with each other. The composite data sequence output from the composition circuit 36 is demodulated by the demodulator 10.

Figure 58:
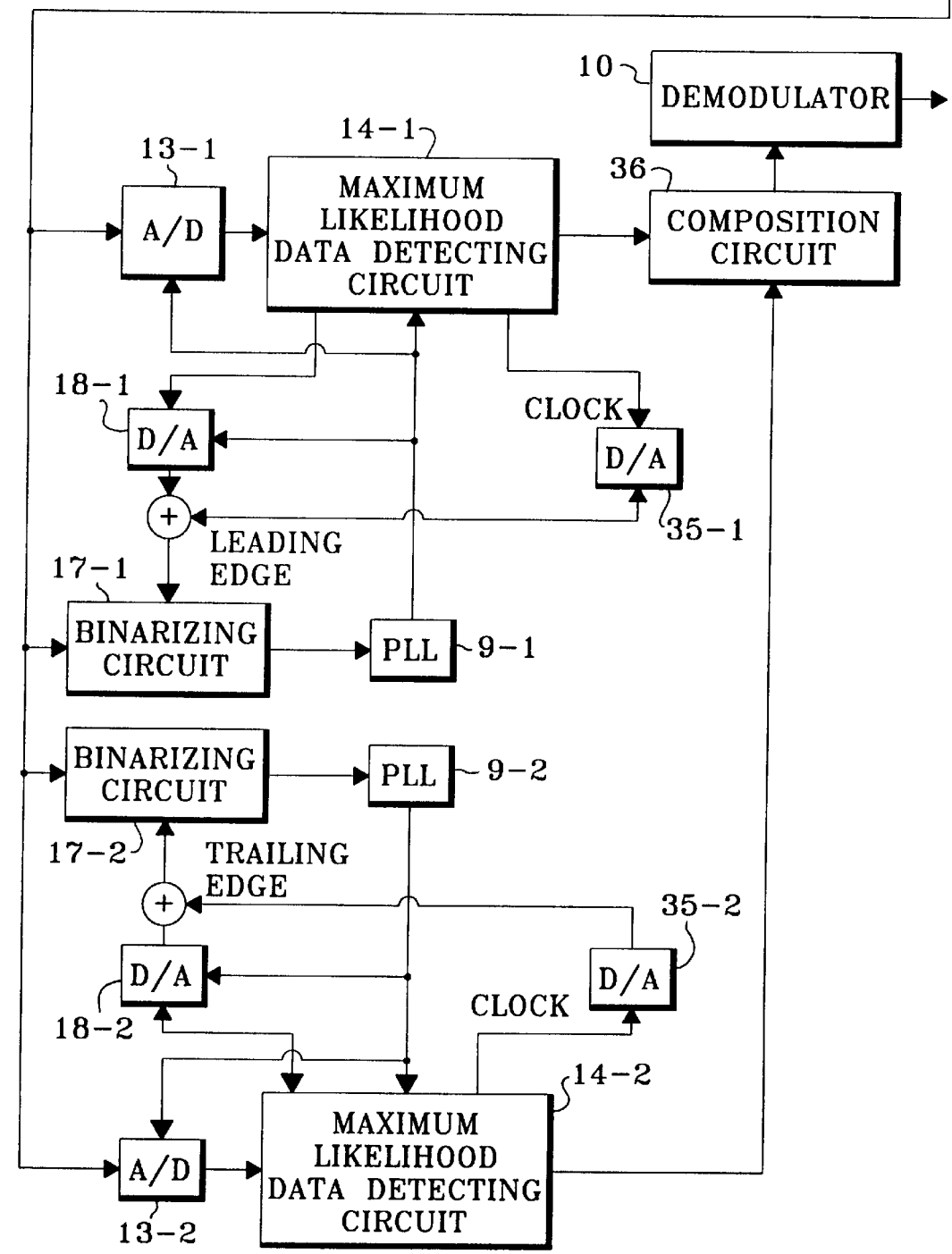

FIG. 58 shows an embodiment of the reproduction system having the system relating to the leading edge synchronizing clock signal and the system relating to the trailing edge synchronizing clock signal. In each of the systems, the slice level used to generate the binary signal from the reproduction signal is corrected so that the phase error is canceled. As a result, the leading edge synchronizing clock signal and the trailing edge synchronizing clock signal are respectively synchronized with the leading edge points and the trailing edge points of the reproduction signal accurately.

Referring to FIG. 58, the reproduction system has the optical disk 1, the optical head 2, the amplifier 6, the equalizer 7a and the low pass filter 7b. The reproduction system further has, as a system relating to the leading edge synchronizing clock signal, the first A/D converter 13-1, the first maximum likelihood data detecting circuit 14-1, a first center value D/A converter 18-1, a first binarizing circuit 17-1, a first phase error D/A converter 35-1 and a first PLL circuit 9-1. The reproduction system still further has, as a system relating to the trailing edge synchronizing clock signal, the second A/D converter 13-2, the second maximum likelihood data detecting circuit 14-2, a second center value D/A converter 18-2, a second binarizing circuit 17-2, a second phase error D/A converter 35-2 and a second PLL circuit 9-2.

In the system relating the leading edge synchronizing clock signal, the first A/D converter 13-1, the first maximum likelihood data detecting circuit 14-1 and the first phase error D/A converter 35-1 are the same as those shown in FIG. 55. The leading edge phase error signal is output from the first phase error D/A converter 35-1. The center value $C_k$ from the first maximum likelihood data detecting circuit 14-1 is converted into a voltage level by the first center value D/A converter 18-1. The level of the leading edge phase error signal from the first phase error D/A converter 35-1 is added to the voltage level from the center value D/A converter 18-1. The adding voltage level is supplied as a slice level to the first binarizing circuit 17-1. That is, this slice level is shifted from the center value of the reproduction signal by a level corresponding to the leading edge phase error. The first binarizing circuit 17-1 generates a binary signal from the reproduction signal by using the slice level supplied thereto, and outputs the leading edge detecting signal corresponding to the leading points of the binary signal. The first PLL circuit 9-1 controls the phase of an internal clock signal so that the internal clock signal is synchronized with the leading edge detecting signal from the first binarizing circuit 17-1. The phase controlled clock signal output from the first PLL circuit 9-1 is supplied, as the leading edge synchronizing clock signal, to the first A/D converter 13-1 and the first maximum likelihood data detecting circuit 14-1.

In ideal, the leading edge data is obtained when the reproduction has a value equal to the center value thereof (corresponding to the "no merge" state), as shown in FIGS. 50 and 51. When sampling data $y_k$ obtained at a leading edge point of the reproduction signal differs from the center value $C_k$ of the reproduction signal, the center value is corrected (shifted) so that the leading edge phase error corresponding to the difference between the sampling data $y_k$ and the center value $C_k$ is canceled. The corrected center value is used as the slice level to generate the binary signal. The leading edge synchronizing signal generated based on the leading edge detecting signal corresponding to the rising points of this binary signal is accurately synchronized with the leading edge points of the reproduction signal.

Also, in the system relating to the trailing edge synchronizing signal, the second A/D converter 13-2, the second maximum likelihood data detecting circuit 14-2 and the second phase error D/A converter 35-2 are the same as those shown in FIG. 55. Furthermore, the second center value D/A converter 18-1, the second binarizing circuit 17-1 and the second PLL circuit 9-2 are formed so as to correspond to those in the system relating the leading edge synchronizing clock signal as described above. In this system, a voltage level corresponding to the center value of the reproduction signal is corrected by a level corresponding to the trailing edge phase error, and the binarizing circuit 17-2 generates the binary signal from the reproduction signal by using this corrected voltage level as the slice level. The second PLL circuit 9-2 controls the phase of an internal clock signal so that the phase of the internal clock signal is synchronized with the trailing edge detecting signal corresponding to the falling points of the binary signal from the second binarizing circuit 17-2. The phase controlled clock signal is supplied, as the trailing edge synchronizing clock signal, from the second PLL circuit 9-2 to the second A/D converter 13-1 and the second maximum likelihood data detecting circuit 14-2. In this system relating to the trailing edge synchronizing clock signal, in a case where sampling data $y_k$ at a trailing edge point of the reproduction signal differs from the center value $C_k$ of the reproduction signal, the center value is corrected (shifted) so that the trailing edge phase error represented by the difference between the sampling data and the center value is canceled. The binary signal is generated from the reproduction signal by using the corrected center value as the slice level. The trailing edge synchronizing signal obtained based on the trailing edge detecting signal corresponding to falling points of the binary signal is accurately synchronized with trailing edge points of the reproduction signal.

Figure 59:
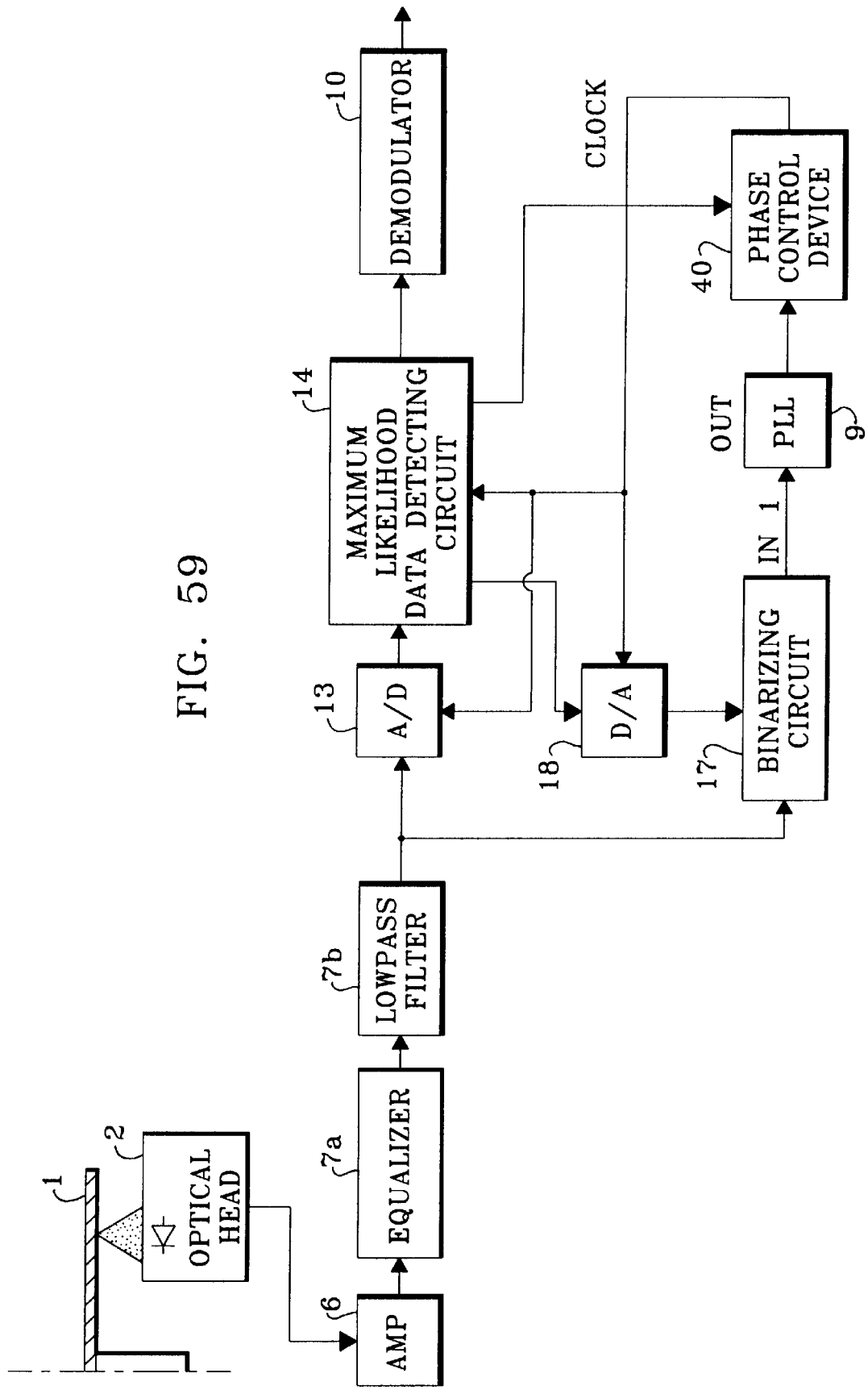

FIG. 59 shows an embodiment of the reproduction system in which the phase of the clock signal is controlled by using a phase control device. Referring to FIG. 59, the reproduction signal has, in the same manner as that shown in FIG. 44, the optical disk 1, the optical head 2, the amplifier 6, the equalizer 7a, the low pass filter 7b, the A/D converter 13, the maximum likelihood data detecting circuit 14, the D/A converter 18, the binarizing circuit 17, the PLL circuit 9 and the demodulator 10. The maximum likelihood data detecting circuit 14 has the phase error detecting unit 145 as shown in FIG. 47. The reproduction system also has a phase control device 40. The phase control device 40 controls the phase of the clock signal supplied from the PLL circuit 9 based on the phase error data from the phase error detecting unit 145 of the maximum likelihood data detecting circuit 14 so that the phase error is canceled. The phase control device 40 is formed, for example, of a variable delay circuit in which a plurality of delay lines are switched in accordance with the phase error signal.

According to this reproduction system, since the phase of the clock signal output from the PLL circuit 9 is controlled by the phase control device 40 so that the phase error is canceled, the phase of the clock signal can be brought close to points which should be ideally sampled from the reproduction signal.

The phase error data from the phase error detecting unit 145 is converted into the phase error signal which is an analog signal by a D/A converter, and the phase control device 40 may be formed so that the phase of the clock signal is controlled based on the analog phase error signal.

Figure 60:
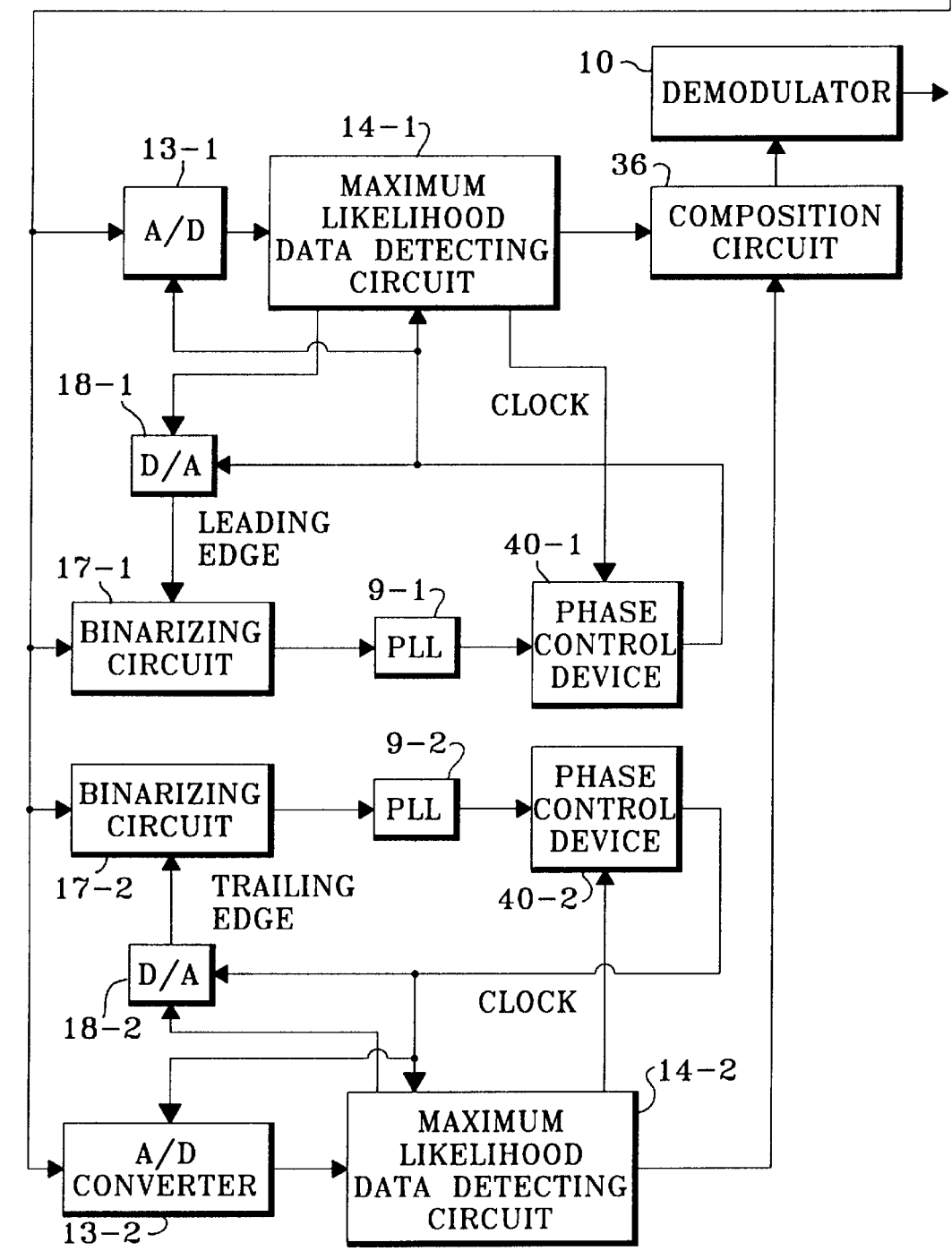

FIG. 60 shows an embodiment of the reproduction system separately detecting the leading edge data and the trailing edge data to which system the phase control technique described with reference to FIG. 59 is applied. Referring to FIG. 60, the reproduction system has the optical disk 1, the optical head 2, the amplifier 6, the equalizer 7a, the low pass filter 7b and the demodulator 10. The reproduction system further has, as a system relating to the leading edge synchronizing clock signal, the first A/D converter 13-1, the first maximum likelihood data detecting circuit 14-1, the first D/A converter 18-1, the first binarizing circuit 17-1, the first PLL circuit 9-1 and the a first phase control device 40-1. The reproduction system still further has, as a system relating to the trailing edge synchronizing clock signal, the second A/D converter 13-2, the second maximum likelihood data detecting circuit 14-2, the second D/A converter 18-2, the second binarizing circuit 17-2, the second PLL circuit 9-2 and a second phase control device 40-2.

The phase error detecting unit 145 of the first maximum likelihood data detecting circuit 14 outputs the leading edge phase error signal and the first binarizing circuit 17-1 outputs the leading edge detecting signal. The phase of the clock signal output from the first PLL circuit 9-1 which clock signal is synchronized with the leading edge detecting signal is controlled in accordance with the leading edge phase error data by the first phase control device 40-1. The clock signal in which the phase thereof is controlled by the first phase control device 40-1 is supplied, as the leading edge synchronizing clock signal, to the first A/D converter 13-1 and the first maximum likelihood data detecting circuit 14-1.

The phase error detecting unit 145 of the second maximum likelihood data detecting circuit 14 outputs the trailing edge phase error data. The second binarizing circuit 17-2 outputs the trailing edge detecting signal. The phase of the clock signal output from the second PLL circuit 9-2 which clock signal is synchronized with the trailing edge detecting signal is controlled in accordance with the trailing edge phase error data by the second control device 40-2. The clock signal in which the phase thereof is controlled by the second phase control device 40-2 is supplied, as the trailing edge synchronizing clock signal, to the second A/D converter 13-2 and the second maximum likelihood data detecting circuit 14-2.

Figure 61:
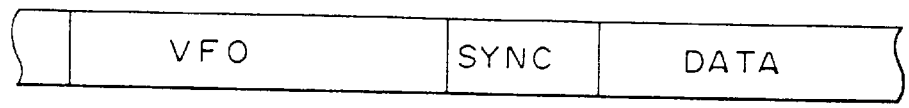
FIG. 61 is a diagram illustrating an example of a recording format of the optical disk (the magentooptical disk)

Normally, in the optical disk 1 used as a recording medium of the magneto-optic disk unit, information is recorded in sectors arranged on the track. The recording format is indicated, for example, in FIG. 61. Referring to FIG. 61, each sector has a VFO region, a Sync region and a data region (DATA). In the VFO region, a continuous repeat pattern having the highest density is recorded, and the phase of a synchronizing signal generated by a PLL circuit is locked at the phase of a clock signal corresponding to the repeat pattern. Thus, even if the rotation rate of the optical disk is not uniform, the synchronizing signal following the rotation of the optical disk can be obtained. As a result, accurate data can be sampled by using this synchronizing signal. In the Sync region, a specific pattern indicating a start point of the data region is recorded. In the data region (DATA), signal obtained by decoding data in accordance with the partial response characteristic as has been described above is recorded. In this case, the continuous repeat pattern signal is recorded in accordance with a recording rule of a predetermined partical response characteristic.

In the data region (DATA) of each sector in which random data signals have been recorded, the maximum likelihood data detecting operation described above is carried out. Since data is not simultaneously recorded in the respective sectors, optimum values of constants.used in the maximum likelihood data detecting operation in respective sectors differ from each other based on recording conditions. Thus, in the following embodiment, various constants used in the maximum likelihood data detecting operation are decided based on a reproduction signal (corresponding to the continuous repeat pattern having the highest density) from the VFO region of each sector.

In addition, in a case where information obtained by the maximum likelihood data detecting circuit is used to decide, based on the reproduction signal from the VFO region, the various constants used in the maximum likelihood detecting operation, an optimum initial value of a constant must be supplied to the maximum likelihood data detecting circuit.

Figure 62:
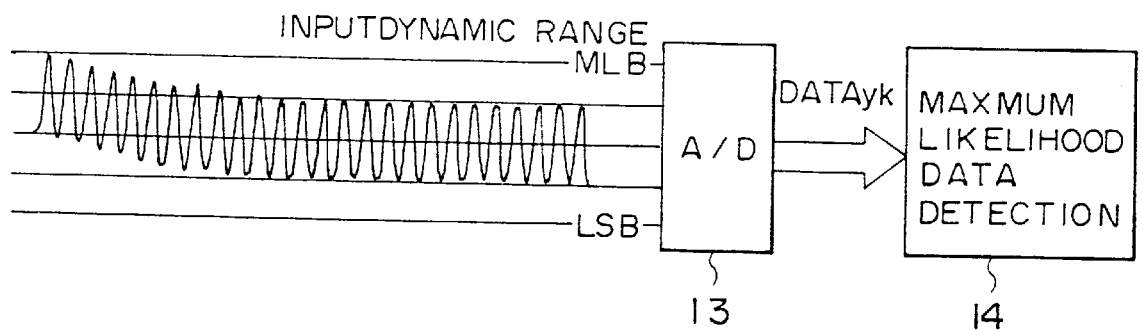
FIG. 62 is a waveform chart illustrating a state of a reproduction signal in a VFO region.

In the reproduction system of the magneto-optical disk unit having an AC-coupled circuit, transient occurs in the reproduction signal having the repeat pattern starting from a leading portion of the VFO region, as shown in FIG. 62. That is, the reproduction signal supplied to the A/D converter 13 largely varies in the leading portion of the VFO region. If, under this condition, the maximum likelihood data detecting circuit 14 carrying out the maximum likelihood data detecting operation using the center value $C_{kave}$ of the reproduction signal uses a fixed initial value of the center value, the accurate maximum likelihood data detecting operation following the transient of the reproduction signal cannot be performed. Thus, in the following embodiment, when various constants used in the maximum likelihood data detecting operation are decided based on the reproduction signal from the VFO region of each sector, an initial value of the accurate center value $C_{kave}$ following variation of the reproduction signal is supplied to the maximum likelihood data detecting circuit.

Furthermore, in the reproduction system as has been described above, the waveform of the reproduction signal is equalized by the equalizer 7a. The equalizer 7a is formed, for example, of an analog transversal equalizer. However, in a case where data has been recorded in a high density in accordance with, for example, an MCAV (Modified-Constant Angular Velocity) method, delay time in the equalizer must be changed at an outer position and an inner position of the optical disk 1 (in accordance with a position of a sector in a radial direction of the optical disk 1). Thus, it is difficult for the analog transversal equalizer to adjust the delay time. In addition, it is difficult for a digital equalizer to fine set an equalizing target value. Thus, furthermore, in the following embodiment, an equalizer in which a characteristic is changed in accordance with a position of a sector so that a reproduction signal is adaptively equalized is provided.

Figure 63:
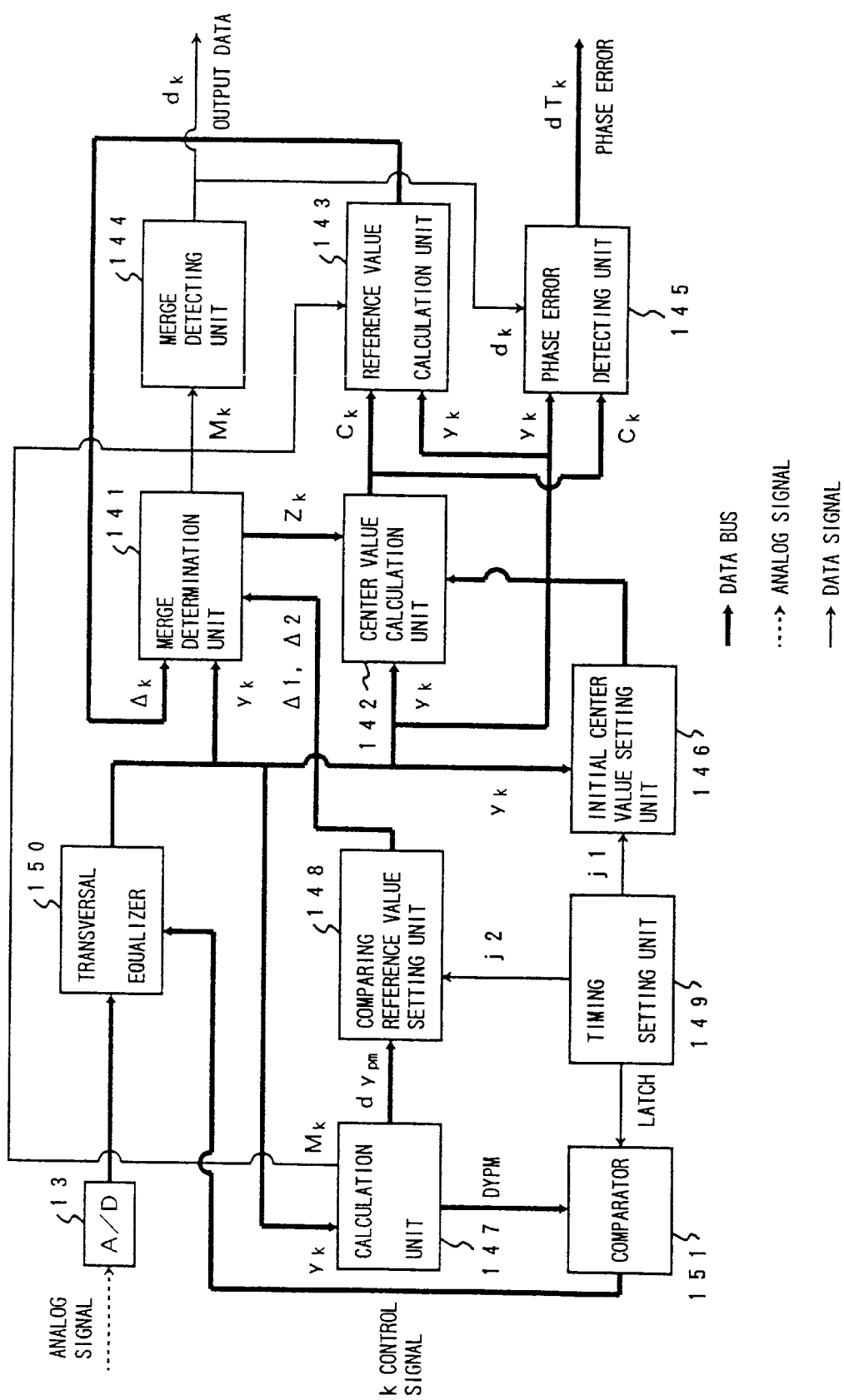
FIG. 63 is a block diagram illustrating another example of the maximum likelihood data detecting circuit.

The maximum likelihood data detecting circuit 14 according to the embodiment is formed, for example, as shown in FIG. 63.

Referring to FIG. 63, the maximum likelihood data detecting circuit 14 has, in the same manner as that shown in FIG. 47, the merge determination unit 141, the center value calculation unit 142, the reference value calculation unit 143, the merge detecting unit 144 and the phase error detecting unit 145. The maximum likelihood data detecting circuit also has an initial center value setting unit 146, a calculation unit 147, a comparing reference value setting unit 148, a timing setting unit 149 and a comparator 151. The maximum likelihood data detecting circuit 13 further includes a digital transversal equalizer 150 substituted for the analog equalizer 7a.

Figure 64:
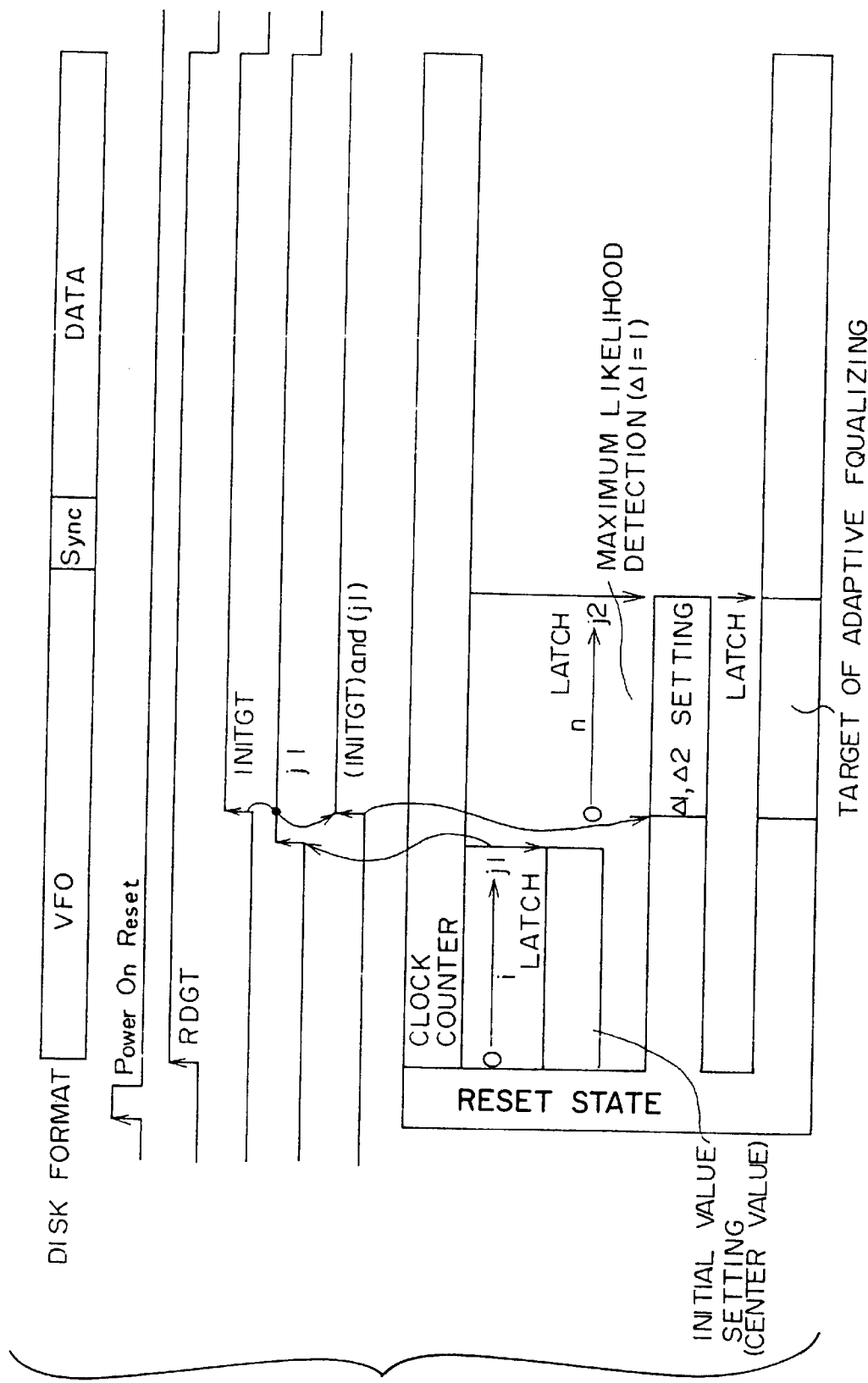
FIG. 64 is a timing chart illustrating process timing in each sector.

In this maximum likelihood data detecting circuit 14, various processes are performed in the VFO region of each sector in accordance with a timing chart shown in FIG. 64. That is, at a time when a power-on-reset signal rises due to a power on operation or a forced reset operation, the maximum likelihood data detecting circuit 14 is in a reset state. Then, when a MO read gate signal (RDGT) rises in the neighbor of the leading portion of the VFO region, a clock counter in the timing setting unit 146 is activated and the initial center value setting unit 146 starts a process for calculating an initial value of the center value based on the reproduction signal from the VFO region. In this case, sampling values $y_k$ are supplied from the A/D converter operating in synchronism with a clock signal CLK from the PLL circuit to the initial center value setting unit 146 via the transversal equalizer 150. Constants in the transversal equalizer have been set at default values. A center value obtained when the value of the clock counter in the timing setting unit 149 reaches j1 is latched, as an initial value, in the initial center value setting unit 146.

When the initial value of the center value is latched in the initial center value setting unit 146 (the value of the clock counter reaches j1) and a gate signal INITGT, the clock counter is reset to "0". The calculation for obtaining various constants used in the maximum likelihood data detecting circuit 14 is then started. The gate signal INITGT indicates that the PLL circuit is in a locked sate. In this embodiment, comparing reference values Δ1 and Δ2 will be described later and an adaptive equalizing target used in the transversal equalizer 150 are calculated. The comparing reference values Δ1 and Δ2 are calculated by the comparing reference value setting unit 148, and the adaptive equalizing target is calculated by the calculation unit 147. At a time when the value of the clock counter reaches j2, the comparing reference values Δ1 and Δ2 are latched in the comparing reference value setting unit 148, and the adaptive equalizing target is supplied to from the calculation unit 147 to the comparator 151. The adaptive equalizing target is then latched in the comparator 151.

A description will now be given of the comparing reference values Δ1 and Δ2.

In the merge determination unit 141 of the maximum likelihood data detecting circuit 14, it is determined, in accordance with the procedure shown in FIG. 21, what the merge state (the state of the data transition) corresponding to each sampling value is. In this case, when it is supposed as shown in FIG. 29 that the positive peak value of the reproduction signal is "2" and the negative peak value of the reproduction signal is "−2", constant values "1" and "−1" used as references of determination of the merge state ("+merge" ($M_k$=01), "−merge" ($M_k$=10) or "no merge" ($M_k$=00)) are optimum values ($Z_k$>1, $Z_k$<−1, −1≦$Z_k$≦1). These constant values "1" and "−1" are used also in the reference value calculation unit 143 as shown in FIG. 23 ($\Delta_{k+1}$=2$C_{kave}$−$y_k$−1, $\Delta_{k+1}$k=2$C_{kave}$k−$y_k$+1). The constant used in the merge determination process, such as the constant "1", is generally defined as the comparing reference value Δ1. The absolute value of the above constant ("1" and "−1") is one fourth of the amplitude "4" (=2−(−2)) of the ideal reproduction signal. Thus, the comparing reference value Δ1 is defined as a value being one fourth of the amplitude of the reproduction signal.

In the center value calculation unit 142 of the maximum likelihood data detecting circuit 14, the center value data $C_{kd}$ is calculated in accordance with the procedure shown in FIG. 22. In this case, the constant values "2" and "−2" which are used as references to select a calculation formula for calculating the center value data $C_{kd}$ ($Z_k$>2, $Z_k$<−2, −2≦$Z_k$≦2) are optimum values when it is supposed that the positive and negative peak values of the reproduction signal are respectively "2" and "−2". the constant value used as the references, such as "2", is generally defined as the comparing reference value Δ2. The absolute value of the constant value ("2" or "−2") is one half of the amplitude "4" of the ideal reproduction signal. Thus, this comparing reference value Δ2 is defined as a value being one half of the amplitude of the reproduction signal.

Figure 65:
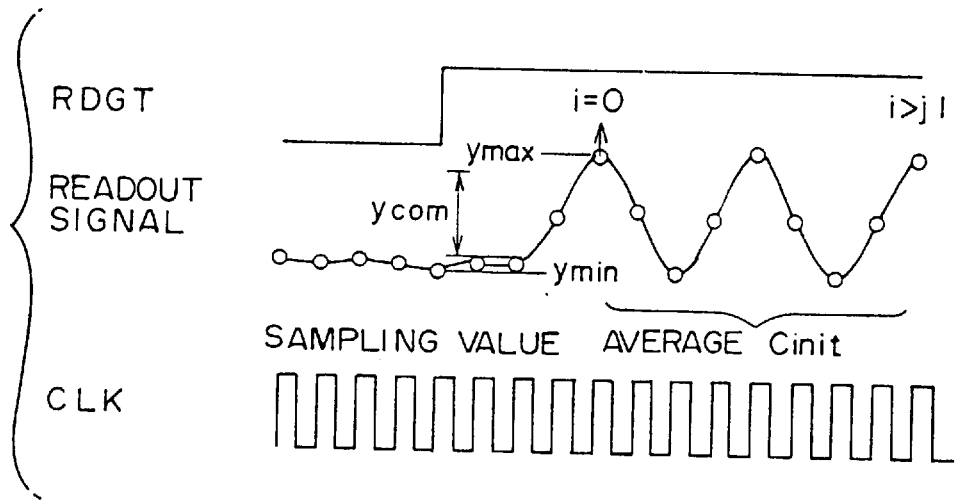
FIG. 65 is a diagram illustrating the principle of the calculation for obtaining an initial center value.

The principle of the calculation for obtaining an initial value of the center value $C_{kave}$ used for the maximum likelihood data detecting process is shown in FIG. 65. That is, when the difference between the maximum sampling value $y_{max}$ and the minimum sampling value $y_{min}$ is equal to or greater than a predetermined value $y_{com}$, it is determined that the reproduction signal corresponding to the repeat pattern of the VFO region is activated. After this, an average of j1 sampling values is calculated. This average value is set as the initial value of the center value. The total number j1 which is the number of sampling values is integer times as large as the number of values which are sampled in one cycle of the reproduction signal. In a case where the total number j1 of sampling values is integer times as large as the number of values sampled in one cycle of the reproduction signal, even if the sampling values are obtained in synchronism with the clock signal from the PLL circuit which clock signal is not synchronized with the reproduction signal, the average of the sampling values always corresponds to the center value of the reproduction signal.

Figure 66:
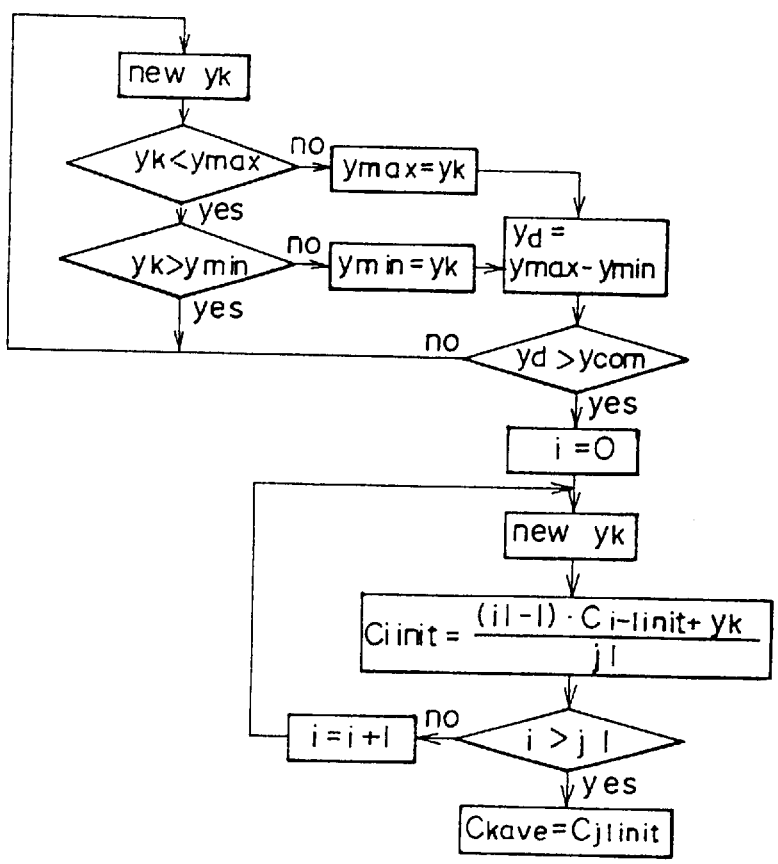
FIG. 66 is a flow chart illustrating a procedure for obtaining an initial center value.

The initial center value setting unit 146 for calculating the initial value of the center value in accordance with the above principle executes, for example, a procedure shown in FIG. 66.

When a new sampling value $y_k$, it is determined whether or not the new sampling value $y_k$ is greater than the maximum sampling value $y_{max}$ which has been previously obtained. If the new sampling value $y_k$ is greater than the previous maximum sampling value $y_{max}$, the maximum sampling value $y_{max}$ is updated to the new sampling value $y_k$ ($y_{max}$=$y_k$). If the new sampling value $y_k$ is less than the minimum sampling value which has been previously obtained, the minimum sampling value $y_{min}$ is updated to the new sampling value $y_k$ ($y_{min}$=$y_k$). When the maximum sampling value $y_{max}$ is updated or when the minimum sampling value $y_{min}$ is updated, the difference $y_d$ between the maximum sampling value $y_{max}$ and the minimum sampling value $y_{min}$ is calculated ($y_d$=$y_{max}$−$y_{min}$). Until the difference $y_d$ becomes greater than the predetermined value $y_{com}$, the process for updating the maximum sampling value $y_{max}$ and the minimum sampling value $y_{min}$ is being performed. When the difference $y_d$ between the maximum sampling value $y_{max}$ and the minimum sampling value $y_{min}$ exceeds the predetermined value $y_{com}$, it is determined that the reproduction signal corresponding to the repeat pattern on the VFO region is activated. The calculation of the center value starts. In the calculation of the center value, the count value i is initialized at "0". After his, every time a new sampling value $y_k$ is supplied, a value $C_{iinit}$ is calculated in accordance with the following formula.

$$C_{iinit}=\{(j1-1)\vee C_{i-linit}+y\}/j1$$

The count value (i) is incremented by one (i=i+1). Until the total number of sampling values reaches j1 (i =j1), the above calculation is repeated. A calculation value $C_{jlinit}$ obtained when the count value reaches j1 is an average of j1 sampling values. That is, this calculation value $C_{jlinit}$ represents the center value of the reproduction signal. Thus, the calculation value $C_{jlinit}$ obtained when the count value reaches j1 is latched as the initial value of the center value $C_{kave}$ in the initial center value setting unit 146 ($C_{kave}$=$C_{jlinit}$).

When the initial value of the center value is latched in the initial center value setting unit 146 as described above, the initial value is supplied to the center value calculation unit 142 and the reference value calculation unit 143 carries out the calculation using the initial value of the center value (see FIG. 23). After this, the center value calculation unit 142 successively updates the center value, starting from the initial value, based on sampling values (see FIG. 22). After the initial value of the center value is decided and until the comparing reference values Δ1 and Δ2 as will be described later are decided, in the merge determination unit 141 and the reference value calculation unit 143, the constant "1" is used as the comparing reference value Δ1. Further, during this period, in the center value calculation unit 142, the constant "2" is used as the comparing reference value Δ2.

The comparing reference values Δ1 and Δ2 are calculated by the calculation unit 147 and the comparing reference value setting unit 148 as follows.

Figure 67:
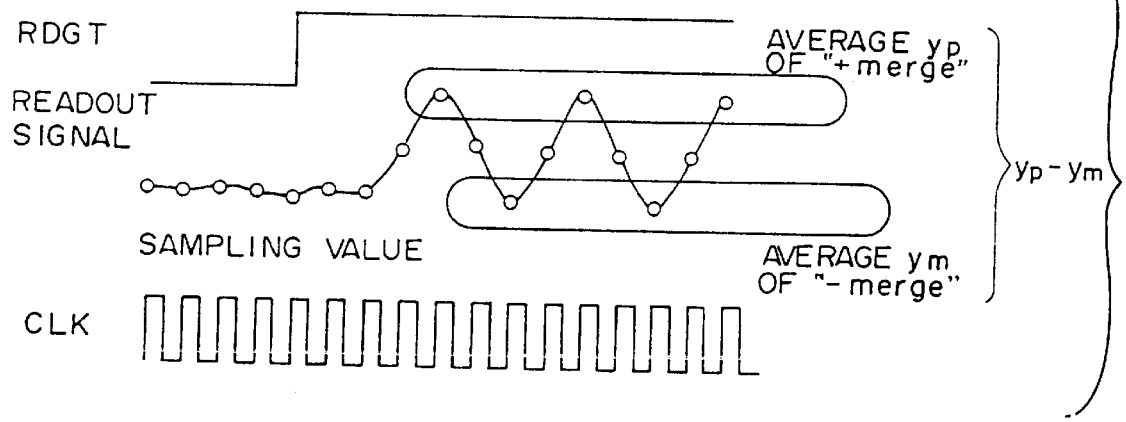
FIG. 67 is a diagram illustrating the principle of the calculation for obtaining comparative reference values $\Delta1$ and $\Delta2$.

First, the principle of the calculation for obtaining the amplitude of the reproduction signal corresponding to the repeat pattern on the VFO region is shown in FIG. 67. In a state where the PLL circuit is locked (the gate signal INTIGT has a high level), substantially positive and negative peak values are sampled from the reproduction signal in synchronism with the clock signal from the PLL circuit. When the positive peak value is sampled, the merge determination unit 141 outputs the determination result $M_k$=01 ("+merge"). When the negative peak value is sampled, the merge determination unit 141 outputs the determination result $M_k$=10 ("−merge"). Thus, comparing reference value setting unit 148 calculates, as the amplitude of the reproduction signal, a difference $dy_{pm}$ between an average of sampling values $y_p$ obtained when the determination result is "+merge" ($M_k$=01) and an average of sampling values $y_m$ obtained when the determination result is "−merge" ($M_k$=10) ($dy_{pm}=y_p-y_m$).

Figure 68:
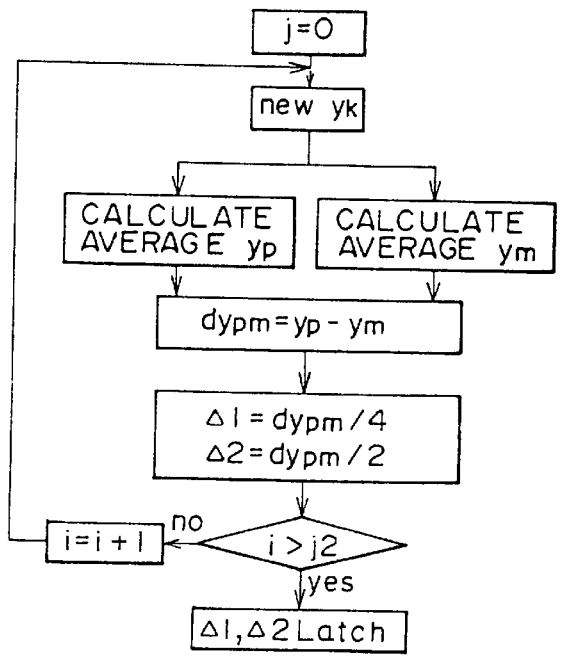
FIG. 68 is a flow chart illustrating a procedure for obtaining comparative reference value $\Delta1$ and $\Delta2$.

The calculation unit 147 and the comparing reference value setting unit 148 execute processes in accordance with a procedure shown in FIG. 68. First, in the calculation unit 147, after the value i of the clock counter is reset to "0", an average of positive peak values $y_p$ of the sampling values and an average of negative peak values $y_m$ of the sampling values are calculated in accordance with the determination results ("+merge" and "−merge") from the merge determination unit 141. The difference $dy_{pm}$ between the average of the positive peak values $y_p$ and the average of the negative peak values $y_m$ is then calculated ($dy_{pm}=y_p-y_m$). After this, the comparing reference value setting unit 148 performs a calculation in which the difference $dy_{pm}$ is divided by four to obtain the comparing reference value $\Delta 1$ ($\Delta 1 = dy_{pm}/4$). The comparing reference value setting unit 148 further performs a calculation in which the difference $dy_{pm}$ is divided by two to obtain the comparing reference value $\Delta 2$ ($\Delta 2 = dy_{pm}/2$). The above calculations in the calculation unit 147 and the comparing reference setting unit 148 are repeated until the clock count value i (equal to the number of sampling values) reaches j2. The calculation unit 147 outputs, as the amplitude of the reproduction signal, the difference $dy_{pm}$ obtained when the clock counter value reaches j2. The comparing reference values $\Delta 1$ and $\Delta 2$ obtained at this time are latched in the comparing reference value setting unit 148.

Figure 69:
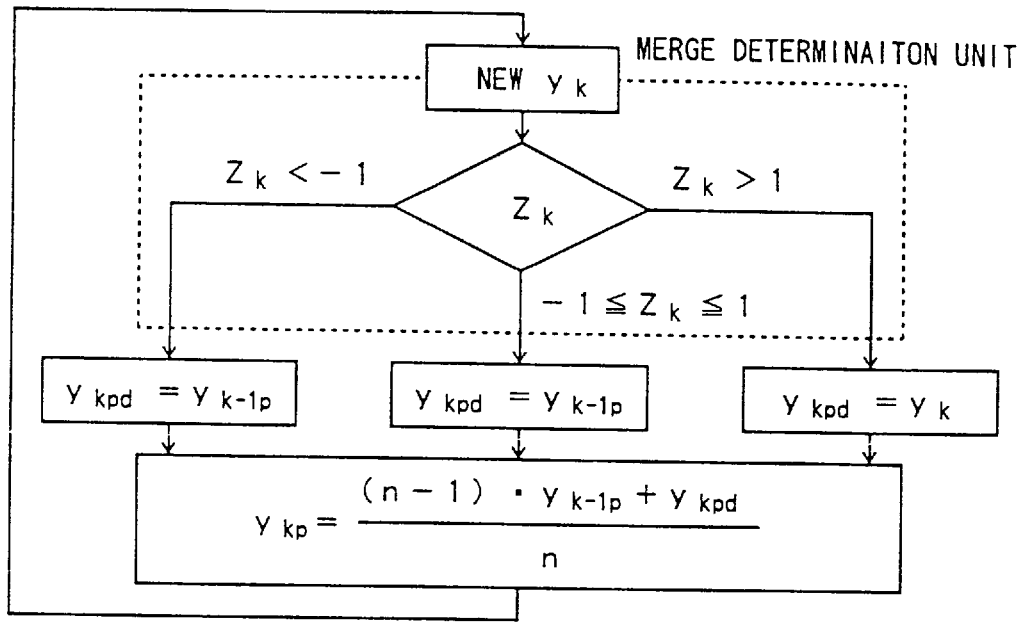
FIG. 69 is a flow chart illustrating a procedure for obtaining an average value of positive peak values.
Figure 70:
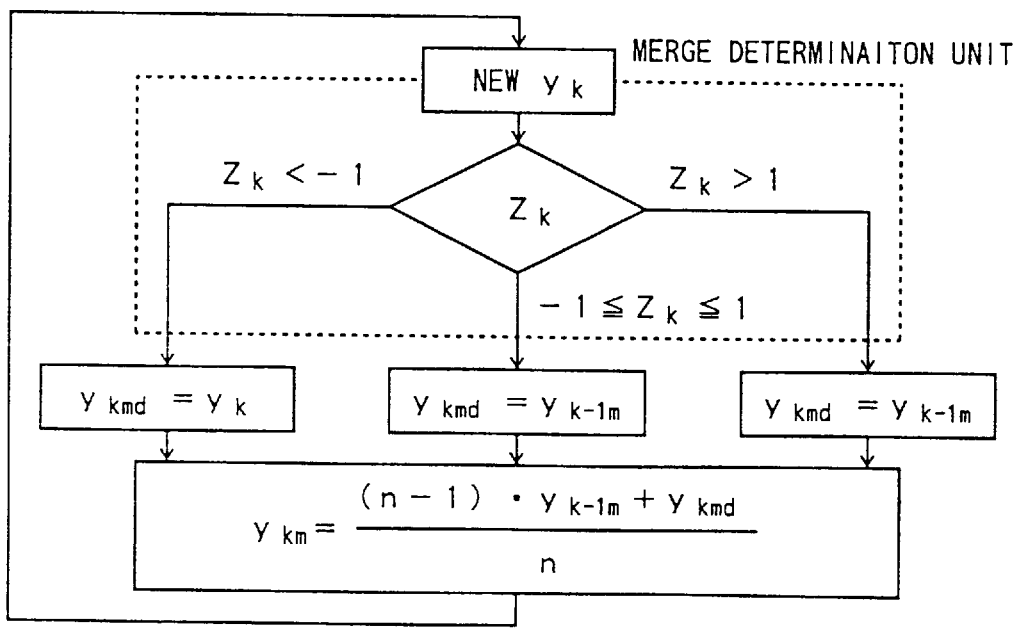
FIG. 70 is a flow chart illustrating a procedure for obtaining an average value of negative peak values.

The calculation unit 147 carries out the calculation for obtaining the average of the positive peak values $y_p$ and the calculation for obtaining the average of the negative peak values $y_m$ in accordance with procedures shown in FIG. 69 and 70 respectively.

That is, when the merge determination unit 141 outputs the determination result "+merge" ($Z_k>1$), the sampling value $y_k$ is used as a variable $y_{kpd}$ ($y_{kpd}=y_k$) and an average $y_{kp}$ of positive peak values are calculated in accordance with the following formula (see FIG. 69):

$$y_{kp}=\{(i-1)\cdot y_{k-1p}+y_{kpd}\}/i.$$

In this case ("+merge"), the average $y_{kp}$ of the positive peak values is updated using a new sampling value $y_k$. In addition, when the merge determination unit 141 outputs the determination result "+merge" ($Z_k>1$), the average $y_{k-1m}$ of the negative peak values which average has been the previous timing k−1 is used as a variable $y_{kmd}$ ($y_{kmd}=y_{k-1m}$) and an average $y_{km}$ of negative peak values are calculated in accordance with the following formula (see FIG. 70):

$$y_{km}=\{(i-1)\cdot y_{k-1m}+y_{kmd}\}/i.$$

In this case ("+merge"), the average $y_{km}$ at this timing (i=k) is equal to the average $y_{k-1m}$ which has been obtained at the previous timing (i=k−1). That is, a new sampling value $y_k$ is not substantially used to update the average of the negative peak values.

When the merge determination unit 141 outputs the determination result "−merge" ($Z_k<-1$), the average $y_{k-1p}$ of the positive peak values which has been calculated at the previous timing (i=k−1) is used as the variable $y_{kpd}$ ($y_{kpd}=y_{k-1p}$) and the average $y_{kp}$ of the positive peak values is calculated in accordance with the above formula (see FIG. 69). In this case ("−merge"), the average $y_{kp}$ of the positive peak values calculated at this timing (i=k) is equal to the average $y_{k-1p}$ of the positive peak values which has been calculated at the previous timing (i=k−1). That is, a new sampling value $y_k$ is not substantially used to updating the average of the positive peak values. In addition, when the merge determination unit 141 outputs the determination result "−merge" ($Z_k<-1$), the sampling value $y_k$ is used as the variable $y_{kmd}$ ($y_{kmd}=y_k$) and the average $y_{km}$ of the negative peak values in accordance with the above formula (see FIG. 70). In this case ("−merge"), the average $y_{km}$ of the negative peak values is updated by using the new sampling value $y_k$.

When the merge determination unit 141 outputs the determination result "no merge" ($-1 \leq Z_k \leq 1$), in the respective calculations for updating the average $y_{kp}$ of the positive peak values and for updating the average $y_{km}$ of the negative peak values, the average $y_{k-1p}$ of the positive peak values and the average $y_{k-1m}$ of the negative peak values both of which have been calculated at the previous timing (i=k−1) are respective used as the variables $y_{kpd}$ and $y_{kmp}$ ($y_{kpd}=y_{k-1p}$ and $y_{kmd}=y_{k-1m}$). The average $y_{kp}$ of the positive peak values and the average $y_{km}$ of the negative peak values are respectively calculated in accordance with the above formulas (see FIG. 69 and FIG. 70). In this case ("no merge"), the average $y_{kp}$ of the positive peak values and the average $y_{km}$ of the negative peak values which are calculated at this timing (i=k) are respectively equal to the averages $y_{k-1p}$ and $y_{k-1m}$ which have been calculated at the previous timing (i=k−1). Thus, the sampling value $y_k$ is not substantially used to update the average $y_{kp}$ of the positive peak values and to update the average $y_{km}$ of the negative peak values.

Figure 71:
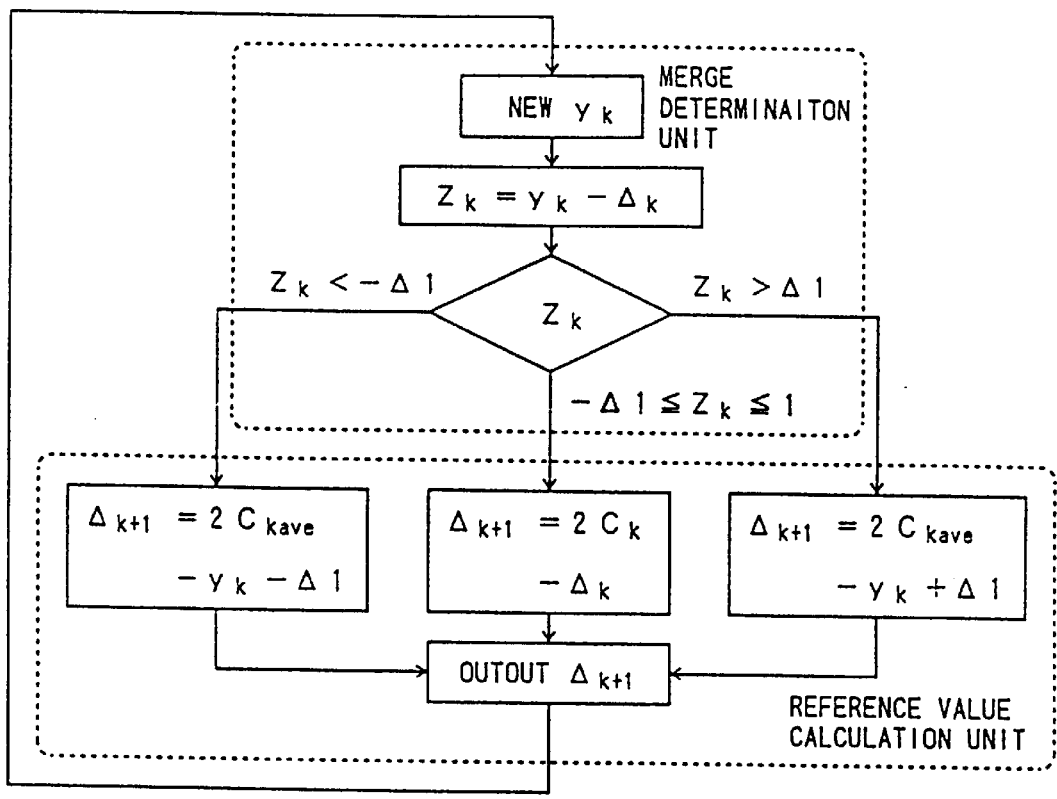
FIG. 71 is a flow chart illustrating processes in the merge determination unit and reference value calculation unit in which the comparative reference value $\Delta1$ has been set.
Figure 72:
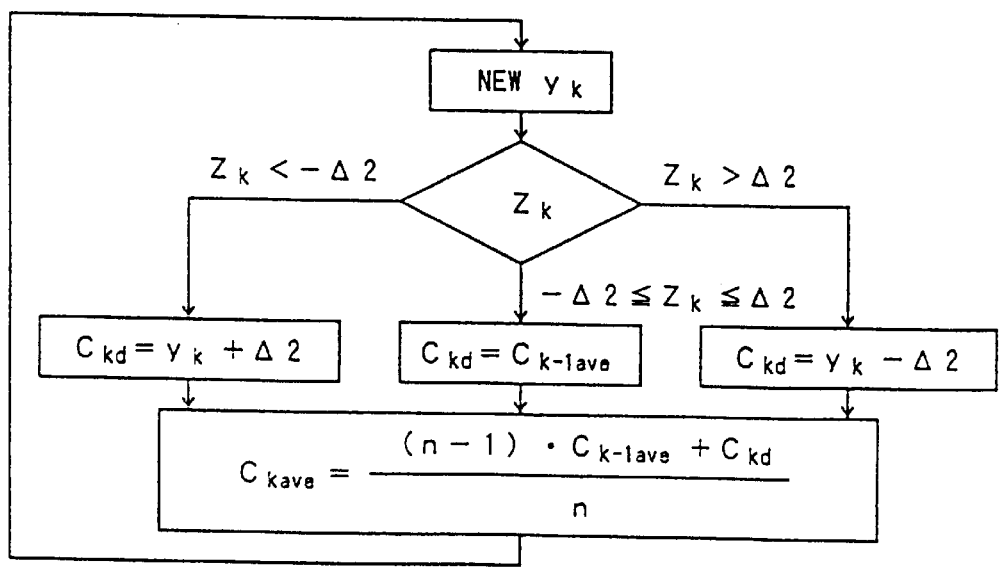
FIG. 72 is a flow chart illustrating a process in the center value calculation unit in which the comparative reference value $\Delta2$ has been set.

When the clock count value reaches j2 and the comparing reference values $\Delta 1$ and $\Delta 2$ are latched, the comparing reference value $\Delta 1$ is supplied to the merge determination unit 141 and the reference value calculation unit 143. As a result, after this, the merge determination unit and the reference value calculation unit 143 carry out processes in accordance with procedures shown in FIG. 71 substituted for the procedures shown in FIG. 21 and FIG. 23. In addition, the comparing reference value $\Delta 2$ is supplied to the center value calculation unit 142. After this, the center value calculation unit 142 carries out a process in accordance with a procedure shown in FIG. 72 substituted for that shown in FIG. 22.

As has been described above, in the VFO region, after the initial value of the center value is calculated, the calculation for obtaining the comparing reference values $\Delta 1$ and $\Delta 2$ is carried out. The difference $dy_{pm}$ (corresponding to the amplitude of the pulse signal in the VFO region) between the average $y_{kp}$ of the positive peak values and the average $y_{km}$ of the negative peak values which is obtained when the clock count value reaches j2 in the process for calculating the comparing reference values $\Delta 1$ and $\Delta 2$ is latched as an equalizing target dylat in the comparator 151.

Figure 73:
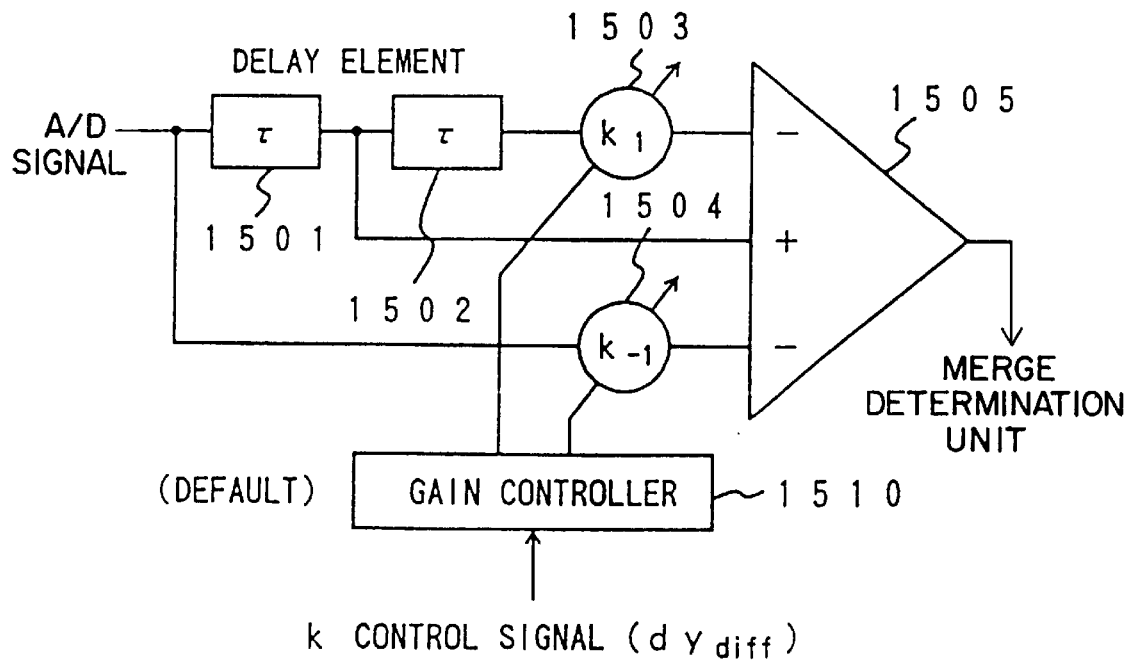
FIG. 73 is a block diagram illustrating a structure of a transversal equalizer.

The transversal equalizer 150 has, as shown in FIG. 73, delay elements 1501 and 1502, multipliers 1503 and 1504, an adder 1505 and a gain controller 1510. The multiplier 1503 multiplies a sampling value supplied via the delay elements 1501 and 1502 by an equalizing coefficient (a gain) k. The multiplier 1504 multiplies a sampling value directly supplied from the A/D converter 13 by an equalizing coefficient (a gain) k. The adder 1505 adds a sampling value supplied via the delay element 1501, an inverted value of an output value from the multiplier 1503 and an inverted value of an output value from the multiplier 1504. The gain controller 1510 controls, based on a gain control signal (a k control signal) supplied from the comparator 151, gains (equalizing coefficients) k used by the multipliers 1503 and 1504.

In the VFO region, the transversal equalizer 150 is controlled so that the gains k are set to default values. In regions other the VFO region of each sector, the equalizing coefficients (the gains) of the transversal equalizer 150 are controlled based on the equalizing target $dy_{lat}$ and the determination result from the merge determination unit 141.

Figure 74:
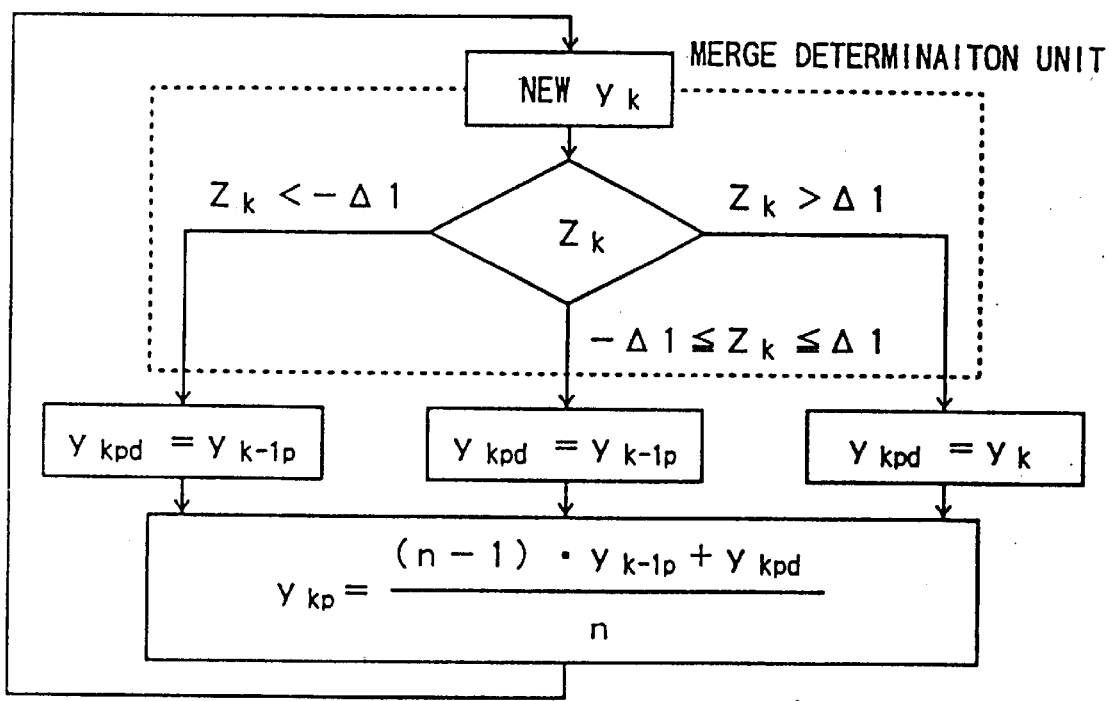
FIG. 74 is a flow chart illustrating a procedure for calculating the average value of the positive peak values using the comparative reference value $\Delta1$.
Figure 75:
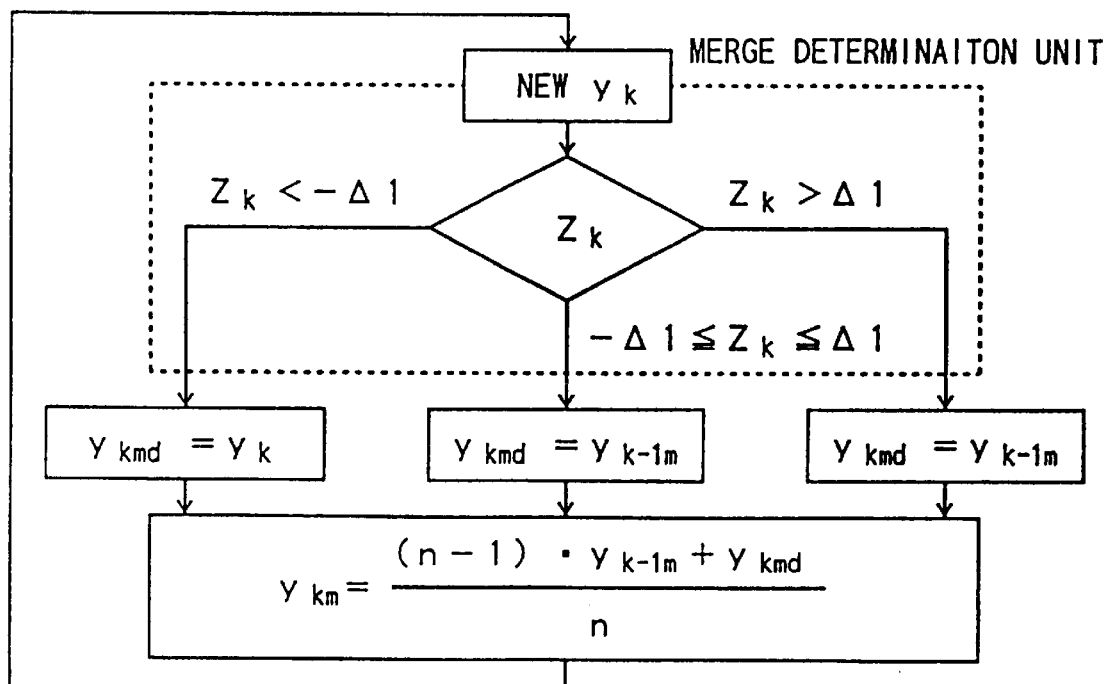
FIG. 75 is a flow chart illustrating a procedure for calculating the average value of the negative peak values using the comparative reference value $\Delta1$.

The merge determination unit 141 carries out the determination operation using the comparing reference value $\Delta 1$ obtained as described above. The calculation unit 147 calculates the average $y_{kp}$ of the positive peak values of the reproduction signal based on the determination result in accordance with a procedure shown in FIG. 74 (corresponding to the procedure shown in FIG. 69). The calculation unit 147 further calculates the average $y_{km}$ of the negative peak values of the reproduction signal based on the determination result from the merge determination unit 141 in accordance with a procedure shown in FIG. 75 (corresponding to the procedure shown in FIG. 70). The difference $dy_{pm}$ between the average $y_{kp}$ of the positive peak values and the average $y_{km}$ of the negative peak values is then calculated. The difference $dy_{pm}$ is supplied, in synchronism with the clock signal, to the comparator 151 in which the equalizing target $dy_{lat}$ has been latched.

Figure 76:
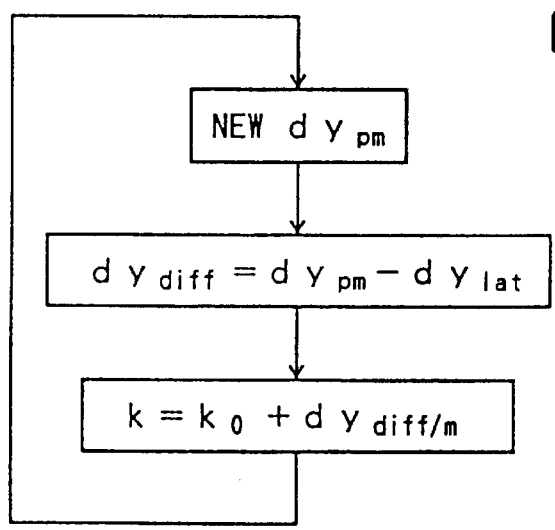
FIG. 76 is a flow chart illustrating a procedure for controlling equalizing coefficients in the transversal equalizer.

The comparator 151 and the gain controller 1510 of the transversal equalizer 150 carry out processes in accordance with a procedure shown in FIG. 76.

First, every time the calculation unit 147 supplies to th comparator 151 the difference $dy_{pm}$ between the average $y_{kp}$ of the positive peak values and the average $y_{km}$ of the negative peak values, the comparator 151 calculates a difference, referred to as an amplitude difference $dy_{diff}$, between the difference $dy_{pm}$ and the equalizing target $dy_{lat}$. The comparator 151 supplies, as the gain control signal, the amplitude difference $dy_{diff}$ to the transversal equalizer 150. Next, the gain controller 1510 decides in accordance with the following equation using a reference equalizing coefficient $k_0$:

$$k = k_0 + dy_{diff}/m.$$

The gain controller 1510 controls the equalizing coefficients (the gains) used in the multipliers 1503 and 1504 so that the equalizing coefficients are set to the above decided value. In the above formula, m is a constant for adjusting the amplitude difference $dy_{diff}$ to a value of the equalizing coefficient to be corrected. Each of the multipliers 1503 and 1504 multiplies a sampling value from the A/D converter 13 by the equalizing coefficient controlled as described above and supplies the multiplying result to the adder 1505.

According to the above transversal equalizer 150 in which the equalizing coefficients are controlled, even if the signal amplitude $dy_{pm}$ varies and differs from the equalizing target $dy_{lat}$, the equalizing coefficients are controlled in accordance with the above formula so that the difference $d_{diff}$ is corrected. Thus, stable equalized outputs can be obtained.

In addition, the above equalizing target can be easily decided based on the amplitude $dy_{pm}$ of the reproduction signal in the VFO region of each sector. That is, the equalizing target can be easily changed in accordance with a position of the sector.

Furthermore, since the above equalizer obtains the equalizing outputs in a digital process, it is easy to change the delay time at an outer position and an inner position of the optical disk 1 by changing the frequency of the clock signal.

The respective multipliers 1503 and 1504 can be formed of normal circuits for multiplying two numbers. Further, to multiplying a sampling value and the equalizing coefficient at a high speed, the multipliers 1503 and 1504 can be formed as shown in FIG. 77.

Figure 77:
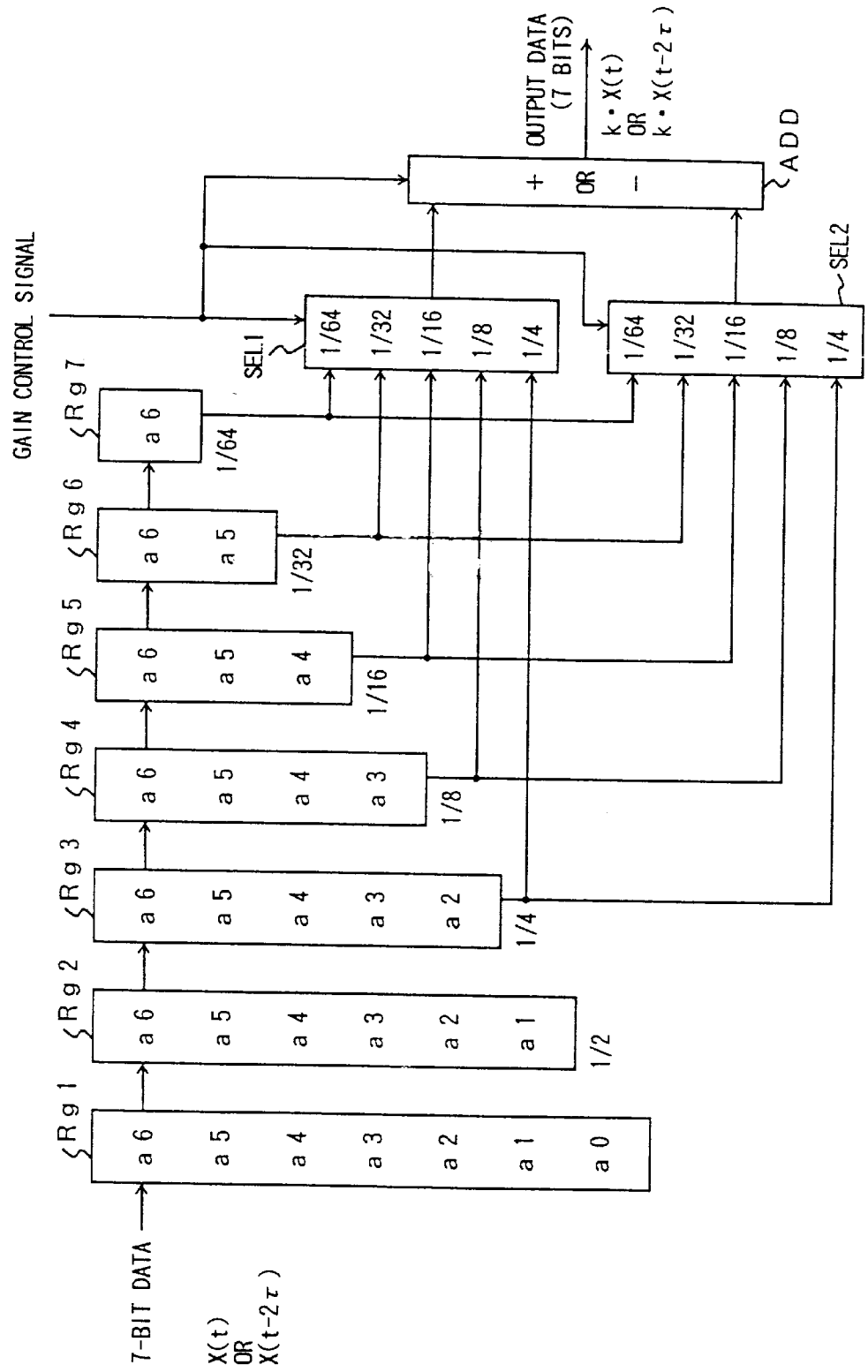
FIG. 77 is a block diagram illustrating a structure of a multiplier of the transversal equalizer.

Referring to FIG. 77, the multiplier has registers Rg1, Rg2, Rg3, Rg4, Rg5, Rg6 and Rg7, selectors Sel1 and Sel2 and an adder ADD. Input data X(t) (seven bits) supplied from the A/D converter 13 or data X(t−2τ) (seven bits) supplied via the delay elements 1501 and 1502 is initially set in the register Rg1, and data shifted bit by bit is set in the respective registers Rg2, Rg3, Rg4, Rg5, Rg6 and Rg7. That is, the input data is directly set in the register Rg1, a data value which is one half of the input data by shifting the input data by one bit is set in the register Rg2, a data value which is one fourth of the input data by shifting the input data by two bits is set in the register Rg3, a data value which is one eighth of the input data by shifting the input data by three bits is set in the register Rg4, a data value which is one sixteenth of the input data by shifting the input data by four bits is set in the register Rg5, a data value which is one thirty-second of the input data by shifting the input data by five bits is set in the register Rg6, and a data value which is one sixty-fourth of the input data by shifting the input data by six bits is set in the register Rg7. Respective selectors Sel1 and Sel2 select a data value from among data values, set in the respective registers Rg3, Rg4, Rg5, Rg6 and Rg7, which are ¼, ⅛, ¹⁄₁₆, ¹⁄₃₂ and ¹⁄₆₄ of the input data value. The adder ADD adds a data value selected by the selector Sel2 or inverted value thereof to a data value selected by the selector Sel1 and outputs the adding value as a multiplying value (k·X(t) or k·X(t−2τ)).

According to the respective multipliers 1502 and 1503 formed as described above, the multiplying operation can be executed by only the shifting operations and the adding operation. Thus, the multiplying operation can be easily performed at a high speed.

The present invention is not limited to the aforementioned embodiments, and variations and modifications may be made without departing from the scope of the claimed invention.

What is claimed is:

1. A system for reproducing data from an optical disk in which information has been recorded in every unit region, the unit region having a first region for recording a regular pattern signal encoded in accordance with a recording rule of a predetermined partial response characteristic and a second region for recording a random data signal, said system comprising:

signal reproduction means for reproducing a signal from said optical disk;

sampling means for sampling the reproduction signal from said signal reproduction means at predetermined timing and for outputting sampling data;

equalizing means for executing an equalizing process for the sampling data from said sampling means;

maximum likelihood data detecting means for deciding, based on the sampling data processed by said equalizing means, maximum likelihood data to be reproduced;

data generating means for generating the recording data from the data decided by said maximum likelihood data detecting means based on the sampling data processed by said equalizing means in the second region of each unit region; and equalizing target calculating means for calculating, based on the sampling data obtained in the first region of each unit region, the equalizing target used by said equalizing means.

2. The system as claimed in claim 1, wherein the unit region is a sector having a VFO region as the first region and a data region as the second region.

* * * * *

UNITED STATES PATENT AND TRADEMARK OFFICE
CERTIFICATE OF CORRECTION

PATENT NO. : 5,850,377
DATED : December 15, 1998
INVENTOR(S) : Taguchi et al.

It is certified that error appears in the above-identified patent and that said Letters Patent is hereby corrected as shown below:

Column 6, line 8, delete "bee" and insert

--been-- therefor

Column 10, line 55, delete "0.1" and insert

-- -0.1-- therefor

Column 13, line 42, delete "= ±8" and insert

--≠ ±8-- therefor

Column 14, line 51, delete "sing" and insert

--sign-- therefor

UNITED STATES PATENT AND TRADEMARK OFFICE
CERTIFICATE OF CORRECTION

PATENT NO. : 5,850,377
DATED : December 15, 1998
INVENTOR(S) : Taguchi et al.

It is certified that error appears in the above-identified patent and that said Letters Patent is hereby corrected as shown below:

Column 15, line 62, delete "do" and insert --$d_0$-- therefor

Column 17, line 5, delete "0" (first occurrence) and insert --1-- therefor

Column 17, line 56, delete "1,))" and insert --1,0)-- therefor

Column 19, line 43, delete "form" and insert --from-- therefor

UNITED STATES PATENT AND TRADEMARK OFFICE
CERTIFICATE OF CORRECTION

PATENT NO. : 5,850,377
DATED : December 15, 1998
INVENTOR(S) : Taguchi et al.

It is certified that error appears in the above-identified patent and that said Letters Patent is hereby corrected as shown below:

Column 19, line 56, delete "he" and insert

--the-- therefor

Column 20, line 10, delete "$M_K$ 10 and insert

--$M_K = 10$-- therefor

Column 20, line 58, delete entire line, and insert --$d_K = (\bar{a}_{K1} \cdot a_{K2} \cdot m_{K1} \cdot \bar{m}_{K2}) + (a_{K1} \cdot \bar{a}_{K2} \cdot \bar{m}_{K1} \cdot m_{K2})$-- therefor

Column 21, line 8, delete "⇌" and insert

-- + -- therefor

UNITED STATES PATENT AND TRADEMARK OFFICE
CERTIFICATE OF CORRECTION

PATENT NO. : 5,850,377
DATED : December 15, 1998
INVENTOR(S) : Taguchi et al.

It is certified that error appears in the above-identified patent and that said Letters Patent is hereby corrected as shown below:

Column 40, line 52, delete "dylat" and insert

--$dy_{lat}$-- therefor

Column 41, line 26, delete "th" and insert

--the-- therefor

Signed and Sealed this

Fourteenth Day of December, 1999

Attest:

Q. TODD DICKINSON

Attesting Officer

Acting Commissioner of Patents and Trademarks